(12) United States Patent
Nix, Jr. et al.

(10) Patent No.: US 7,990,912 B2
(45) Date of Patent: Aug. 2, 2011

(54) VOIP ENABLED FEMTOCELL WITH A USB TRANSCEIVER STATION

(75) Inventors: John A. Nix, Jr., Evanston, IL (US); Andrew Kwong, Naperville, IL (US); John Wakeman, Plano, TX (US)

(73) Assignee: Go2Call.com, Inc., Evanston, IL (US)

( * ) Notice: Subject to any disclaimer, the term of this patent is extended or adjusted under 35 U.S.C. 154(b) by 744 days.

(21) Appl. No.: 11/695,402

(22) Filed: Apr. 2, 2007

(65) Prior Publication Data
US 2008/0244148 A1  Oct. 2, 2008

(51) Int. Cl.
*H04W 4/00* (2009.01)
*H04W 36/00* (2009.01)
*H04W 40/00* (2009.01)

(52) U.S. Cl. .................. 370/328; 455/444; 455/448

(58) Field of Classification Search .......... 370/328, 370/352, 335, 241; 235/380, 441, 451; 713/500, 713/400; 455/444, 448
See application file for complete search history.

(56) References Cited

U.S. PATENT DOCUMENTS

| | | |
|---|---|---|
| 5,898,928 A | 4/1999 | Karlsson et al. |
| 2003/0058814 A1 | 3/2003 | Kim |
| 2004/0252666 A1 | 12/2004 | Johnson |
| 2005/0059391 A1 | 3/2005 | Ikeda et al. |
| 2005/0192055 A1 | 9/2005 | Niemela et al. |
| 2006/0208066 A1 | 9/2006 | Finn et al. |
| 2006/0250967 A1 | 11/2006 | Miller et al. |
| 2009/0222685 A1* | 9/2009 | Foster et al. ............ 713/500 |

OTHER PUBLICATIONS

Carol J. Barrett, Low-Power Decimation Filter Design for Multi-Standard Transceiver Applications, Master of Science in Electrical Engineering University of California, Berkeley, Professor Paul R. Gray, Advisor, pp. 1-85, 1997.
Kwaku Owusu Abrokwah, Spectrum Usuage, Quantitative and Qualitative Understanding of Spectrum Usage in the Cambridge Area, Massachusetts Institute of Technology, Department of Electrical Engineering and Computer Science, Dec. 2002, pp. 1-9.
Bryan Ackland et al., High Performance Cognitive Radio Platform With Integrated Physical and Entwork Layer Capabilities, Network Centric Cognitive Radio, Interim Technical Report, Jul. 2005, pp. 1-13.
<RR> Interfaces (GSM Originating Call), EventHelix.com/EventStudio 2.5, Oct. 15, 2004, pp. 1-4.
Location Update (GSM Location Update Procedure), EventHelix.com/EventStudio 2.5, Aug. 31, 2004, pp. 1-5. Thierry Turletti et al., Estimating the Computational Requirements of a Software GSM Base Station, Telemedia Networks and Systems Group, Laboratory for Computer Science, MIT, © 1997, IEEE, pp. 169-175.
Network Protocols and Architectures of Mobile Radio Systems, pp. 1-83, Feb. 2006.
* cited by examiner

*Primary Examiner* — Jinsong Hu
*Assistant Examiner* — Mong-Thuy Tran
(74) *Attorney, Agent, or Firm* — Smith Risley; Steve P. Wigmore

(57) ABSTRACT

Telephone calls between a mobile station (MS) and the mobile network or PSTN are routed through the Internet via VoIP using a femtocell, as opposed to the traditional macro-cellular network. The femtocell can comprise a USB Transceiver Station that is connected to a personal computer through a universal serial bus port, which provides both power and a multi-megabit per second connection between the personal computer and the USB transceiver station. The USB transceiver station can comprise a microcontroller to manage signaling between the RF front end/baseband processor and the personal computer, as well as a precise timing mechanism to assist the synchronization of femtocell timing with the surrounding macrocellular network, if it is present. The USB transceiver station can have a compact form factor that facilitates a high degree of portability by the subscriber, such as being readily attachable to their keychain.

6 Claims, 18 Drawing Sheets

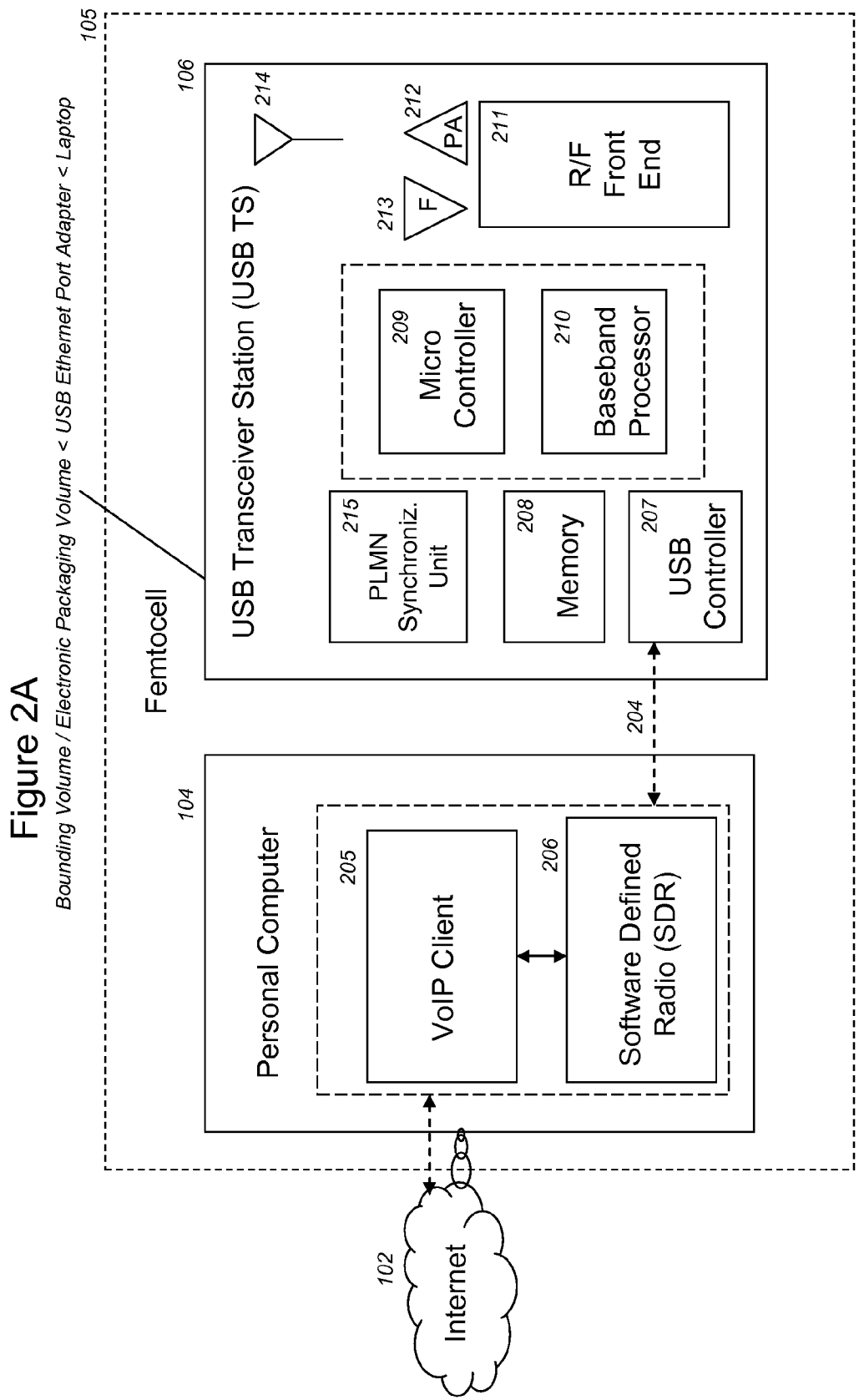

Figure 2B

*Stand Alone Unit (without PC 104)*

Femtocell

USB Transceiver Station (USB TS) 105/106

- 214 (antenna)
- 212 PA
- 213 F
- 211 R/F Front End
- 209 Micro Controller
- 210 Baseband Processor
- 215 PLMN Synchroniz. Unit
- 208 Memory
- 205 VoIP Client
- 206 Software Defined Radio (SDR)
- 102 Internet

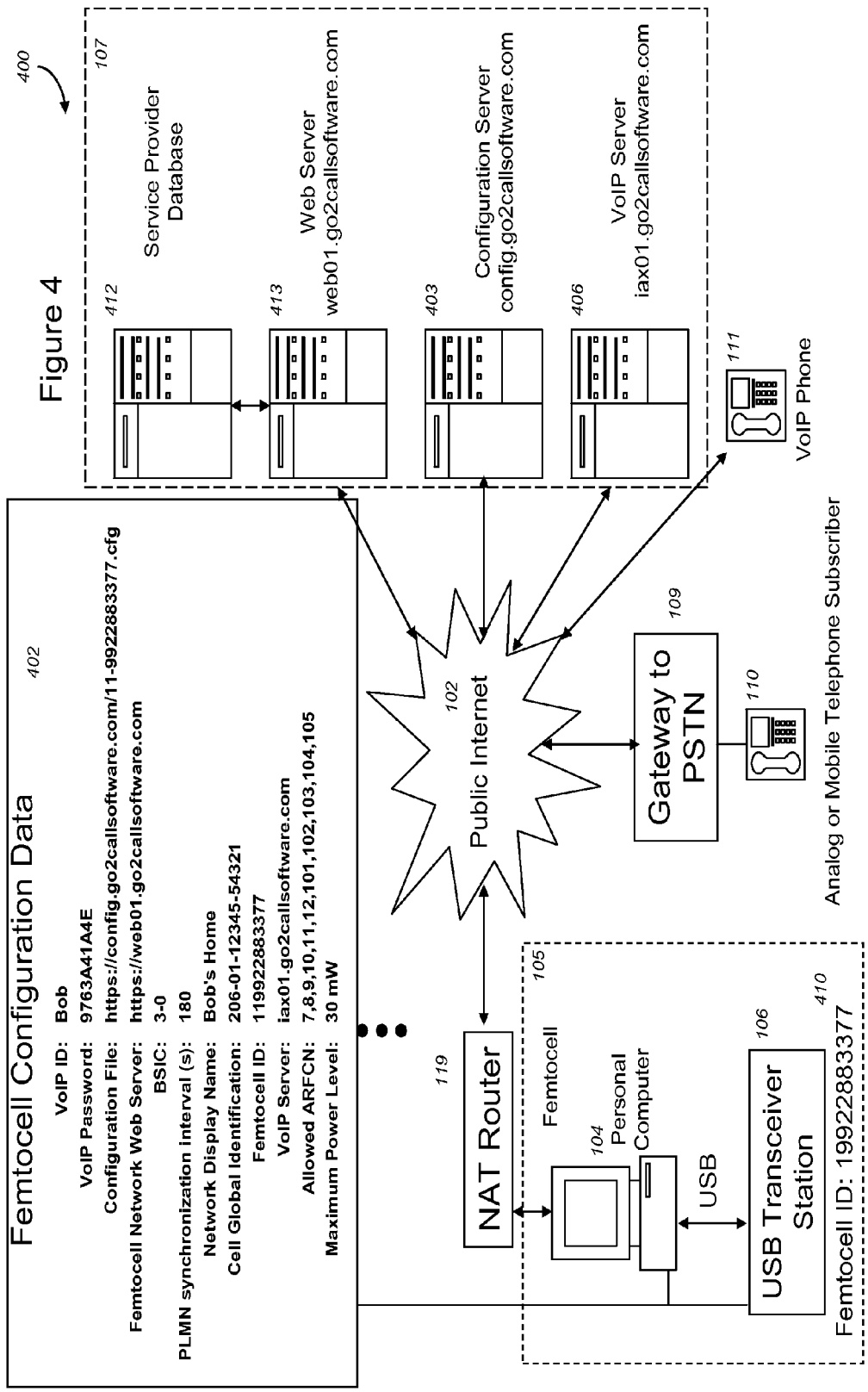

Figure 5

Femtocell Configuration File 500

| | | |
|---|---|---|
| VoIP ID: | 501 | Bob |
| VoIP Password: | 502 | 9763A41A4E |
| Configuration File: | 503 | https://config.go2callsoftware.com/11-992288377.cfg |
| BSIC: | 504 | 3-0 |
| Network Display Name: | 505 | Bob's Home |
| Cell Global Identification: | 506 | 206-01-12345-54321 |
| Femtocell ID: | 507 | 119922883377 |
| PLMN synchronization interval (s): | 508 | 1800 |
| VoIP Server: | 509 | iax01.go2callsoftware.com |
| Backup VoIP Server: | 510 | iax02.go2callsoftware.com |
| Port: | 511 | 4569 |
| Allowed ARFCN: | 512 | 7,8,9,10,11,12,101,102,103,104,105 |
| Maximum Power Level: | 513 | 30 mW |
| Registration Interval (s): | 514 | 900 |
| Web Server: | 515 | https://web01.go2callsoftware.com |
| Max. CPU Load: | 516 | 75% |
| Max. subscribers: | 517 | 4 |
| Max. simultaneous calls: | 518 | 2 |
| Max. packet loss: | 519 | 6% |
| Media Trunking: | 520 | Y |
| Forward Error Correction Low Threshold: | 521 | 2% |
| Max. delay (ms): | 522 | 350 |
| Max. jitter (ms): | 523 | 90 |
| POKE interval (s): | 524 | 60 |
| VoIP Protocol: | 525 | IAX2 |
| VoIP Transport Type: | 526 | UDP |
| VoIP retry timer (ms): | 527 | 200 |
| Max VoIP retries: | 528 | 5 |
| Radio Cipher Mode: | 529 | N |
| VoIP Signaling Obfuscation: | 530a | Y |
| VoIP Media Obfuscation: | 530b | Y |
| VoIP Obfuscation Method: | 531 | XOR |
| Ignore Media UDP checksum: | 532 | Y |
| Signaling DSCP Value: | 533 | 101110 |
| Media DSCP Value: | 534 | 011010 |
| MS Authentication Method: | 535 | GSM |

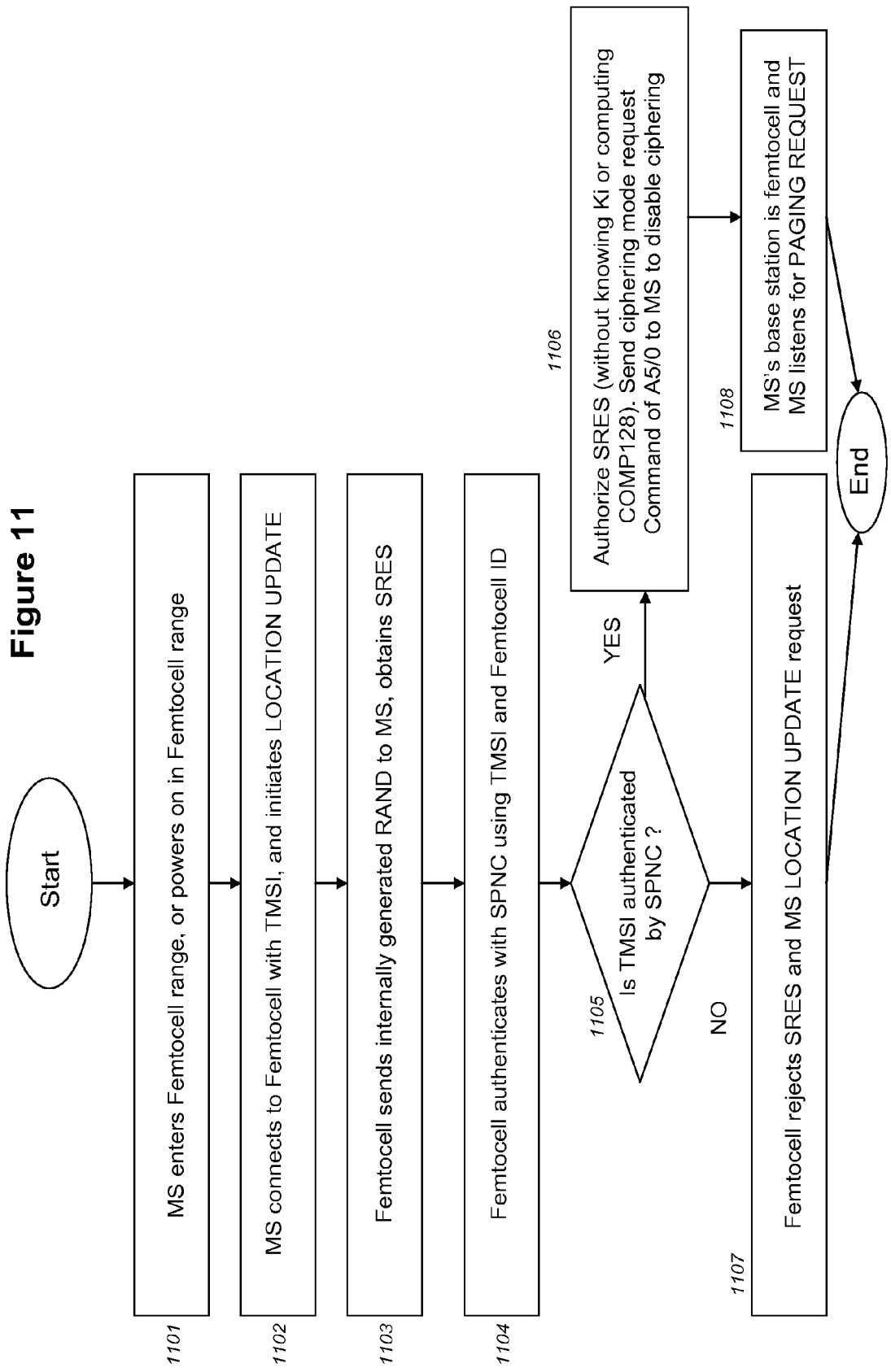

| VoIP ID | VoIP Password | Femtocell ID | TMSI | MSISDN | Femtocell Frequency (Mhz) | Femtocell Power (mW) |
|---|---|---|---|---|---|---|
| Bob | 9763A41A4E | 1199228833377 | 6A203EA7 | 32475998877 | 936.8 | 18 |
| Abdul | 5FE09ACFAA | 508959328168 | 26903FC5 | 32475887766 | 955.2 | 74 |
| Hiroko | 23A7A61929 | 448110084514 | 3E7E768A | 32475001122 | 937.4 | 33 |
| Hiroko | 23A7A61929 | 448110084514 | 1497852C | 32475000111 | 937.4 | 33 |
| Natasha | 693B44A29F | 968073681086 | 1C2D6731 | 32475123456 | 956.0 | 20 |
| Natasha | C0246A7BC5 | 608580249087 | 1C2D6731 | 32475123456 | 956.0 | 12 |

1202 →

| VoIP ID | Femtocell ID | Street Address | Postal Code | VoIP Server |
|---|---|---|---|---|
| Bob | 1199228833377 | 101 Main St. | 60219 | iax01 |
| Abdul | 508959328168 | 2020 Oak Ave. | 60601 | iax02 |
| Hiroko | 448110084514 | 876 Hillside Rd. | 61056 | iax04 |
| Natasha | 968073681086 | 333 Lake Ave. | 64936 | iax02 |
| Natasha | 608580249087 | 576 Clark St. | 64936 | iax03 |

1203 →

| VoIP ID | Account Active | Voip Credit | Rate Plan |
|---|---|---|---|
| Bob | y | $20.45 | 100 |
| Abdul | y | $10.11 | 101 |
| Hiroko | n | $0.00 | 211 |
| Natasha | y | $75.01 | 100 |

1204 →

| Rate Plan | Mask | Outbound Proxy |
|---|---|---|
| 100 | 3247 | sip01.proximus.com |
| 100 | 3249 | sip02.mobistar.com |
| 100 | 3248 | sip01.basetelecom.com |
| 100 | 1 | sip01.bics.com |
| 101 | 44 | sip03.bt.com |

1205 →

| MSISDN | HLR |
|---|---|
| 32475998877 | Proximus01 |
| 32475887766 | Proximus03 |
| 32475001122 | Proximus01 |
| 32475000111 | Proximus02 |
| 32475123456 | Proximus03 |

VOIP ENABLED FEMTOCELL WITH A USB TRANSCEIVER STATION

TECHNICAL FIELD

The present invention relates to telephony services. More particularly, the present invention relates to femtocells, or user base stations, in combination with a service provider network to allow a standard mobile handset to communicate voice and/or data through voice over internet protocol (VoIP). For example, data services such as text messaging received from or transmitted to a mobile handset can be supported.

BACKGROUND OF THE INVENTION

Worldwide, the three of the most significant trends in the telecommunications industry are the rapid growth in the number of mobile subscribers, the adoption of Voice over Internet Protocol (VoIP) as the underlying transport method for voice services, and the steadily increasing number of broadband Internet connections for both residential and business users. According to GSM World, as of early 2007 there are 2.2 billion mobile telephony subscribers worldwide, and approximately 82% are on the Global System for Mobile (GSM) Communications standard and recent updates such as UMTS. The International Telecommunications Union (ITU) expects that approximately 50% of all international phone calls will have some VoIP component in 2007. According to IMS Research, the number of fixed broadband connections worldwide will grow from 150 million to 400 million between 2005 through 2009. In addition, there are approximately 700 mobile operators worldwide.

Fixed-mobile convergence is a new service at the intersection of all three above trends for mobile operators. If mobile subscribers have a broadband Internet connection, service providers would like to leverage that connection to offer a seamlessly integrated voice service, while the subscriber accesses traditional mobile telephony outside their residence or office. By using a broadband Internet connection and VoIP, potentially higher quality and lower cost voice services can be delivered by the mobile operator, while also offloading traffic from the mobile network. In addition to lower costs and higher quality, subscribers can access a seamless voice service, whereby one telephone number and handset can be used for both mobile and "land-line" services. Finally, fixed-mobile convergence allows mobile operators to effectively compete against both traditional land-line telephone companies and new, competitive VoIP services.

Two primary methods exist for mobile operators to provide a fixed-mobile convergence service in a residential environment with existing handsets, where the legacy analog phone line is not required. The first method requires subscribers to obtain a dual-mode handset and access the network through unlicensed mobile access (UMA), traditionally through the 802.11a/b/g/n connection, also known as wireless fidelity (Wi-Fi). A benefit of UMA is that the unlicensed frequencies around 2.4 GHz can be utilized freely by the operators and subscribers, within regulatory limits for reasonable transmitted power levels. Example vendors offering mobile operators UMA solutions include Kineto, Alcatel, Nokia, and Ericsson, among others. For home use, the subscriber should have Wi-Fi service set up and configured in their residence or from a nearby access point.

An alternative approach for offering fixed-mobile convergence is to deploy a "user base station" or femtocell, directly within the subscribers' premises, such at a home or office. Another common term in the industry for femtocell is "home base station". With a femtocell, the handset accesses the femtocell base station through traditional licensed spectrum, and the handset connects to the femtocell via a radio link that implements traditional mobile network standards. The power levels between the femtocell and the attached mobile station (MS) are generally much lower than the power levels between a macrocellular base transceiver station (BTS) and MS, since the limited range of the femtocell is intended to cover the subscriber's premises. In most femtocell designs, connectivity to the mobile network or public switched telephone network (PSTN) is provided through an Internet connection, and calls are connected through Voice over Internet Protocol (VoIP) technologies. Other techniques are possible, such as utilizing a Bluetooth connection between the mobile handset and a personal computer or peripheral, as implemented in the Glide product from British Telecom (BT). In general, mobile operators are currently focusing on the UMA and femtocell approaches.

Although UMA can be expected to acquire some market share for fixed-mobile convergence, femtocell based solutions have significant benefits. For example, ABI Research forecasts that by 2011 there will be 102 million subscribers on femtocell products at 32 million access points worldwide, indicating substantial benefits of femtocells for both subscribers and mobile operators due to numerous reasons. First, the number of handsets capable of supporting a Wi-Fi connection are far fewer than the number of handset deployed worldwide which support existing digital mobile telephony standards such as Global System for Mobile Communications (GSM), Code Division Multiple Access (CDMA), Universal Mobile Telecommunications System (UMTS), and CDMA2000. Second, handsets that support Wi-Fi generally have higher manufacturing costs than handsets without the Wi-Fi functionality. Mobile operators would prefer to offer a fixed-mobile convergence solution without requiring widespread upgrade of existing handsets or cellular network infrastructure, in order to reduce costs for both subscribers and the operator. Third, the power levels required to transmit voice over Wi-Fi are widely recognized as higher than using a femtocell, resulting in superior battery life for the femtocell approach to fixed-mobile convergence. Similarly, the radio link for most mobile telephony services is optimized for long-range, digitized voice transmission, while Wi-Fi is optimized for localized broadband data connectivity. Consequently, applying mobile telephony standards on the femtocell generally provides a more robust radio link between the MS and the femtocell in a subscriber's premises than a Wi-Fi connection.

Simply reducing the size of a traditional base transceiver station (BTS) or even a picocell to a form factor acceptable for installation at a subscriber's premises could provide a technically functional femtocell. However, without significantly altering the hardware architecture and adding advanced VoIP capabilities, a simply "smaller" BTS or picocell priced at several thousand dollars would clearly have limited adoption with subscribers. There are many other desirable features for subscribers and mobile operators that a simply "smaller" BTS would normally be unable to provide.

There is a need in the art for femtocells that can deliver a high quality and low cost fixed-mobile convergence solution. What are needed in the art are femtocells that minimize component costs and the costs of servers operated by the Service Provider. There is a need for femtocells that can intelligently limit interference of radio transmissions with the surrounding macrocellular network, especially on a licensed spectrum not owned by the mobile operator. Similarly, there is a need in the art for a femtocell system that can transmit at low power levels for both the femtocell and the mobile station (MS), which can be carefully managed to provide high quality calls on the subscriber's premises and the immediate vicinity, such as a typical range up to 50 meters from the femtocell.

Another need exists in the art for femtocells that can intelligently determine higher power levels with corresponding longer range service are acceptable, based on algorithms that verify interference with nearby BTS at the higher transmit power levels would be minimal. There is a need in the art for femtocells that can support flexible configuration parameters for both VoIP and base station functionality, such as server names, identifying tokens for the femtocell, allowed licensed frequencies for radio transmission, power levels, among many others. A further need exists in the art for a femtocell system that supports configuration parameters that can be easily updated by a service provider upon provisioning of a femtocell, or if the subscriber or mobile operator request changes in the service for a femtocell.

Therefore, a need exists in the art for femtocells that can support VoIP trunking techniques to combine the audio packets from several simultaneous calls through each femtocell into larger VoIP packets, thereby reducing bandwidth utilization on the subscriber's Internet connection. This combining of media packets can reduce the routing processing load on the subscriber's terminal equipment for the Internet connection. Another need exists in the art for femtocells that can leverage the personal computer to further reduce component costs of the femtocell system.

The processing capability of the central processing unit (CPU) on most personal computers is relatively idle. Thus, there is a need in the art for femtocells that can employ VoIP client and software defined radios (SDR) on the personal computer in order to harness the underutilized processing power so that several simultaneous calls, or channels, can be supported by each femtocell. Another need exists in the art for "stand alone" femtocell that connects mobile calls without a personal computer and that can achieve the benefits of service through femtocells when compared to UMA over Wi-Fi.

Another need exists in the art for femtocells that can support both voice and data services, such as Short Message Service (SMS) or Multimedia Messaging Service (MMS). A further need exists in the art for femtocells that can support the encryption of communications in both the radio spectrum and through the Internet and which may be optionally configured, depending upon the security requirements of the subscriber, mobile operator, service provider, or appropriate regulatory agencies.

What is also needed are femtocells that can synchronize their timing with the surrounding macrocellular network, if present, in order to facilitate handoff of a MS from a femtocell to a mobile network. There is a need for femtocells that are sufficiently synchronized with a surrounding mobile network, in order to significantly reduce the probability that an active call initiated on the femtocell will drop upon handover attempts to a surrounding BTS as the MS moves out of the femtocell range. Moreover, a need exists in the art for femtocells which can leverage advanced VoIP techniques and network monitoring in order to deliver the highest possible call quality.

Another need exists in the art for femtocells that support VoIP techniques that may include forward error correction to compensate for meaningful packet loss between the subscriber's Internet connection and the Service Provider's network, native transmission of the MS codec to the terminating endpoint to avoid transcoding, disabling checksums on the UDP packets containing media, and trunking of media for multiple simultaneous calls. There is a need for service to femtocells which can support routers and modems at the subscribers' premises that implement network address translation (NAT), which can result in a private address that is not routable on the public Internet.

A need exists for femtocells that can a intelligently detect Internet routing quality issues, and which can attempt to compensate for them, and ultimately temporarily disable base station service, if significantly higher quality service will be provided by a surrounding macrocellular BTS. If the quality of the Internet connection for a femtocell system degrades to a sufficient level, there is a need for the femtocell to automatically allow subscribers to use the macrocellular network for superior voice quality.

There is a need for femtocells to support such cutover to mobile networks when the MS is within the femtocell service area and to provide for automatically management of this feature. In addition, there is a need for a femtocell system that allows a service provider to route calls between endpoints entirely through the Internet and completely bypass the traditional PSTN or mobile networks, if the other party is also located on the Internet, such as at a VoIP phone or softphone on a PC, for instance. There is a need for such routing that would bypass the termination costs traditionally associated with sending a call through the PSTN or mobile networks.

Furthermore, a need exists for femtocells that are readily transportable by the end user and preferably small enough to attach to a subscriber's keychain, similar to a USB "memory stick" and that may be of a size similar to a USB Ethernet Port adapter. A further need exists in the art for a portable femtocell that can also be quickly and easily installed, for example as simple as plugging a device into the USB port of a personal computer or laptop. There is a need in the art for a system that supports such combination of portability and ease of use, and that will encourage subscribers to carry a femtocell when they travel. Another need exists in the art for a femtocell system that can be used with a laptop when a subscriber is in a hotel room, for instance.

A need exists for a femtocell that is designed with sufficient portability, ease of use, and low costs, so that many subscribers can purchase more than one femtocell, with one being for home use, another for the office, and a third for when they travel. There is a need in the art to allow multiple femtocells to be associated with an individual subscriber, and such that all femtocells can potentially support a single telephone bill, at potentially reduced rates from the mobile operator since calls traverse the Internet as opposed to the macrocellular network.

In addition, a further need exists in the art for femtocells that do not require a separate power supply, in order to reduce or eliminate use of an AC/DC wall adapter or batteries that require periodic replacement or recharging. Another need exists for femtocells to have the capability to support multiple mobile network standards such as GSM, UMTS, CDMA, CDMA2000/2001, plus future standards that have yet to be developed. There is a need in the art for a femtocell system that can support new standards even if they were not included when the subscriber signed up for the service. A need exists for a femtocell system that can support new standards by implementing a software defined radio that can be later updated on the femtocell system while supporting previously installed femtocell hardware.

There is a need for femtocell hardware to have sufficient capabilities to support the additional standards, such as the ability to operate in different frequency ranges with appropriate baseband processing, and to allow those hardware capabilities to be optionally added. Another need exists for femtocells that can securely authenticate subscribers, without requiring the mobile operator to deliver the security tokens, such as the combinations of RAND, SRES, and Kc in the GSM standard, since those security tokens may not always be available to the service provider. If the standard security tokens are available from the mobile operator, then there is a need for a femtocell system can implement them as well, in order to securely authenticate the MS and optionally cipher the channel according to the standard methods.

Further, a need also exists for femtocells that can also provide support for standard analog telephone or cordless telephone to be attached, in addition to a MS via radio. A need exists for a femtocell and service provider that can support the delivery of traditional "land line" voice services and telephone numbers through VoIP by connecting a traditional phone, similar to an analog telephone adapter (ATA). There is a need in the art for femtocell system that permits a telephone to ring even when the MS is away from the femtocell or turned off, and there is a need for a femtocell system to be able to support standard services such as voice mail, caller ID, call waiting, call forwarding, and others that can be delivered to the analog telephone through the femtocell.

And lastly, there are needs in the art for a femtocell system in which the process to configure and install the femtocell system so that it can obtain service in a quick and simple manner, since subscribers will most likely be performing the installations. A need exists in the art for a simple installation process of a femtocell system that is opposite to just shrinking a traditional BTS or picocell which usually requires a trained technician to install a BTS or picocell on the mobile operator's network, often spending several hours or more during that process.

SUMMARY OF THE INVENTION

An objective of the invention is to solve the challenges and needs noted above for femtocells. The invention includes a method and system for delivering fixed-mobile convergence service through femtocells. For one exemplary embodiment, when a mobile station (MS) is within range of a femtocell, which is often less than 50 meters in an urban environment, the femtocell can serve as both a base transceiver station and a base station controller for the MS. Telephone calls between the MS and the mobile network or PSTN are routed through the Internet via VoIP, as opposed to the traditional macrocellular network. The femtocell can comprise a USB Transceiver Station that is connected to a personal computer through a universal serial bus port, which provides both power and a multi-megabit per second connection between the personal computer and the USB transceiver station.

The USB transceiver station can implement an identification token, such as a femtocell ID, which may be useful to the service provider and mobile operator to manage the service. The USB transceiver station can comprise an antenna and a radio-frequency front end to transmit and receive radio signals with a nearby handset in the licensed radio spectrum belonging to the mobile operator providing service to the mobile subscriber. The USB transceiver station can comprise a microcontroller to manage signaling between the RF front end/baseband processor and the personal computer, as well as a precise timing mechanism to assist the synchronization of femtocell timing with the surrounding macrocellular network, if it is present. The USB transceiver station can have a compact form factor that that facilitates a high degree of portability by the subscriber, such as being readily attachable to their keychain. In addition, the USB transceiver station can be easily connected to any personal computer or laptop computer that meets modest requirements, such as a modem, commercially common operating system, CPU, memory, available disk space, and a USB port. The USB transceiver station can optionally include a connection for an analog telephone line, such as an RJ-11 jack, to provide service to traditional analog and cordless phones. In this manner, calls can be also placed and received even when the MS is not powered or located at the femtocell.

The personal computer can operate software that includes both a VoIP call client and a software defined radio, which in conjunction with the program instructions for the microcontroller, if present, are referred to as the "femtocell software". The VoIP client can manage the communication with external servers on the Internet for service delivery, such as VoIP registration, call control, and media handling including a jitter buffer. The VoIP client can also implement advanced VoIP techniques such as VoIP trunking, monitoring the quality of the Internet connection, and compensating for measured packet loss through forward error correction techniques. Also, if the quality of the Internet connection falls below specified levels, the femtocell radio transmissions can be automatically disabled, since the subscriber would likely prefer to use the surrounding macrocellular network for higher quality service, if the macrocellular network is available.

The software defined radio can provide base station functionality including signal processing, protocol processing, and a base station controller implemented in executable code on the personal computer. The software defined radio can both increase flexibility of the femtocell for upgrades and help reduce component costs, since the software defined radio may support many of the functions handled in hardware with a traditional base transceiver station (BTS) and BSC. The femtocell software can be automatically downloaded from the Internet when the subscriber plugs in the USB transceiver station for the first time. This feature can be implemented via a small "boot" file stored in flash memory that loads into the PC and automatically downloads the current femtocell software. Similar functionality can be implemented by storing a complete version of the femtocell software in flash memory on the USB transceiver station, having the installation software check for updates. The femtocell software can also automatically start each time the personal computer is turned on, unless otherwise specified by the subscriber or service provider.

The femtocell can maintain a set of configuration parameters that are useful for properly setting up the base station functionality in addition to configuring the femtocell software. Useful configuration parameters can include, but are limited to, the frequency range at which the base station operates, a femtocell ID or token, a base station identification code which includes the network color code of the mobile operator (if the femtocell functions as a GSM 2G base station), a VoIP server location on the Internet and port number, VoIP registration ID, and password, just to name a few. The configuration parameters can be automatically generated upon completion of a provisioning form or the receipt of a text message to set up the service. The configuration file can be automatically downloaded to the femtocell and applied to its running configuration upon initial installation. After initial provisioning, the service provider can update the elements of the configuration file in order to manage the service.

Service to the femtocell and MS is delivered by a service provider. The service provider operates several different servers that can be accessed through the Internet by the femtocell software, such as web servers and VoIP servers. Other servers internal to the service provider's network can include application servers and a database. Whenever the personal computer is powered on with the femtocell software running, the VoIP client can register periodically with a VoIP server. The VoIP client can implement many different protocols for signaling and media, including Session Initiation Protocol (SIP), and in a preferred exemplary embodiment, the VoIP client can implement the Inter-Asterisk Exchange Protocol (IAX2) protocol. The NAT ports that are commonly located on subscribers' Internet connections can be kept open and bound via periodic messages from the VoIP client to the VoIP server such as a frequency of every minute, and the more computationally intensive registration process can be sent by the VoIP client to the VoIP server less frequently, such as every 15 minutes.

In preferred exemplary embodiments, the femtocell can also perform a set of functions as a MS on the macrocellular network, in addition to its primary function as a base station. The femtocell can first scan the surrounding network in the authorized frequencies it can transmit, in FDMA networks such as GSM. For CDMA, UMTS, and similar networks, the femtocell can scan for received power levels to determine its proximity to a base station. For GSM networks, based upon the results of the scanning function, the femtocell can determine a preferred transmit frequency from a list of allowed frequencies in the configuration file in order to minimize interference with the surrounding macrocellular network, if present. The allowed frequencies would usually correspond to licensed spectrum belonging to the mobile operator. Through functioning first as a MS, the femtocell can also synchronize its timing with the macrocellular network. The timing synchronization process can be repeated periodically, to compensate for drift between the local timing in the femtocell and the surrounding mobile network's primary reference source. By applying additional parameters such as the Base Station Identity Code (BSIC) and MNC, cell global identification (for GSM) and a calculated transmit power level, the femtocell can begin broadcasting at low power levels on the order of 20 mW as a base station and awaits contact from a MS. The average transmit power levels of both the femtocell and the MS can be generally much lower over the selected frequency range than the equivalent transmit power levels from a BTS and a MS on the macrocellular network.

Upon successful provisioning, configuration, and registration of the femtocell, the MS can place and receive telephone calls through the femtocell, without requiring the mobile network resources traditionally allocated to the MS to support a telephone call, since the call will be routed through VoIP. When located in the femtocell range, a MS connects to the femtocell and attempts authorization. In preferred embodiments, both (i) secure authorization without RAND, SRES, and Kc (in GSM) and (ii) the standard mobile network authentication techniques can be supported. The method of authentication can be chosen based upon the level of integration of systems between the service provider and the mobile operator. The authentication process can be flexible to restrict the femtocells service to only registered subscribers, or optionally the femtocell could support service to any of the operator's subscribers or a subset thereof. After authentication, outgoing calls from the MS can be routed from the femtocell to the VoIP server through the Internet, which then sends the call to the appropriate call termination network, such as a gateway to the PSTN or MSC of the mobile operator. Incoming calls from the PSTN or MSC can also be supported. Calls may optionally be routed "end to end" through the Internet, allowing bypass of the traditional phone networks, if both endpoints are accessible through the Internet, such as a call between the MS on the femtocell and a VoIP phone or analog telephone adapter (ATA) connected to the Internet. Also, the ciphering of phone calls may be optionally disabled. In preferred exemplary embodiments, the media can be transmitted without transcoding between the MS and a terminating endpoint, such a gateway, in order to both provide high quality audio and also reducing the costs of scaling the VoIP network. The delivery of text messaging such as SMS or MMS also can be supported. The service provider and the mobile operator can also be combined, such that all the functions of the service provider are operated and managed by the mobile operator directly.

Another exemplary embodiment can provide a "stand alone" unit for the femtocell, which combines the functionality of the VoIP client, the SDR, and the USB transceiver station into a single unit and would not require the resources of a personal computer. The functionality and advantages provided by the invention could be implemented in the "stand alone" unit, except a separate power supply such an AC/DC wall adapter or batteries would likely be required. In addition, the form factor and component costs would likely not be as reduced as the USB transceiver station, due to the need for additional hardware, such as an application specific integrated circuit (ASIC) similar to the circuits in mobile phones and macrocellular base stations. The ASIC can provide many of the functions of the VoIP client, SDR, and microcontroller. The "stand alone" unit can also implement a more general purpose CPU to operate some functions of the VoIP client, SDR, and microcontroller in running software and other functions such as a radio frequency front end in hardware.

These as well as other features and advantages of the present invention will become apparent to those of ordinary skill in the art by reading the following detailed description, with appropriate reference to the accompanying drawings.

BRIEF DESCRIPTION OF THE DRAWINGS

Various exemplary embodiments are described herein with reference to the following drawings, wherein like numerals denote like elements.

FIG. 2A is a graphical illustration of the components within a femtocell according to one exemplary embodiment of the invention.

FIG. 2B is a graphical illustration of the components within a "stand alone" femtocell that does not use a personal computer according to one exemplary embodiment of the invention.

FIG. 4 is a graphical illustration of a system to configure a femtocell for communicating with both the VoIP network and operate as a base station, including different servers on the VoIP network according to one exemplary embodiment of the invention.

FIG. 5 is an illustration of the femtocell configuration file downloaded from the configuration server and stored on the femtocell according to one exemplary embodiment of the invention.

FIG. 11 is a simplified flow chart of exemplary steps to authorize and establish communication between the mobile station and the femtocell, without requiring the mobile network's RAND, SRES, or Kc for the mobile station according to one exemplary embodiment of the invention.

FIG. 12 is an illustration of a database tables of an exemplary embodiment for managing the femtocell service, including the mapping of femtocell IDs, TMSIs, and MSISDN, as well as tables to manage the femtocell, calling authentication, and call routing according to one exemplary embodiment of the invention.

DETAILED DESCRIPTION OF EXEMPLARY EMBODIMENTS OF THE INVENTION

Figure 1:
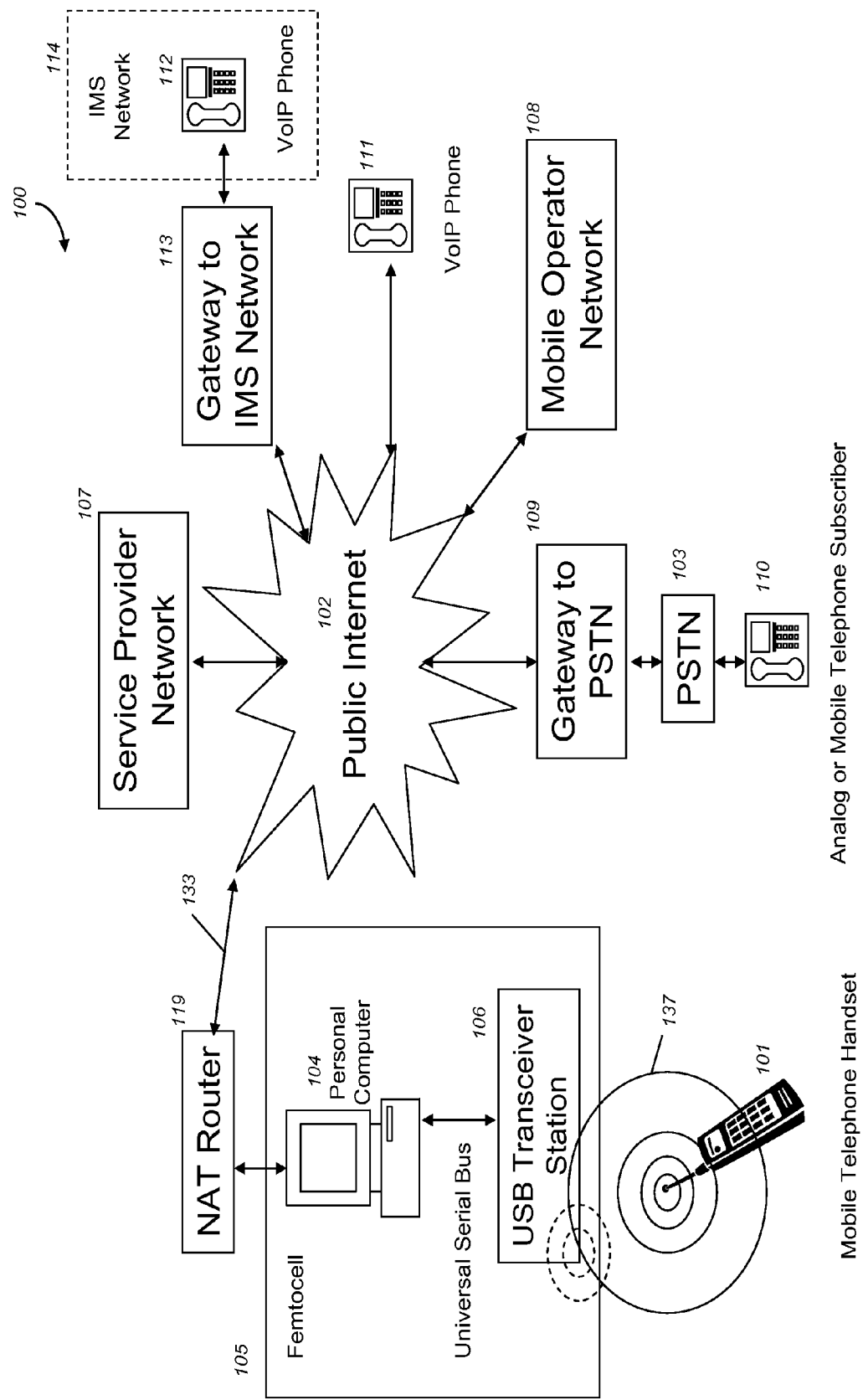
FIG. 1 is a graphical illustration of an exemplary system for a Service Provider to connect telephone calls with a femtocell through VoIP according to one exemplary embodiment of the invention.

FIG. 1 is a graphical illustration of an exemplary system for a service provider to connect telephone calls with a femtocell 105 through VoIP 100. The system 100 includes a mobile station (MS) 101 from which a user wishes to place or receive a call to other users accessible either through the Internet 102, PSTN 103, or IMS network 114. The MS 101 connects to femtocell 105, which comprises a USB Transceiver Station 106 connected to a personal computer 104 through the universal serial bus. The USB Transceiver Station 106 communicates with the MS 101 via a licensed radio spectrum. The personal computer 104 can connect to the Internet 102 via a NAT router 119, although the personal computer could also bypass the NAT router 119 and access the Internet 102 directly.

The computers illustrated in FIG. 1 may be coupled to a LAN through a network interface or adaptor. When used in a WAN network environment, the computers may typically include a modem or other means for establishing direct communication lines over the WAN In a networked environment, program modules may be stored in remote memory storage devices. It will be appreciated that the network connections shown are exemplary and other means of establishing a communications link between computers other than depicted may be used.

Moreover, those skilled in the art will appreciate that the present invention may be implemented in other computer system configurations, including other hand-held devices besides hand-held computers, multiprocessor systems, microprocessor based or programmable consumer electronics, laptop computers, networked personal computers, minicomputers, mainframe computers, servers, and the like.

The invention may be practiced in a distributed computing environment as illustrated in FIG. 1, where tasks may be performed by remote processing devices that are linked through a communications network such as the distributed computer network or Internet 102. In a distributed computing environment, program modules may be located in both local and remote storage devices.

The personal computer 104 can comprise any general purpose computer capable of running software applications or also portable for mobile applications. The PC 104 can communicate with Internet 102 through a communications link 133.

The Mobile Station 101 communicates with the USB Transceiver Station 106 through its own communications link 137 which can be wireless. Typical wireless links include a radio frequency type in which the Mobile Station 101 can communicate with other devices using radio frequency (RF) electromagnetic waves. Other wireless links that are not beyond the scope of the invention can include, but are not limited to, magnetic, optical, acoustic, and other similar wireless types of links.

The Service Provider 107 communicates calls originating from the Internet 102 to the femtocell 105, such as a call from the gateway 109 to the MS 101 when the MS 101 is attached to the femtocell 105. In addition, the service provider network 107 will accept calls originating from the femtocell 105 destined for other users accessible through the public Internet 102, PSTN 103, or IMS network 104. The service provider network 107 can operate a plurality of servers that communicate call control requests or media between the femtocell 101 and other user devices or servers on the Internet. The mobile operator network 108 is responsible for managing a mobile network that normally services the MS 101 when it is not connected to the femtocell 102. In addition, the service provider network 107 and mobile operator network 108 can be combined, or the service provider network 107 could support multiple mobile operator networks 108. The femtocell 105 may optionally be a stand alone unit that is not operated via a personal computer 104, but rather directly connected (not illustrated) to the NAT router 119.

Other user devices for communicating voice or video can be called from the MS 101 through multiple access methods. The mobile operator, service provider or other Internet telephony service providers may operate a telephone gateway 109 to the public switched telephone network (PSTN) 103 in which the gateway 109 connects calls between the public Internet 102 and the PSTN 103. The PSTN 103 provides service to a landline or mobile telephone 110 located anywhere in the world where telephone service is available. Alternatively, the service provider can send calls from a femtocell 105 to the landline or mobile telephone 110 through a gateway (not illustrated) owned and operated by a third party wholesale call termination service such as Belgacom ICS or iBasis. The PSTN 103 may also represent the mobile switching center of the mobile operator's network. The terms "service provider network" and "service provider" are interchangeable, as well as "mobile operator network" and "mobile operator".

Other users can also be accessed through a VoIP Phone 111 that is connected to the Internet 102 or a VoIP phone 112 that is connected to a mobile operator's IMS gateway 113. The VoIP phone 112 could also be a mobile phone, which could be reached without traversing the legacy PSTN or mobile network. The VoIP phones 111 and 112 communicate voice or video traffic by taking the analog signal input into the phones, digitizing and compressing the signal with a codec, and transmitting the media in packets to the other device(s) participating in a call. The sampling rate for audio is preferably chosen to be high enough to sound like a continuous voice signal to the human ear, or a video sampling rate is preferably chosen to be high enough to appear like a continuous moving image to the human eye. The public Internet 102 includes network equipment that routes the individual packets containing media and call control to a destination address identified in the individual packets.

The femtocell 105 communicates voice by taking the audio which has been encoded by the MS 101 and transmitting the media in packets to the gateway 109, or the VoIP phones 111 or 112. Many different protocols can be used for communicating call control and media across the system shown in system 100. For VoIP communication, the femtocell 105 may implement industry standard call control and signaling such as SIP, H.323, IAX2, the Extensible Messaging and Presence Protocol (XMPP), the Media Gateway Control Protocol (MGCP), or other standards based protocols for end users to place and receive voice and video calls. Proprietary protocols for call control and media can also be implemented. Voice and video media can be communicated according to several different codecs, such as GSM-FR, GSM-EFR, G.711, G.723.1, G.729, iLBC, ADPCM, AMR, and VMR-WB for voice communications or Moving Pictures Expert Group (MPEG)-3, MPEG4, H.261 or H.263 for video communications, as examples. For mobile communication between the USB Transceiver Station 106 and the MS 101, the USB transceiver station may implement GSM, UMTS/W-CDMA, CDMA, CDMA2000, similar mobile network standards for radio communication.

Although the femtocell 105 is shown as being a single device in system 100, a service provider may support several or many femtocells 105 similar to the femtocell 105. Different femtocells would likely be distributed in various geographical regions supported by the service provider and mobile operator. An individual femtocell 105 may also have multiple MS 101 connected to it. Although a single mobile operator 108 is illustrated in system 100, the service provider 108 may simultaneously support several mobile operators 108. Although a single NAT router 106 is illustrated, a subscriber and ISP may have multiple NAT routers 119 between the femtocell 105 and the public Internet 102. The NAT router 1 is typically a device located on a subscriber's premises to provide Internet connectivity through ADSL, DSL, ISDN, wireless, leased line, cable modem, or any other type. Although a NAT router 119 is shown, the router could provide a public IP address directly to the personal computer on which the femtocell software is running, thus not requiring the network address translation functionality. The Public Internet 102 shown could be common variations of the Internet with associated routing protocols, such as IP version 4, IP version 6, or a logical network overlayed on the Public Internet 102, such as a virtual private network.

Exemplary Femtocell 105

FIG. 2A is a graphical illustration of the components within an exemplary femtocell 105. In a preferred exemplary embodiment, the femtocell 105 comprises a USB Transceiver Station 106 (USB TS) that is connected to the personal computer 104 through a standard universal serial bus interface 204. The personal computer 104 generally runs a common, commercial operating system such as Microsoft Windows or Linux. The two primary software processes running on the PC 104 are the VoIP client 205 and the Software Defined Radio (SDR) 206. The VoIP client 205 and SDR 206 can utilize numerous libraries and services provided by modern personal computer operating systems, such as DNS, TCP/IP, HTTP, and HTTPS stacks, among others. The VoIP client 205, the SDR 206, and instructions for the microcontroller 209 may also be described as the "femtocell software". The separation of the VoIP Client 205 and the SDR 206 are for illustration purposes, and the two software programs could be combined into a single program.

The SDR 206 provides the primary signal processing, protocol processing, and base station controller (BSC) functionality in executable software code. An example of a Software Defined Radio 206 for a mobile telephony base station is described in "Field Trials of an All-Software GSM Base Station" in the March 2004 edition of RF Design, page 16. The above paper describes a fully functional GSM base station with signal processing, protocol processing, and BSC functionality implemented in software on a server with two 2.8 GHz microprocessors to support 32 traffic channels per server. The processing requirements for the personal computer 203 will be significantly lower, since normal operation of the femtocell 105 would typically support one or two simultaneous calls, although more calls could potentially be supported. In addition, according to a preferred embodiment encoding and decoding of the voice codec such as GSM-EFR is not required within the femtocell 105, reducing CPU load on the SDR 206.

The SDR 206 can provide several benefits. First, the number of hardware components to support the software and calls can be reduced. Commercial BTSs and BSCs are designed for many more simultaneous calls than required by the femtocell 105. Although the SDR 206 and USB TS 106 should provide BTS and BSC services to a MS, common DSPs or ASICs implemented in BTS and BSCs are not required, since the processing for a few simultaneous calls is completed substantially in real time through software. Consequently a software defined radio 206 can reduce component costs while providing the functional needs of the femtocell 105. A second advantage of the software defined radio 206 is the code can be easily updated to enable new features or provide updates, via automatic download from the Internet. If the USB TS 106 hardware supports the appropriate frequencies and has sufficient baseband capabilities, the SDR 206 could potentially support the migration from GSM 2G to UMTS. In this case, some of the digital signed processing (DSP) would likely need to be offloaded from software on the PC 104 to additional hardware digital signal processing in the USB TS 106.

The VoIP Client 205 manages the communication with external servers on the Internet for service delivery, such as remote authentication, registration, call control, media transmission, and media receipt with a jitter buffer. The VoIP client 205 also handles downloading configuration files and software updates, providing a GUI or alternatively invoking a web-based form for a subscriber to provision and manage the femtocell 105 service. The VoIP Client 205 is preferably executable code with associated software libraries for the PC's 104 operating system. In addition, the VoIP 205 client communicates with the Software Defined Radio 206, such as passing media and call control according to an internal interface. In a preferred exemplary embodiment, the VoIP Client 205 and SDR 206 are automatically launched every time the PC 104 is booted.

The VoIP client 205 can implement a standards based VoIP protocol stack such as SIP, IAX2, MGCP, or a proprietary VoIP protocol for communicating with the service provider network 107 or mobile operator network 108. Alternatively, the VoIP client 205 could directly encapsulate the native mobile telephony protocol signaling messages into Internet protocol messages, according to the user datagram protocol (UDP) or transmission control protocol (TCP), for example. In this case with GSM or UMTS messages, transmitted UDP packets from the VoIP client 205 would contain a body with messages in ASN.1 notation, encoded with packed encoding rules (PER) and basic encoding rules (BER), among others, since this is the native format of GSM or UMTS signaling messages.

In this case, even though the VoIP client 205 does not implement a standard VoIP protocol such as SIP or IAX2, the software still functions as a VoIP client since it transmits the voice communications over Internet Protocol. The messages from the VoIP client 205 to the service provider 107 or mobile operator 108 could also be obfuscated or encrypted. Another option is to transmit call control or media from the VoIP client 205 to the service provider 107 or mobile operator 108 through an encrypted logical tunnel.

The VoIP client 205 can run as a background process, with a visual activity icon in the system tray of the PC's 104 desktop to provide a small, but unobtrusive indicator to the subscriber that the femtocell 105 is running and active. The VoIP client 205 and SDR 206 can be downloaded automatically through the Internet 102 upon installation of the USB TS 106, such as when the subscriber plugs the USB TS 106 into the USB port 204 of the personal computer 104 for the first time. In addition, the service provider 107 can periodically update the VoIP client 205 and SDR 206 as new versions of the executable code are released. The VoIP client 205 can also optionally operate as a PC-to-phone client or a PC-to-PC client, so calls could be made through a headset, microphone and speakers, or other audio devices with the personal computer. PC-to-phone and PC-to-PC calling would require the implementation of a codec on the VoIP client 205, as well as appropriate connections to the PC's 104 sound system to record and play out audio substantially in real time. If PC-to-phone or PC-to-PC calling is not implemented, a codec is normally not required on the VoIP client 205, because the VoIP client 205 preferably passes through the audio encoded by the MS.

The VoIP Client 205 and the SDR 206 could also optionally be combined with the operating system of the personal computer 104, or similarly installed as a library shipped with the operating system distribution, or otherwise incorporated into other software on the personal computer, such as integrated into a web browser, media player, or other programs. A subscriber can manually adjust some settings of the VoIP client 205 and femtocell 105, such as the default setting of automatically initializing the femtocell software every time the personal computer 104 is powered. Additional details on the functions and components of the VoIP client 205 will be provided below with discussion of other elements and figures of the present invention.

In a preferred exemplary embodiment, the USB Transceiver Station 106 comprises a USB controller 207, memory 208, a microcontroller 209, baseband processor 210, a radio frequency front end 211, a power amplifier 212, a filter 213, an antenna 214, and a PLMN synchronization unit 215. Power to the USB Transceiver Station 106 is preferably obtained through the physical USB connection to the PC 104. The USB controller 207 establishes and manages the data link with the personal computer 104, and provides sufficient bandwidth for the USB Transceiver Station 106 to handle multiple calls simultaneously. The memory 208 can include both boot software for automatic download of the VoIP client 205 and SDR 206 onto the PC, local programs for operating the microcontroller 209, and random access memory (RAM) for the microcontroller 209. The memory 208 can comprise a combination of flash memory for long-term storage of the boot software and faster RAM for processing and storage of signals, variables, and data by the microcontroller. The flash and RAM could be on a single integrated circuit (IC) or separate ICs. Alternatively, the memory could be combined into the microcontroller 209 and other elements in the USB transceiver station 106. In addition, to support higher transmission powers from the USB transceiver station 106, such as on a farm or in a rural area, power could be supplied through an external AC/DC wall adapter, providing more current than the present maximum level of 500 mA supported by the USB specification. The USB transceiver station 106 may optionally have a LED indicator (not illustrated), providing visual confirmation the femtocell 105 is powered and a visual confirmation when a MS 101 is within range and communicating with the USB transceiver station 106, for example.

The Public Land Mobile Network (PLMN) synchronization unit 215 provides local precise timing for the radio-frequency (RF) front end 211, the baseband processor 210, and the microcontroller 209 to remain synchronized with the surrounding macrocellular mobile network 108, if present. If the femtocell's base station functionality supports handoff between of active calls the femtocell 105 and the surrounding macrocellular network 108, the timing of the femtocell's base station frames should be synchronized with the surrounding BTS. For GSM, the synchronization may not need to be within 1 ms of the surrounding BTS, but the synchronization should preferably be within 20 ms. For CDMA, the synchronization of timing for the femtocell 105 should be much more precise. Since the femtocell 105 is connected to the Internet 102, timing signals with sufficient precision may not be readily available, and the femtocell 105 would likely lack sufficiently precise connection to the timing primary reference source (PRS) implemented on the mobile operator's network 108. Methods such as network time protocol (NTP) generally lack adequate precision due to the inherent jitter and delay on the Internet 102. Other more precise synchronization options such as IEEE 1588 are designed for implementation on a local LAN, and an IEEE 1588 timing source may not be readily available at many subscribers' premises. In addition, the timing signals available from the personal computer 104, if attached, may be insufficient, due to the inherent drift of clock rates common in personal computers. Consequently, in a preferred exemplary embodiment, the USB TS 106 timing can be managed by the PLMN synchronization unit 215, which can be a voltage controlled oscillator adjusted by the microcontroller 209 or the SDR 206 in order for the femtocell's 105 synchronization channel broadcast, in GSM, to remain sufficiently synchronized with the surrounding mobile operator network 108. The timing requirements for the femtocell 105 are more strenuous than traditional MS 101 synchronization, since a MS 101 is not continuously broadcasting a synchronization channel.

Alternatively, if the clock drift on the personal computer 104 can be sufficiently controlled or compensated for via software, then the PLMN synchronization unit 215 may be implemented through software techniques, and not as a separate electrical component such as an oscillator or crystal. If the variation in the personal computer clock drift is low, sufficient timing adjustments could be made by monitoring the synchronization channel of a remote BTS, applying the timing advance, and synchronizing the local timing of the USB transceiver station 106 with the macrocellular network 108. In this case, the software and logical steps for the femtocell synchronization channel to closely match the mobile network timing would constitute a PLMN synchronization unit 215. If a BCCH, RACH, and timing advance are not available from a surrounding BTS, the local timing generated by an oscillator such as the PLMN synchronization unit in the USB transceiver station 106 may be required for the femtocell 105 to properly synchronize a MS 101 to the femtocell timing.

The antenna 214 of USB TS 106 can receive and transmit radio signals in the frequency of operation for the USB Transceiver Station 106. Also separate antennas for reception and transmission could be implemented. The antenna 214 is shown as integrated within the USB TS 106 according to a preferred exemplary embodiment, but the antenna 214 could optionally be connected to the USB TS 106 externally, to support a greater range in rural areas or higher power transmission levels, for instance. In order to support multiple mobile network standards and frequencies, the antenna 214 can preferably be a tunable antenna, which can change resonance frequencies for effective and transmission and reception over a range frequency bands, such as GSM 900 and GSM 1800. Alternatively, more than one antenna could be implemented on the USB TS 106, such as a different antenna for each principle frequency range, such as 900 Mhz or 1800 Mhz. If the femtocell hardware is manufactured to support a single frequency range, such as GSM 900, then a tunable antenna may not be required. The power amplifier 212 amplifies the transmit signals received from the RF front end 211. Although the femtocell 105 would typically transmit at average power levels less than 50 mW and generally less than 25 mW, the preferred embodiment includes a power amplifier 212 since these power levels are usually not supported directly from low-cost, "off the shelf" RF font ends 211 intended for mass distribution to subscribers. The femtocell 105 could also be designed to support a larger range than a subscriber's residence, such as an entire apartment building or a small office building, and in this case the average transmit power level of the femtocell could be increased to levels such as 200 mW.

The filter 213 can provide bandpass filtering and enhances the signal-to-noise ratio of the radio signals received by the antenna 214 within the operating frequency range of the femtocell 105, which could comprise of SAW filters, for example. The RF front end 211 manages the conversion of signals between the radio signals and intermediate frequencies. For the processing of received radio frequency input, the RF front end 211 may include low-noise amplifiers, bandpass filters, and a matching circuit. For the processing of transmitted signals, the RF front end 211 may include a phase detector, a voltage controlled crystal oscillator, amplifiers, and a mixer. In general, the radio components of the RF front end 211 are well known to one of ordinary skill in the art, and the present invention leverages this widespread commercial use and knowledge of an RF front end and baseband processing in a novel manner. One example of a commercial RF front end 211 to support GSM base station functionality for the femtocell 105 may include the Si4200 "Integrated Transceiver for Multi-band GMS/GPRS" from Silicon Laboratories, together with the Si4201 "Universal Baseband Interface" and supporting components. Many other RF front ends and configurations could be implemented as well.

For example, the RF front end 211 can support multiple wireless standards such as GSM, EDGE, UMTS, and CDMA 2000/2001. In order to support multiple standards, the baseband processor 210 of the USB TS 106 may be combined with the RF front end 211 (not illustrated), providing digital inputs and outputs into the into the combined RF front end/baseband processor. A further advantage of designing the USB Transceiver Station 106 with a digital interfaces into the RF front end 211 (not illustrated) is the device can be shipped and installed at subscribers premises, and the software defined radio 206 can be later updated to support new standards, such as if a mobile operator 108 upgrades their network from GSM to UMTS over time, or the service provider 107 subsequently decides to support cordless phone standards such as DECT after the USB TS 106 has been installed.

A flexible RF front end 211 would likely result in higher equipment costs than with the "off the shelf" components currently available, when compared to the component costs with an RF front end 211 specific to one or two related mobile network standards. However, the cost for combined baseband processor/RF front end components is expected to continue to fall. Digital inputs into the RF front end 211 are not required for the USB TS 106 to support multiple mobile network standards, however.

Another benefit of a RF front end 211 that can support multiple standards and a range of radio frequencies is that an unlicensed spectrum could also be supported, if also implemented on the MS 101. In a preferred embodiment, a MS 101 in existing widespread commercial use (such as regular GSM 900, GSM 1800, UMTS, or CDMA2000) would extend its transmit and receive frequency range to the unlicensed spectrum of approximately 2.4-2.5 GHz common for 802.11 equipment or cordless phones in the 902-928 MHz range in the US, for example. The USB Transceiver Station 106 could also transmit and receive in the unlicensed spectrum. However, instead of transmitting using 802.11 as the data link layer for example, which typically uses more power and has less range for a given power level compared to a layer 2 protocol designed for voice such as GSM, both the MS 101 and femtocell 105 would implement the equivalent of an absolute radio frequency channel number (ARFCN) or other mobile standard in the unlicensed mobile spectrum.

The benefit would likely be further reduced interference with the licensed spectrum, and potentially higher transmission powers at the femtocell 105 could be implemented. For instance, the femtocell 105 could transmit at an average power level of 20 mW in the unlicensed spectrum, which would be concentrated in the relatively narrow frequency range of a 200 KHz channel, providing a potentially clear and long-ranger channel to the MS 101 than a standard analog cordless phone, assuming the MS 101 could support the configuration. Other configurations are possible to one of ordinary skill in the art, based on the use of a flexible RF front end 211 and a software defined radio 206. Another example is the femtocell 105 could implement support for a DECT cordless phone operating at either 1880-1900 MHz to support the European standard, or 1920-1930 MHz for the US.

The baseband processor 210 preferably converts the intermediate frequency as an analog input into a digital baseband output for further processing by (i) the microcontroller 209 or (ii) a GMSK modulator (not shown) for received radio signals, and digital input to the analog intermediate frequency for radio transmission. The analog signals for transmission are sent to the RF front end 211 for conversion into the radio frequencies. A low-cost femtocell solution dedicated to GSM may deploy a baseband processor 210 specifically supporting GSM specifications. In a preferred exemplary embodiment to support a GSM base station functionality for a femtocell 105, the In-Phase (I) and Quadrature (Q) signals can be processed by "off the shelf" components such as the Atmel ASF03 GSM baseband transmit port and the Atmel ASF08 GSM baseband receive port. Thus, the single baseband processor 210 illustrated could comprise more than a single IC. Many other configurations for baseband processors 210 could be used as well. The baseband processor may also perform the GMSK modulation. Alternatively, in the embodiment where the femtocell 105 is designed to support multiple mobile network standards (such as GSM, UMTS, CDMA2000, etc.) a wideband analog-to-digital and digital-to-analog converter could be implemented instead of the baseband processor 210, if (i) the RF front end 211 has analog I and Q interfaces instead of the optional digital interfaces previously described, and (ii) the RF front end 211 supports the additional frequency ranges. In this case, with a USB 2.0 connection, interface 204 would likely be required with a USB TS 106, and the microcontroller 209 may also be used to compress the waveform for transmission across the USB interface 204. The component costs for a wideband A/D and D/A may be higher than implementing baseband processors 210 specially designed for various mobile network standards.

The microcontroller 209 can comprise a general purpose processor. The microcontroller 209 may serve both as a client on the USB transceiver station 106 to manage communication with the software defined radio 206 through the USB port 204 and as a preprocessor for computation of signals to be transmitted to or from the baseband processor 210 or the RF front end 211. For example, the microcontroller 209 can operate as a Gaussian minimum shift keying (GMSK) modulator for the baseband processor 210, if the femtocell 105 is operating as a GSM base station. Alternatively, the GMSK modulation could be implemented in separate hardware on the USB transceiver station 106, such as a separate GMSK modulator IC (not shown), or within the software defined radio 206. However, according to an exemplary preferred embodiment, the GMSK modulation is performed on the USB TS 106, in order to reduce the bandwidth required for communication across the USB port. With the femtocell 105 operating as a base station in a single GSM ARFCN channel and also with GMSK modulation on the USB TS 106, the bandwidth required to communicate between the microcontroller 209 and the SDR 206 should be approximately 270.8 kbps for the channel, plus some additional overhead bandwidth for the communication protocol and control signals between the client on the microcontroller 209 and the host within the SDR 206.

Some of the computation requirements could be shared between the general purpose microprocessor within a PC 104 and the microcontroller 209. In a preferred exemplary embodiment, the microcontroller 209 is responsible for maintaining a state machine for the USB transceiver station 106 and managing adjustments to the PLMN synchronization unit 215 in order for the femtocell 105 timing to remain synchronized with the surrounding mobile operator network 108, if present. The microcontroller 209 may also tune the frequency the RF front end 211 transmits and receives.

When operating as a client for communicating with the SDR 206 through the USB port 204, the microcontroller 209 preferably implements a data buffer to reduce time variance in the flow of data from the SDR 206 to the baseband processor 210 or GMSK modulator, if the GMSK modulator is implemented as a separate IC (not shown). Since a USB port 204 is half-duplex, the transmission of data from the SDR 206 to the USB TS 106 will likely have temporary gaps, preferably less than 0.10 ms, introduced when the USB port 204 changes from transmit mode to receive mode with the personal computer 104 host controller, or also gaps in data flow introduced when the USB port 204 switches to support data transfers with other low-bandwidth devices on the same USB port 204 such as a keyboard or a mouse. One example of a microcontroller 209 is the 32 bit LPC2142 from NXP N.V. and many others are possible as well.

The microcontroller 209 can also manage the communication of the digital baseband signal with the SDR 206 across the USB port 204. If the GMSK modulation is performed within the SDR 206, the microcontroller 209 manages the transmission of a digitized representation of the baseband analog signal, assuming the USB port 204 supports at least the USB 2.0 standard. For example, if the baseband analog signal is at 270 Khz, sampled at 3 times per cycle and a resolution of 10 bits, the digitized baseband analog signal would be approximately 8.1 mpbs. The bi-directional transmission of the digitized baseband analog signal would likely exceed the bandwidth of a USB 1.1 port of approximately 12 mpbs. The microcontroller could also perform low-loss compression through waveform coding to reduce the bandwidth required to transmit the digitized baseband analog signal through the USB port 204, and the SDR 206 could reverse the waveform coding before processing the digitized analog baseband signal according to GMSK modulation for GSM or Quadrature Phase Shift Keying (QPSK) for UMTS, CDMA, or CDMA2000.

If the personal computer 104 has a momentary spike in CPU load of 500 ms for example, such as when a new program is launched on the PC 104, the overall performance of the femtocell 105 could be more impaired without a microcontroller 209. During the spike in CPU load on the PC 104, the microcontroller 209 could temporarily store received data from the radio network in the memory 208, and then forward the data to the software defined radio 206 when CPU load has returned to normal. In addition, the data buffer within the microcontroller 209 can smooth the temporary gaps in received data from the PC 104. Although a microcontroller 209 is shown, its functionality may be combined with other elements. For example the microcontroller 209 could be combined (not illustrated) with the baseband processor 210, which is frequently found in commercial mobile phone handsets. Alternatively, if the microcontroller 209 has sufficient processing power, the software defined radio 206 could be operated by the microcontroller 209 instead of running on the personal computer.

The USB controller 207 provides the industry standard universal serial bus connection to the personal computer 104, allowing data transfer with the USB transceiver station 106 and providing power. The USB controller 207 provides approximately 12 mbps throughput as version 1.1 or up to 480 mbps as version 2.0, and consequently version 2.0 is a preferred exemplary embodiment as of this writing. In a preferred design of the femtocell 105 to support the GSM standard, the USB 1.1 bandwidth capabilities should suffice. The benefits of the USB connection include high data throughput, power, a standard physical interface worldwide, ease of installation by subscribers, and ease of portability for the USB transceiver station 106, among others.

With sufficient compactness of the USB transceiver station 106, a preferred and exemplary physical form factor would be slightly larger than a "USB memory stick" about the same size as a "USB Ethernet port adapter." This preferred and exemplary form factor is convenient for subscribers, since it can be easily transported or stored, while simultaneously reducing material costs. Additional components not shown in USB TS 106 would likely be required to connect the example elements of the USB transceiver station, such as a circuit board, resistors, capacitors, and possibly a digital latch, which would be well known to one of ordinary skill in the art. Several elements of the USB transceiver station 106 could also be combined, and the USB transceiver station 106 could be integrated into the personal computer 203. The USB controller 207 may be integrated into the microcontroller 209. Additional home or office networking functionality may also be combined with the USB transceiver station 106. For example, the USB transceiver station 106 could include an 802.11 client, allowing the attached personal computer or laptop 104 to connect to a remote Wi-Fi access point. This configuration would be particularly beneficial in the case where the personal 104 computer does not have a built in Wi-Fi adapter and is not co-located or cabled to the broadband Internet connection 102, and the broadband Internet connection 102 is capable of serving as an access point, such as with a Wi-Fi router, or similar network configurations. The USB TS 106 may also operate as an 802.11 host.

Other logical and physical configurations of the femtocell 105 are possible. Referring briefly to FIG. 2B, the femtocell 105 may be manufactured as an entirely "stand alone" unit without the need for a personal computer 104. The various functions such as the VoIP client 205, the software defined radio 206, the microcontroller 209, and the radio frequency front end 211 could be contained within a single housing or unit 105/106, similar to a Wi-Fi router and powered from a wall adapter or battery. In this exemplary configuration, the "stand alone" unit would need to be connected to the Internet 102 in order to provide VoIP functionality. In addition, the form factor and component costs would likely not be as reduced as the USB transceiver station 106, due to the need for additional hardware, such as an application specific integrated circuit (ASIC) similar to the circuits in mobile phones and macrocellular base stations, with supporting circuitry. The ASIC can provide many of the functions of the VoIP client, SDR, and microcontroller. The "stand alone" unit can also implement a more general purpose CPU to operate some functions of the VoIP client 205, SDR 206, and microcontroller 209 in running software and other functions in hardware.

VoIP Client 205/SDR 206

Figure 3:
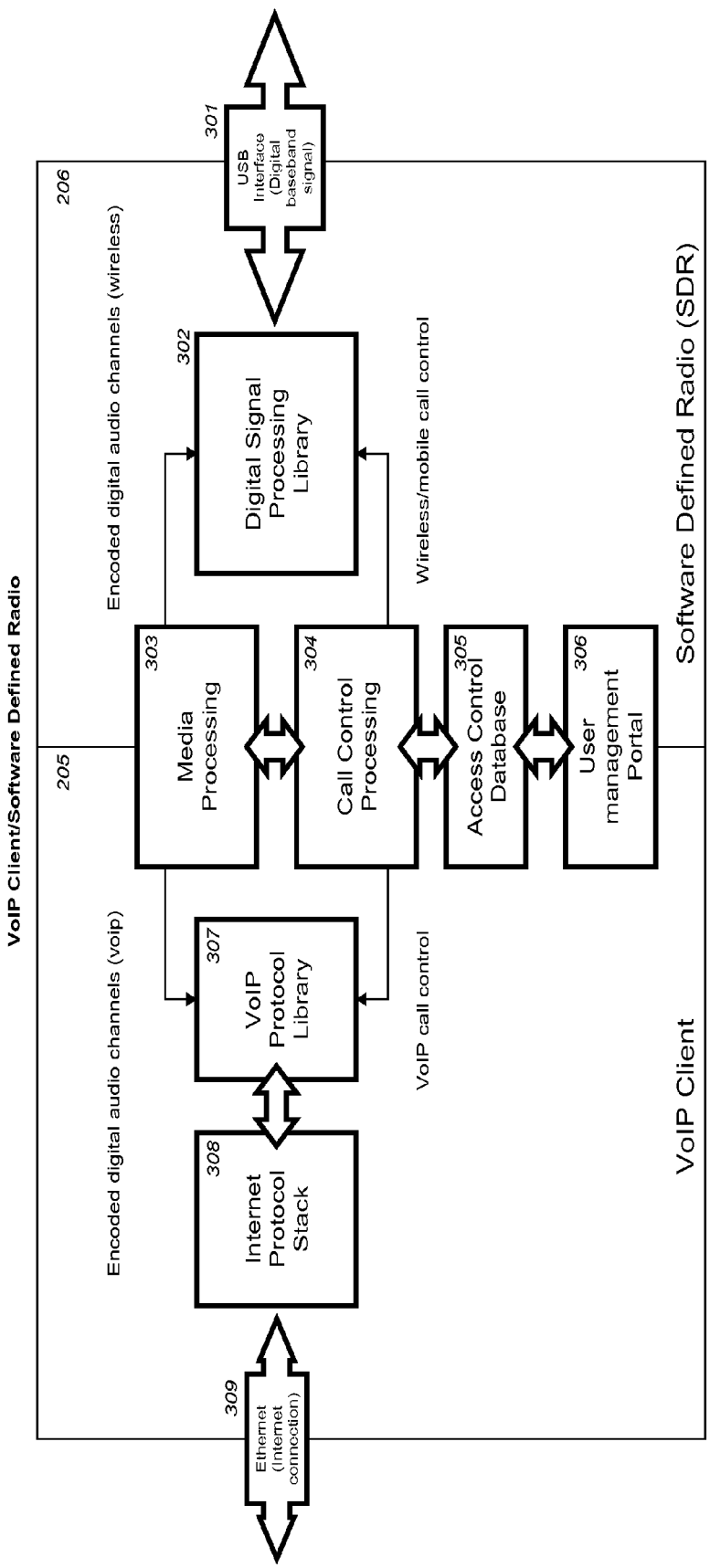
FIG. 3 is a graphical illustration of the components within a software defined radio according to one exemplary embodiment of the invention.

FIG. 3 is a graphical illustration of the VoIP client 205 and SDR 206 within an exemplary femtocell 105 in FIG. 2A. The software defined radio 206 comprises of a USB interface library 301, Digital Signal Processing (DSP) Library 302, Media Processing (MP) library 303, Call Control (CC) library 304, Access Control database 305, and User Management Portal (UMP) 306. The VoIP client 205 may share the media processing library 303, call control library 304, access control database 305 and user management portal 306 with the SDR 206. The VoIP client 205 may further comprise a VoIP library 307, Internet Protocol (IP) library stack 308 and Ethernet connection stack 309. All of these software modules may be integrated to run in a personal computer generally setup with a common general purpose operating system such as Microsoft Windows or Linux.

The USB interface library 301 and IP library stack 308 may be provided by the operating system of the PC 104. In addition, although an Ethernet connection is shown, other standard networking technologies could be supported for the LAN, such as Wi-Fi. According to the a preferred exemplary embodiment, a primary function of the SDR 206 is to provide base station controller and base transceiver station functionality for a limited number of communication channels, such as one or two that would commonly be supported by the femtocell 105. In this configuration, the need for ASICs or associated hardware that are typically sold by vendors to implement BSC and BTS functionality can be avoided. In addition, an SDR 206 may allow for the flexibility in radio signal processing and may serve as a platform adaptable to multiple radio spectrums for multi-band operations required in GSM, EDGE, UMTS, CDMA 2000/2001, and future wireless communication standards under development.

The DSP library 302 serves as the basis of signal processing module for real-time processing and transformation between baseband user voice and data and a sampled representation of the digitized waveform signals. According to a preferred exemplary embodiment, the DSP library 302 manages ciphering of the bit stream to the MS 101 if ciphering is enabled. In addition, if the femtocell 105 communicates media with a gateway 109 or VoIP phone 111 that does not support the codecs available on the MS 101, then the DSP library 302 preferably performs the necessary transcoding. For example, the DSP library may perform GMSK modulation for the femtocell 105, if the GSM standard is implemented and the USB TS 106 does not perform GMSK modulation. The MP library 303 and call control function in library 304 are programmed to operate on multiple frequency bands to support the preferred communication channels available for the mobile station 101 to use. This type of advanced radio resource management is preferred when operating the femtocell 105 in licensed radio spectrum, when multiple mobile network operators' BTS may be within range of the femtocell 105, and only certain frequencies are allowed. In particular, the libraries 303/304 can manage both a scanning function to detect the presence of other wireless base stations in a specified frequency range and also manage the selected communication channel setup with mobile station channels.

By scanning an allowed frequency range or channels, the femtocell 105 can determine a channel with less interference within the licensed frequency range of the mobile station 101 and broadcast its services with signal strength high enough to be the dominant or preferred base station once a mobile station 101 enters its service range. The access control database 305 can track the mobile station 101 entering the service range.

The VoIP client 205 and SDR 206 can support either (i) enabling specified mobile stations 101 via the user management portal 306 as a standalone femtocell 105 during provisioning, or (ii) network carrier pass-thru to a wireless mobile switching center for connection and mobility management control in infrastructure mode of operation as a remote basestation for a network carrier. In either case, the call control processing system 304 will use either internal access control data in the access control database 305, or remote access data from the service provider, to authenticate a mobile station 101 for calling through the femtocell 105. For example, the access control database 305 may store a list of authorized MS 101 locally, so that each time a new MS 101 communicates with the femtocell 105, the femtocell 105 may not need to query the central database of the service provider 107 or the mobile operator 108.

Once the mobile station 101 is authenticated, media and call control are translated by media processing 303 and call control processing 304 between VoIP protocol library 307 (including SIP, IAX2, or other protocols communicating with the IP stack 308) and wireless mobile technologies (for example, GSM, EDGE, UMTS, CDMA 2000). For example, when operating as a GSM base station, the call control processing 304 may implement a software module to process Layer 3 call control messages according to the GSM 04.07 3.9.0 specification. This software module could contain an ASN.1 parser to convert a CC-SETUP command, indicating a telephone number has been dialed by the MS 101, into a call setup request to be subsequently handled by the VoIP library to place the outbound telephone call.

Also when operating as a GSM base station, the media processing 303 may process the channel coded incoming GSM-EFR bit stream from the MS 101 at 22.8 kbps into the corresponding 20 ms, 244 bit frames for transmission by the VoIP protocol library 307, representing a bit rate of 12.2 kbps. Thus, the media processing library could implement algorithms according to the GSM 05.03 specification. The VoIP protocol library 307 can be setup to operate in a pass-thru mode to forward encoded audio from the SDR 206 directly to VoIP call termination servers, such as the gateway 109, without further transcoding to maximize overall call quality. The VoIP protocol library 307 may implement standard VoIP capabilities, such as a VoIP call control stack for the setup and teardown of calls, a registration function to support secure MD5 registration with a VoIP server, and a jitter buffer. According to an exemplary preferred embodiment, the VoIP protocol library implements functions provided by the Jaxcomm open source library.

This VoIP client 205 and SDR 206 design can be well suited for a modern, "low end" personal computer 104 with a 750 Mhz CPU and 256 Mb of RAM. Through applying the calculations in the report "Estimating the Computational Requirements of a Software GSM Basestation" in the 1997 IEEE International Conference on Communications, pg. 169, less than 15% of the CPU of the PC 104 may be normally utilized to support one simultaneous call, where the voice codec is not decoded, but rather simply passed through to be decoded by the gateway 109, (assuming the gateway 109 also supports the codec implemented on the MS 101). Other mobile network standards such as UMTS would likely require additional CPU resources of the PC 101, although additional hardware in the USB transceiver station 106 could help offload some of the software processing in the SDR 206.

System 400 to Configure Femtocell 105

FIG. 4 is a graphical illustration of a system 400 to configure a femtocell 105 for (i) communicating with both the service provider network 107, (ii) communicating with a mobile operator network 108, and (iii) operating as a base station, including various exemplary servers operated in the service provider network 107. The femtocell 105 generally requires femtocell configuration data 402 in order to establish communication with the service provider network 107.

The femtocell configuration data 402 is provided via a file downloaded from the configuration server 403 upon powering on or rebooting the femtocell 105, if an updated version of the configuration data 402 has been placed on the configuration server 403. The configuration data 402 is stored locally on the personal computer 104 hard drive or flash memory of the USB transceiver station 106, and periodically updated by the service provider 107 as updates to the configuration data 402 or individual configuration parameters are made. Once the configuration file is downloaded to the femtocell 105 and applied to the femtocell's running configuration, the femtocell 105 can begin registering with the VoIP Server 406 and operating as a mobile network base station. After the MS 101 is attached to the femtocell 105, subscribers can begin placing or receiving calls with other devices such as the VoIP phone 111 or the gateway 109 to the PSTN to call a landline or mobile telephone 110. Additional details on the steps required to connect the MS with the femtocell 105 will be described below in additional drawings and diagrams.

The femtocell 105 configuration data 402 includes several parameters required in a preferred embodiment for the femtocell 105 to establish communication with both the service provider and the MS. Parameters shown within 402 may include the VoIP ID, VoIP password, configuration server file path, web server, base station identity code, PLMN synchronization interval, network display name, cell global identification, femtocell ID, proxy server name, allowed ARFCN (for GSM configurations), maximum average transmit power level, and other configuration parameters. Some of the configuration parameters could also be omitted.

In the preferred exemplary embodiment, the femtocell ID 410 is unique to each USB transceiver station 106, and can be a useful parameter to maintain security even if ciphering between the femtocell 105 and MS 101 is disabled. The femtocell ID could also conform to existing hardware numbering standards, such as implementing international mobile equipment identity number (IEMI), or a media access control (MAC) address. A more detailed description of the configuration file 402 will be described below, to help explain the operation of the hardware, software, and overall service. The configuration data shown in 402 could be transmitted as a single file, or they could be stored and transmitted individually, allowing separate update of the parameters without downloading the entire file. For example, if the service provider wishes to change the VoIP server 406 from iax01.go2callsoftware.com to iax02.go2callsoftware.com, a single XML transaction or similar request with the femtocell 105 could specify a new VoIP server 406.

The file path for the configuration file is shown as https, in order to maintain security and confidentiality of the configuration file as it is transmitted across the Internet 102. Other secure methods for transmitting the configuration data 402 to the femtocell 105 could be implemented. Although a single femtocell 105 is shown in FIG. 4, the system 400 can support a plurality of femtocells 105. Likewise, although a single instance of each type of server is shown, the service provider network 107 could include many different servers distributed geographically. The web server 413 supports provisioning requests from a subscriber's PC 104, and may also be utilized for data transactions between the VoIP client 205 and the mobile operator 108. Further, the functions of the various servers illustrated could be combined.

In a preferred exemplary embodiment, the configuration data 402 is created or updated by a server script or database query when (i) the subscriber signs up for the femtocell service or (ii) when a customer service representative from the mobile operator 108 assigns a specific USB transceiver station 106 to a particular subscriber. Upon creation of the configuration file, it may be stored in the configuration server 403, in order for the file to be readily accessible by the femtocell. The configuration server 406 preferably delivers the configuration file 500 securely via https, and thus the configuration server 403 can also be a specialized web server, such as Apache. Until the subscriber is provisioned, it may be difficult to know which subscriber will be assigned to which femtocell 105, although that association may not be required by the mobile operator 108 or service provider 107. In addition, the femtocell 105 may not be associated with a particular mobile operator network 108 before provisioning, so the licensed frequency ranges for the femtocell 105 to implement when operating as a base station may not be known, and thus proper configuration of the femtocell 105 may be an important part of establishing service with the subscriber. The service provider database 412 can serve as a central repository for the storage of authentication information with the service provider, subscriber information, call routing, and billing information. The service provider database 412 may be a commercial database such as Oracle. In addition, the service provider database 412 may be distributed across several servers to support both reliability and scale of the service provider's network 107.

Femtocell Configuration File 500

FIG. 5 is an illustration of the femtocell configuration data 402 arranged in a femtocell configuration file 500 and stored on a configuration server 403, according to a preferred exemplary embodiment. The parameters shown are for an exemplary GSM base station, although other mobile standards could be supported, with similar parameters. The VoIP ID 501 and password 502 are used to authenticate messages between the femtocell 105 and the VoIP server 406. In the preferred embodiment, the secure password is not sent directly over the Internet 102 during the VoIP registration process, but rather registration messages are secured via a combination of a hash function of a random number and the password, which is well known in the art. The VoIP password could also be omitted from the configuration file 500, and written into flash memory of the femtocell 105. The configuration file 503 is the path to locate the file, and where the femtocell 105 can obtain an updated configuration, generally after initial provisioning of the femtocell 105. The Base Station Identity Code (BSIC) 504 is the standard base station identity code for a GSM network, and consists of the Network Color Code (NCC) and the Base Station Color Code (BCC). The Network Display Name 505 represents the name to appear on the MS handset screen when the MS 101 is attached to the femtocell 105, so the subscriber knows their service will be transmitted through the VoIP network 107 (at potentially lower service charges) than the regular mobile network 108. The Network Display Name 505 would normally be transmitted to the MS from the femtocell 105 using the Cell Broadcast Channel according to the GSM standard.

The Cell Global Identification 506 identifies the femtocell 105 as a base station on the mobile network 108, consisting of the MCC, MNC, LAI, and CI. The MCC and MNC components of this number will reflect the mobile operator's network 108. The MCC and MNC can be useful for the femtocell when it initiates as a scanner to determine which nearby macrocellular BTS, if any, belong to the mobile operator, in order to avoid broadcasting on those channels and reduce interference. The location area identifier could be set for all femtocells 105 or groups of femtocells 105, so that they represent a new area that would not match any other areas on the mobile operator's network 108, with a corresponding VLR to manage the femtocells. Alternatively, the mobile operator could obtain a new mobile network code to represent the femtocell network, for both the femtocells and the subscriber SIMs signing up for femtocell service. The cell identity component is 16 bits, representing over 65,000 possible femtocells 105, so some CI would likely need to be repeated on a network with hundreds of thousands of femtocells 105, if they all implemented the same LAI. If the mobile operator allocated a unique mobile network code (MNC) to the subscribers with femtocell service, the additional 32 bits in the LAI and CI should be sufficient to uniquely identify each femtocell, even for a very large network. For the example Cell Global Identification 506, the MCC corresponds to Belgium and the MNC corresponds to Proximus. The LAI is the 2 octet decimal value of 12345 and the CI is the 2 octet decimal value 54321.

The unique femtocell ID 507 is assigned to the USB Transceiver station 106 during manufacturing and generally will not change and should not be reconfigured by the subscriber. This parameter will also be described during later discussions of secure authentication of the subscriber. The femtocell ID 507 could also be combined with the VoIP ID, so that the VoIP client registers with the VoIP server 406 using the femtocell ID, for instance. The VoIP server address 509 is the primary server on the Internet for the VoIP client to register with and communicate call control. The backup VoIP server address 510 is a backup VoIP server in case the primary server is unreachable. For example, if a temporary outage impairs communication between the femtocell 105 and the primary server at some leg of the transmission path between the femtocell 105 and the primary VoIP server 406 on the public Internet 102 (as may happen with a cut cable or a power outage at a data center), the femtocell 105 can leverage a backup server 406 (not illustrated). In a preferred exemplary embodiment, the primary and secondary servers 406 (not illustrated) would be in separate physical locations and connected to the Internet 102 with different ISPs. The single reference illustrated for the primary and backup servers 406 could represent multiple physical servers, through techniques such as domain name service (DNS) round robin. Additional servers 406 could be included in the configuration parameters for the femtocell 105.

The port number 511 is the IP UDP or TCP port number on the VoIP server 406 for the femtocell 105 to contact. The port number shown in the example is the well known port for the IAX2 protocol. Other ports and protocols could be used, such as 5060 for SIP. Although not shown, a backup port or multiple ports could also be implemented.

The allowed Absolute Radio Frequency Channel Number (ARFCN) 512 represents the allowed frequencies for the base station to transmit, when the femtocell 105 operates as a GSM base station. These frequencies will also represent the ranges the femtocell 105 will initially scan, in order to implement a broadcast frequency with the lowest level of interference with the macrocellular network 108. The allowed frequencies should match the licensed spectrum authorized to the mobile operator 108 and also the range of frequencies the subscribers' MS 101 will scan in order to find appropriate base stations. Although ARFCN channels are shown, a specific list of frequencies could be specified. In addition, the allowed frequencies could be dynamically assigned based upon the geographical location of the end user, and in a preferred embodiment the subscriber submits their street address and postal code to the service provider database 412 when the femtocell service is provisioned, so the service provider 107 and mobile operator 108 can track the femtocell's 105 geographical location. An operator 108 may have different licensed spectrum in different cities, so the allowed frequencies in the configuration file 500 could be adjusted depending on the subscribers' city, or best suited to the subscribers address.

The maximum power level 513 is the maximum average transmit power the femtocell 105 will implement, per active call. This parameter assists with reducing interference with the macrocellular network 108, and can be adjusted based on several variables. If the subscriber's address is in a rural location or the scanning results show low receipt powers levels from the macrocellular network 108, then the maximum power level 513 of the femtocell 105 could be set to a higher value, such as 100 mW. If the femtocell scanning of the allowed frequencies 512 shows relatively high received powers, with the lowest received power being a high number such as −60 dBm, such as in dense urban environment, the maximum power level of the femtocell 105 could be set to a lower value, such as 20 mW. Although not shown, a separate "maximum MS power level" could be implemented, to specify the maximum power level the femtocell 105 will allow the MS to transmit. In addition, the femtocell 105 may not transmit data during unused time slots, further reducing the average power transmitted and helping to reduce interference with the macrocellular network or other femtocells.

The registration interval 514 specifies the frequency the femtocell VoIP client 205 will register with the VoIP server 406. In a preferred exemplary embodiment, the femtocell 105 registers whenever the femtocell 105 is powered and operational, even if the MS 101 is not present. This allows the service provider 107 to more closely monitor and manage the endpoints on the VoIP network. Alternatively, the femtocell 105 could only register when it has a MS 101 connected and idle. In order to keep the NAT ports on the NAT router 119 open and properly bound, the VoIP client 205 may send other messages to the VoIP server 406 more frequently than the registration interval. The web server 515 identifies the web server 413 for the femtocell 105 to communicate messages that are not sent to the VoIP server 406, which are primarily call control message related to MS 101 authentication, handover, or SMS delivery in a preferred embodiment. For example, authorization requests may be sent securely to the web server 413 when the MS attempts a Location Update request with the femtocell 105. When the MS 101 is in the femtocell range, the VoIP client 205 maintains a connection to the web server 413. In the preferred embodiment SMS messages are sent via the https connection between the VoIP client 205 and the web server 413, representing a path for data transactions between the femtocell 105 and the mobile operator 108. Other configurations for data transactions between the femtocell 105 and mobile operator 108 are possible, such as sending Location Update authorization requests by the MS 101 from the VoIP client 310 to the VoIP server 406, or receiving and transmitting SMS messages from the mobile operator 108 through the VoIP server 406. Although one web server address is shown, multiple web server addresses could be implemented. Additional details for the data connections and message flows through the web server 406 will be provided in FIGS. 6 and 10.

The Max CPU Load 516 can be used to determine the maximum CPU usage on the PC over a measured interval before the SDR 206 automatically disables the base station transmission, preferably not during an active call. This allows the service provider to more closely manage the subscriber experience and quality of service. If the PC 104 is busy and the femtocell 105 is not allocated sufficient processing power, the performance may be degraded. With sufficient service degradation, both the subscriber and the service provider 107 would prefer to use the macrocellular network 108 as opposed to service through the femtocell 105. This automatic, temporary disabling of service would also apply to the Max packet loss parameter 519. If the packet loss between the femtocell 105 and the VoIP server 406 exceeds this threshold for a sustained period, such as the previous 5 minutes, radio transmissions from the femtocell 105 could be temporarily disabled. The Max subscribers 517 and Max simultaneous calls 518 provide limitations on the number of MS 101 that can attach to the femtocell 105 and make calls simultaneously, respectively.

The Media trunking parameter 520 indicates if media from multiple simultaneous calls from the femtocell 105 to the VoIP server 406 will be combined into larger packets. This parameter can be used to reduce the bandwidth utilization and improve VoIP client 205 performance for audio from the femtocell 105 to the VoIP server 406. For example, if the femtocell 105 is handling three calls simultaneously and transmitting 20 ms GSM-EFR audio frames for each call with full UDP and RTP headers, such as with standard SIP, approximately 86 kbps of bandwidth in the upstream is required, excluding other potential packet headers such as PPP or Ethernet which will further increase the bandwidth. Many DSL connections are asymmetric, and the bandwidth uplink is often less than the bandwidth downlink.

Thus, to conserve bandwidth with media trunking 520 enabled, the VoIP client 205 could combine the three separate media streams totaling 150 packets per second into one "trunked" media stream with 50 packets per second, but larger packets reflecting each packet contains audio from the three simultaneous calls. With media trunking for the three example simultaneous calls with the GSM-EFR codec and 20 ms frames, the bandwidth would be reduced from approximately 86 kbps to 54 kbps. Another advantage of trunking is reduced CPU load on the personal computer 104, since fewer IP packets need to be processed. The VoIP server 406 could also trunk media to the VoIP client 205, to reduce the downlink bandwidth for multiple simultaneous calls.

The Forward Error Correction Low Threshold parameter 521 specifies the level of the measured packet loss from the femtocell 105 to the VoIP server 406 where the femtocell 105 will begin to implement forward error correction. Both the femtocell 105 and the VoIP server can monitor the packet loss in their transmit direction via reports such as RTCP reports, if the RTP protocol is implemented to transmit media. IAX2 also supports reporting of the media quality from the receive side back to the transmit side while a call is in progress. For the example 2% threshold shown in 521, if the measured packet loss is more than 2%, the voice quality will degrade and the femtocell 105 or VoIP server 406 can begin to implement forward error correction techniques such as packet duplication, or other forward error correction codes as outlined in "Comparisons of FEC and Codec Robustness on VoIP Quality and Bandwidth Efficiency" by Wenyu Jiang and Henning Schulzrinne at Columbia University, which was submitted to World Scientific on Jun. 5, 2002. Forward error correction (FEC) is particularly helpful on DSL connections that are far removed from the central office, which may be subject to packet loss and bit errors. For example, packet loss on DSL connections can be observed on some connections under high temperatures, such as in desert conditions in the summer, and use of FEC can help compensate for the shortcomings of those Internet connections.

The Max Delay 522 and Max Jitter 523 parameters specify the highest level of packet delay and jitter the femtocell 105 may tolerate before temporarily disabling the base station transmission until the Internet network conditions between the VoIP server 406 and the femtocell 105 return to acceptable levels. Intentionally disabling the base transceiver station functionality may optionally be limited to times when no calls are actively in progress. The Max Delay could be either the one-way delay from the femtocell 105 to the VoIP Server 406, or the round trip delay. Separate delay thresholds could be implemented for each direction. Likewise, the Max Jitter parameter specifies the maximum jitter allowed, above this level the MS 101 should use the macrocell network 108 for making and receiving calls. In the preferred exemplary embodiment the jitter level is the standard deviation of packet arrival times from the VoIP Server 406 to the femtocell 105 over an average interval such as the previous 30 seconds during media transmission, although other measures of jitter could be implemented. Jitter can also be measured by the VoIP client 205 when the MS 101 is idle or away from the base station via the VoIP Server response to POKE requests sent every minute, and a statistical sample for jitter could be acquired through several measurements over an interval such as 15 minutes.

Alternatively, the separate parameters such as max packet loss 519, max jitter 523, and max delay 522 could be combined into a mathematical model of the mean opinion score (MOS) of the received voice, and if the MOS falls below a certain value, the femtocell radio broadcast functionality could be temporarily disabled. The purpose of the parameters 519-523 shown in FIG. 5 is to illustrate the many different VoIP quality measurements the femtocell 105 can implement in order to monitor and potentially improve the call quality. In a similar manner, the VoIP server 406 can maintain parameters such as the listed parameters 516 through 523, and if the network quality degrades to a threshold level, the VoIP server 406 can instruct the femtocell 105 to temporarily disable base transceiver transmissions, preferably when no calls are active.

For example, if the FEC low threshold 521 on the server 406 is also 2%, then the server 406 can begin implementing FEC codes on the media transmitted to the femtocell 105 to improve quality and compensate for the measured packet from the VoIP server 406 to the femtocell 105. The VoIP Server 406 and femtocell 105 can monitor the call quality separately, such that if packet loss is above the low limit in only one direction, such as from the femtocell 105 to the VoIP server 406, then FEC is only implemented in the direction from the femtocell to the VoIP server. In order to simplify the management of the service, packet duplication, a (2,1) FEC code, or other FEC codes could be always enabled, although overall bandwidth utilization will be usually higher.

The POKE interval 524 specifies the frequency the femtocell 105 will send simple, small packets to the VoIP server 406 in order to keep potential NAT ports on the NAT router 119 open and bound properly. Although the IAX2 POKE command is discussed, any packet which does not require significant processing could be transmitted. A VoIP registration request is sent less frequently, as shown in 514, since the authentication and hash process requires significantly more processing power and is not necessary in order to keep NAT ports open and bound. In a preferred exemplary embodiment, the IAX2 POKE command can be sent over 60 seconds, although other times could be implemented.

The VoIP Protocol 525 identifies the protocol the femtocell VoIP client 205 will utilize in communicating the with VoIP server 406. A preferred exemplary embodiment implements the IAX2 protocol, although several other common options include SIP, XMPP, MGCP, H323, or a proprietary protocol, among others. The VoIP client 205 will usually implement the selected protocol. If the service provider 107 expects to always use the same protocol across essentially all femtocells 105 in the network, then the VoIP protocol 525 could be optionally deleted.

The VoIP Transport Type 526 specifies the IP transport method to reach the VoIP server. With IAX2 specified as shown, the VoIP transport should be UDP. Several options exist with the VoIP protocol SIP, such as UDP, TCP, or TLS. If the selected VoIP protocol is SIP using TCP, for example, then the POKE interval 524 could be longer, such as every 5 minutes, since most residential NAT routers 119 tend to keep NAT ports open with TCP connections for longer durations than UDP connections. If the SIP protocol is selected in 525, for example, the SIP NOTIFY message or OPTIONS message could be sent from the VoIP client 205 to the VoIP server 406 at the POKE interval 524.

The VoIP retry timer 527 specifies the retry interval for the VoIP client 205 to implement in retrying messages to the VoIP server 406 before abandoning the request. For the sequence of retries, each subsequent attempt is typically a multiple for the VoIP retry timer 527. For example, there is not response after 200 ms for the first request, the VoIP client 205 can try again, and if there is no response after a further 400 ms, and then 600 ms, etc. then the request has failed.

The Max VoIP retries 528 specifies the maximum number of attempts for a request before it is abandoned. The Radio cipher mode 529 indicates whether ciphering will be used between the femtocell 105 and the MS 101, although this and other parameters can be set on a per call basis. For example if the mobile operator provides RAND, SRES, and Kc upon authentication of the MS 101, then the default parameter of the radio cipher mode 529 can be superseded during call and authentication operation of the femtocell 105. The VoIP obfuscation parameters 530*a* and 530*b* specify if the call control or media between the femtocell 105 and the VoIP server 406, respectively, will be obfuscated or otherwise encrypted. The method of obfuscation or encryption is specified in 531, and for the example shown the method is XOR. Other, more secure techniques could optionally be specified in 531, such as secure RTP for media, if the media is encapsulated with RTP headers.

The Ignore Media UDP checksum variable 531 can notify the VoIP client 205 to ignore bit errors as indicated by the received UDP checksum not matching the calculated UDP checksum on the data payload for media packets received. This setting may enhance quality, because the codecs natively utilized by the MS 101 are designed to be robust to bit errors, such as the GSM-Full Rate (FR), GSM-Enhanced Full Rate (EFR), and the Adaptive Multi-Rate (AMR) codecs. A single bit error within a received UDP media packet would result in an unmatched checksum, and many VoIP implementations would discard the media packet with a single bit error due to the incorrect checksum. However, due to the robust nature of the MS codecs, the audio received by the MS would generally be superior by passing the media with the bit errors as opposed to entirely dropping the packet. Thus, in the preferred embodiment the Ignore Media UDP checksum 531 flag is set to "Y".

The femtocell 105 could also support differentiated services code points (DSCP) for both the signaling and media. In 533, the VoIP client 205 implements an example DSCP value of 101110 for media packets, corresponding to the af31 codepoint in IETF RFC 3246. Since signaling may preferably be prioritized over media, the signaling codepoint can be set to the value of 011010 in 534, which corresponds to expedited forwarding as described in IETF RFC 2598. Setting the DSCP values allows the service provider 107 to prioritize the femtocell IP packets with the intermediate routers along the Internet path, assuming the routers implement and support DSCP, which helps deliver higher quality service to the subscribers. Other DSCP values could be implemented, or they could even be omitted from the configuration file 500.

The authentication method for the femtocell 105 to implement with the MS 101 can be set via the MS Authentication Method 535. According to an exemplary preferred embodiment, standard GSM 2G methods of authentication can be implemented by the femtocell 105, such as providing a RAND to the MS 101 and evaluating the SRES, as well as optionally implementing the media cipher key Kc. The femtocell 105 could alternatively implement other methods to securely authenticate the MS 101, and the method can be specified in parameter 535. In addition, authorization could be disabled, and in this case the MS Authorization Method 535 would be set to "none".

Although several parameters are listed in FIG. 5, additional parameters could be implemented, as well as removing or changing the parameters shown. An additional parameter that could be implemented (and not illustrated) would be a flag to specify IP Version 4 or IP Version 6, for example if IP Version 6 becomes more widespread on the ISPs within the service provider's geographical area. The illustrated parameters in FIG. 5 are common for an example a GSM system, and similar parameters could be implemented for other mobile network architectures such as UMTS. With sufficient flexibility in the baseband processor 210, RF front end 211, and software defined radio 205, the femtocell 105 could operate simultaneously in GSM and UMTS, or CSMA2000, and multiple configuration parameters or even multiple configuration files could be implemented on the femtocell 105.

Exemplary Servers in Service Provider Network 107

Figure 6:
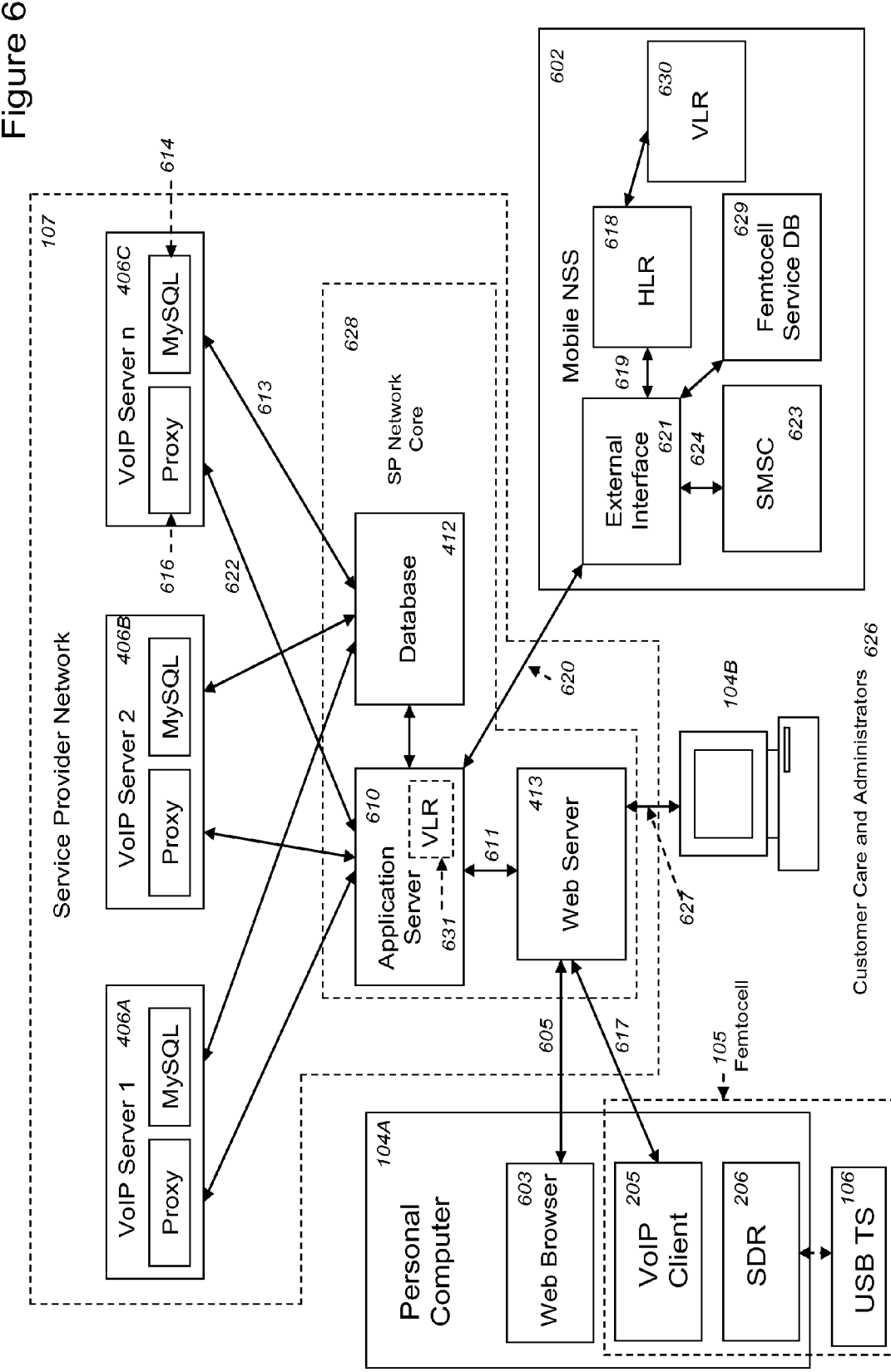
FIG. 6 is a graphical illustration of exemplary servers on the Service Provider and Mobile NSS networks, with related data connections during operation according to one exemplary embodiment of the invention.

FIG. 6 is a graphical illustration of exemplary servers on the service provider network 107 and Mobile Network and Switching Subsystem (NSS) network 602, with related connections for data flows during operation. Mobile NSS 602 is the management center for the mobile operator network 108 of FIG. 1.

In a preferred exemplary embodiment, upon installation of the USB Transceiver Station 106, the subscriber submits a provisioning form securely via https from a web browser 603 to the web server 413 via connection 605. Although a web browser 603 and web server 413 is preferred, it is not required and a separate GUI could be implemented on the VoIP client 205 or software defined radio 206 or other software on the PC 104. In addition, connection 605 could be omitted if the subscriber provisions the service via a text message, which may be preferred if the femtocell is designed as a "stand alone" unit.

Upon submission of the provisioning web page, the web server 413 contacts the database 412 through the application server 610 via connection 611. In general, the various severs on a service provider network 107 do not connect with the database 412 directly, but rather access the database 412 through the application server 610. Connecting to the database 412 through the application server 610 is preferred, since it helps manage the number of connections to the database 412 while further enhancing security. For example, the web server 413 would likely need a public IP address, which the application server 610 and database 412 could have private IP addresses, so long as the application server 610 and database 412 can be reached by the web server 413 and the VoIP servers 406.

If the subscriber provisioning is successful, appropriate updates are made in the database tables such as inserting the subscriber information and the femtocell ID 410 into the database, and the subscriber receives a successful response as appropriate. Although not shown, upon successful provisioning, the configuration file 500 (of FIG. 5) can be automatically generated by the service provider 107 and transferred to the femtocell 105, preferably through connection 603. In the preferred exemplary embodiment, the web server 413 comprises Apache software, the application server 610 comprises a Linux server with Tomcat software, and the database 412 comprises Oracle software, although other versions and types server software are possible without departing from the invention. Although a single instance of these servers are shown, each could comprise of multiple servers located in either the same data center or distributed geographically. In addition, the functions of the web server 413, the application server 610, or the database 412 could be combined. For clarity, call control and media from the VoIP client 205 to the VoIP server 406 will be described in more detail below, with data flow that is not shown in FIG. 6.

In addition, the Service Provider Network Core 628 could implement visitor location register (VLR) 631 functionality within 610. This VLR 631 would preferably communicate with the Mobile NSS 602 through connection 620 via SS7 Mobile Application Part (MAP), on dedicated PSTN link such as a T1 or E1. By implementing VLR 631 functionality in 610, the service provider network 601 can be more readily integrated into the existing mobile operator network 108. The VLR 631 within 610 would provide a standard interface for the Mobile NSS 602 to communicate status and control for the femtocells and MS within the femtocells' range. With a VLR in 610, a location area identifier (LAI) should be assigned to the femtocell network. Although the VLR 631 is shown within the application server 610, the VLR could be implemented as a separate server within the service provider's network.

Upon successful provisioning, the database 412 updates the local My Sequential Query Language (MySQL) database 614 operated with the VoIP servers 406 via connection 613. The VoIP Severs 406 can comprise a standard proxy server that supports registration requests from the VoIP client 205, such as Asterisk, Cisco's SIP Proxy Server, Ditech's Peerpoint, or other commercially available or open source VoIP servers that usually run on server operating systems such as Linux, Microsoft Windows Server, Sun Microsystems Solaris, or similar software. The VoIP server 406 could also comprise a proprietary, custom program for the service provider's femtocell application. In a preferred exemplary embodiment, the update from the database 412 to MySQL 614 includes account information to allow the femtocell 105 to begin registering with the VoIP server 406, and includes information such as the VoIP ID 501 and the VoIP password 502, which may be used during the registration process for the VoIP client 205.

In a preferred exemplary embodiment, the VoIP sever 406 includes a proxy sever 616 to manage VoIP communication with the femtocell 105. Outbound or inbound call requests between other VoIP endpoints or severs 406 on the Internet 102 are passed through the proxy server 616 running on the VoIP server 406 where the femtocell 105 sends VoIP registration requests. The MySQL database 614 is shown as being local to each VoIP server 406, but the MySQL database 614 could be operated remotely from the VoIP server 406, with VoIP IDs 501 and passwords 502 for the femtocell's VoIP registration stored in local text files on the VoIP servers 406, for example. Alternatively, the VoIP proxy server 616 could contact the database 412 directly, although direct communication between the proxy server 616 and the database 412 would be more difficult to scale. Authorization requests for the MS 101 to connect with the femtocell 105 may be processed via the https connection 617 between the VoIP Client 205 and the web server 604, and this process is described in greater detail below with respect to FIGS. 10 and 11.

Authorization requests for the MS to connect to the femtocell 105 may require a query into the HLR 618 of the Mobile NSS 602 via connections 619 and 620 through the Mobile NSS external interface 621. If the MS 101 is authorized and attaches to the femtocell 105, the application server 610 should also update the Mobile NSS 602 via connections 619 and 620, to indicate incoming calls from the PSTN 103 will be routed to the gateway 109 in order to reach the femtocell 105 through VoIP. Additional details on these steps will be described below in connection with FIGS. 10, 11, and 13.

When the MS 101 detaches from the femtocell 105, a second update will be made to the Mobile NSS 602. The Mobile NSS 602 may also include other databases useful for the service provider network 107 to manage femtocell service to subscribers, such as a femtocell service database 629, which could contain a list of subscribers authorized to access the femtocell service, billing information, a mapping of subscribers' MSISDNs to IMSIs, other information helpful for the service provider that may not normally be included in the HLR 618. In addition, the femtocell service database 629 may be physically located outside the Mobile NSS 602, but preferably within the mobile operator's network. The Mobile NSS 602 may also include a VLR 630, which will also contain information about the MS 101 service on the PLMN, such as the last LAI for the MS before the MS connected to the femtocell 105. In addition, the Mobile NSS may operate a Gateway Mobile Switching Center (GMSC) for the routing of incoming calls from the PSTN to the mobile network, although the GMSC is not illustrated in FIG. 6.

When the MS 101 attaches to the femtocell 105, outgoing call requests from the MS 101 should be received by the proxy server 616. The proxy server 616 may determine the authorization status for the call through connection 622, such as determining if the subscriber has sufficient balance and also determining call routing information. Alternatively, the local MySQL database 614 could contain the subscriber's balance and the corresponding call routing information. Upon closing of a telephone call with the MS 101 connected to the femtocell 105 the call detail record (CDR) should be stored in the database 412, again through an update in connection 622 or with the local MySQL server 614. If the local MySQL 614 server is used to initially record the CDRs, then the MySQL server 614 can periodically update the database 412 via connection 613, in a batch process for instance. If CDRs can be acquired via other means or are not required by the service provider, subscribers, or mobile operator, then the recording of CDRs can be optionally omitted.

When the MS is attached to the femtocell 105, text and multimedia messages can be routed to the MS 101 from the mobile NSS 602. To support delivery of the SMS message from the service provider network 107, the VoIP client 205 can keep the connection 617 open continuously when the MS 101 is attached and idle, in order to receive an inbound text or MMS message from the service provider network 107. In a preferred exemplary embodiment, SMS messages are forwarded from the Short Message Service Center (SMSC) 623 to the External Interface 621 via connection 624, which are then forwarded to the application server 610 on the service provider network 107 via connection 620. The application server 610 forwards the SMS message to the VoIP client 205 through the web server 413, and the VoIP client 205 forwards the SMS message to the USB transceiver station 106, which then forwards the message to the MS 101.

Upon successful delivery of a SMS message, a "success response" is sent in reverse, in order to notify the SMSC 623. Likewise, an outgoing SMS message from the MS 101 to the mobile network 602 can follow the same path as the "success response". Other configurations could support the transmission of SMS or MMS messages. For example, a VoIP server 406 could be utilized, where the application server 610 forwards incoming SMS messages for the MS to the VoIP server 406, and the VoIP server 406 forwards the message to the VoIP client 205, since the VoIP client 205 maintains registration with the VoIP server 406.

The service provider network 107 can be accessed via administrators and customer care 626 preferably through the web server 413 via connection 627 from a personal computer 104B. Subscriber inquires about their account status, billing, or similar inquiries could require support staff to query the database 412, which could also be supported via connection 627. For example, the femtocell 105 service may be provisioned or administered by the mobile operator's internal staff, as opposed to the subscriber or service provider directly. In addition, the service provider network 107 could provide Simple Object Access Protocol/extensible mark-up language (SOAP/XML) or similar interfaces for integration into the mobile operator's existing or third party network management tools. SOAP/XML interfaces would allow the bulk upload of multiple subscriber accounts simultaneously, or the transfer of CDR or billing information across multiple subscribers.

FIG. 6 illustrates a preferred exemplary embodiment of the high level connections and data flows. For clarity, lower level elements such as routers, firewalls, and switches are not shown. Other combinations of servers and data connections are also possible in order to achieve the objective of providing a reliable, secure service to the femtocell 105 and MS 101. One alternative would be to eliminate the web server 413, and have all communication between the femtocell 105 and the service provider network 107 pass through the VoIP server 406. In addition, the mobile NSS 602 could update the MySQL database 614 directly with subscriber information or call routing instructions.

Figure 7:
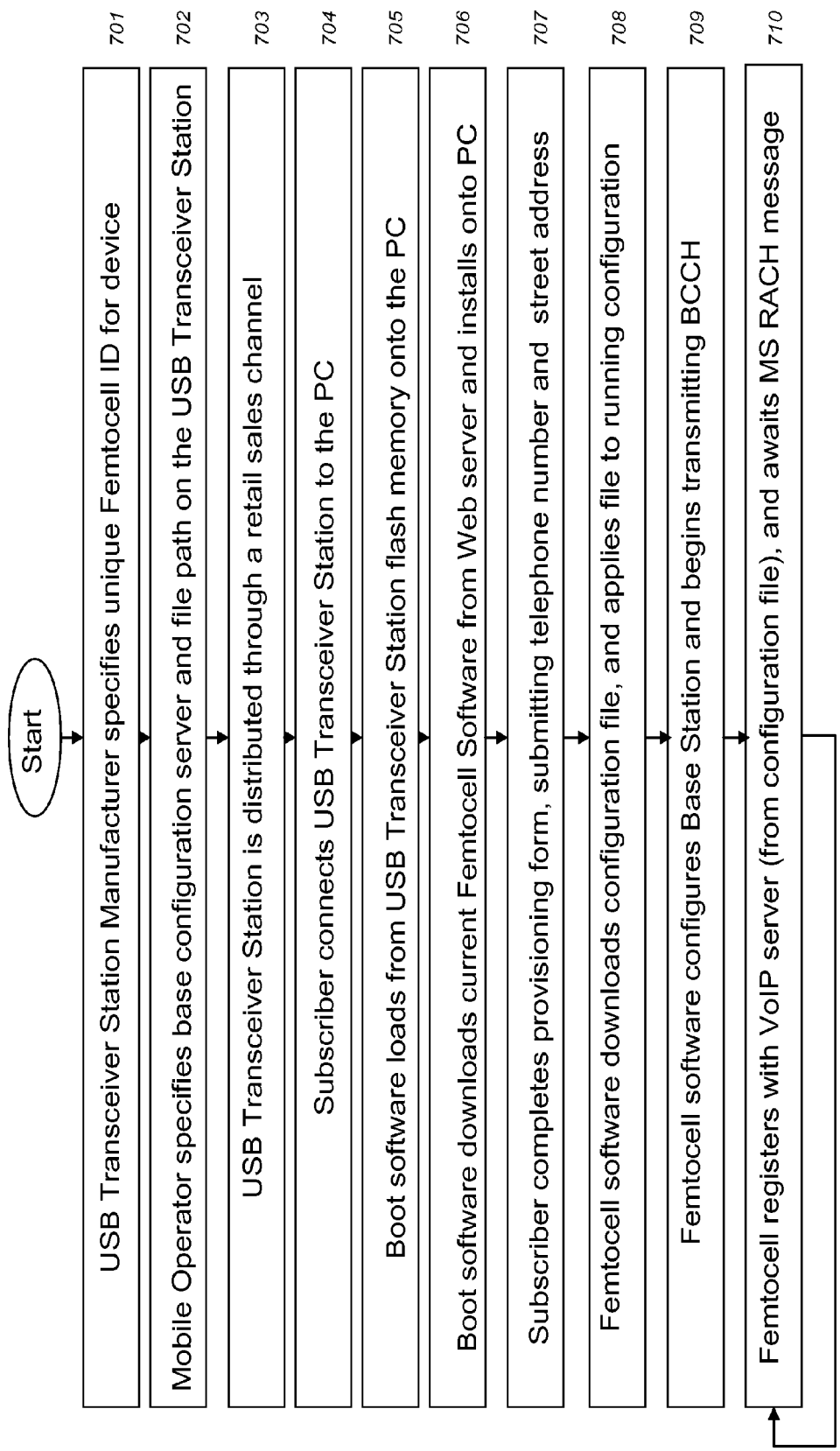
FIG. 7 is a flow chart illustrating exemplary steps to configure and initialize service with the femtocell according to one exemplary embodiment of the invention.

Referring now to FIG. 7, the processes and operations of the femtocell system 100 described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Exemplary Configuration Steps

FIG. 7 is a preferred flow sequence illustrating exemplary steps to configure and initialize service with the femtocell 105. The service provider may need to perform a series of steps to (i) properly configure the femtocell 105, (ii) establish the femtocell 105 as a base station, and (iii) begin registrations from the femtocell 105 to the VoIP server 406, thereby connecting the femtocell 105 to the service provider network 107 and providing service to the MS 101. When the USB transceiver station 106 (USB TS) is manufactured, a unique Femtocell ID 508 is preferably assigned to the unit in first step 701. The mobile operator can procure the USB TS 106 in Step 702 and can assign the base configuration server 403 and file path 503 for the configuration file 500 and other configuration parameters such as where the boot program should download the femtocell software, which may be stored in flash memory 208 of the USB TS 106. For enhanced security, the VoIP password 502 can also be assigned at step 702 and written into flash memory of the femtocell 105, so that it will not be transmitted over the Internet, even via otherwise secure methods such as https. Setting some configuration parameters, such as the address of the web server 406 on the Internet in step 702 may also be helpful for provisioning the femtocell 105 via an SMS message as opposed to submission of a web-based form. Alternatively, the base configuration server 403 and file path 503 may be passed to the femtocell 105 upon the subscriber provisioning via connection 605 if the subscriber completes a web based form for provisioning. In this case, sufficient information should be gathered with submission of the web based or femtocell software GUI provisioning form, such as the MSISDN of the subscriber, in order to automatically generate the configuration file 500.

In step 703, the USB Transceiver station 106 is distributed through a retail distribution sales channel to the subscriber. In step 704, the subscriber connects the USB transceiver station 106 to their personal computer 104, and the personal computer can then access the Internet 102. Upon connection with the personal computer 104, the USB Transceiver Station 106 uploads a boot file from local flash memory 208 to the PC 104 in step 705. During step 706, the boot file installs on the PC 104 and downloads and installs the current version of the femtocell software 205, 206 from the Internet 102, and also presents the subscriber a provisioning form in order to configure and establish the service. The boot file generally remains constant, compared to more frequent updates that are likely for the femtocell software 205, 206.

In addition, the functional requirements of the boot software are limited, such as primarily downloading and installing the current version of the femtocell software 205, 206. Alternatively, the femtocell software 205, 206 could be installed in flash memory 208 on the USB transceiver station 106 instead of being downloaded from the Internet 102, but by using this technique, a new version of the femtocell software 205, 206 may need to be downloaded upon installation in any case, if the femtocell software has been updated since it was initially loaded into flash memory 208, such as during steps 701 or 702. Upon installation of the updated femtocell software 205, 206 onto the PC 104, a copy could also be placed into flash memory 208 on the USB TS 106, so that if the USB TS 106 is subsequently moved to another PC 104, the download of the femtocell software 205, 206 may not be required.

At step 707, the subscriber completes a provisioning form according to the preferred exemplary embodiment, with information such as the telephone number (MSISDN) for their mobile phone and the street address and postal code where the femtocell 105 will be operating, or other information requested by the service provider. The provisioning form could also allow multiple telephone numbers to be entered, in case the femtocell will be supporting multiple MSISDNs. Alternatively, step 707 may be completed in the offices of the mobile operator by a customer support representative 626 or via an SMS or MMS message from the MS 101. Obtaining the street address of the location where the femtocell 105 will be operated is preferred, since the geographical location may be needed for emergency service calls.

Further, regulatory requirements for radio spectrum licensing may require the mobile operator to record the physical location of base stations in their network 108, and the femtocell 105 may be considered a base station for regulatory purposes. The provisioning form 707 may be omitted if the Service Provider can obtain the necessary information to establish the service through other methods. Upon successful submission of the provisioning form, the configuration file 500 can be automatically generated, stored on the configuration server 403, and downloaded to the femtocell 105 and applied to its running configuration in step 708.

The femtocell's base station functionality can be configured in step 709, and upon completion of the configuration process, the femtocell 105 begins transmitting the BCCH (if operating as a GSM base station) and logical channels such as the RACH and synchronization channel, among others which are well known to one of ordinary skill in the art. The process for the femtocell 105 to configure itself as a base station according to a preferred exemplary embodiment is more fully described below with respect to FIG. 8. The femtocell 105 begins registering with the VoIP server 406 and awaits contact from the MS 101 via the RACH in step 710.

Although the sequence of steps outlined in FIG. 7 is according to a preferred embodiment for provisioning the femtocell's service, other steps could be involved and some steps omitted. For example, if the femtocell 105 is manufactured as a "stand alone" unit without the need for the PC 104, boot software would not need to be uploaded onto the PC 104 as shown in step 705. However, with a "stand alone" unit, a step similar to step 706 would likely be required, where the "stand alone" unit checks a file server on the Internet in order to download the most current firmware 205, 206.

Likewise, if the "stand alone" unit is to be self provisioned by the subscriber without submission of a provisioning form in step 707, a separate text message could be sent by the subscriber to request the femtocell service to be activated. If the femtocell 105 is fully integrated with the service provider's mobile network 108 and operates as a BTS, then a provisioning form could be entirely omitted, assuming the physical address information of the femtocell 105 is not required, and the subscriber associated with the femtocell 105 is also not required.

Femtocell Scanning Method

Figure 8:
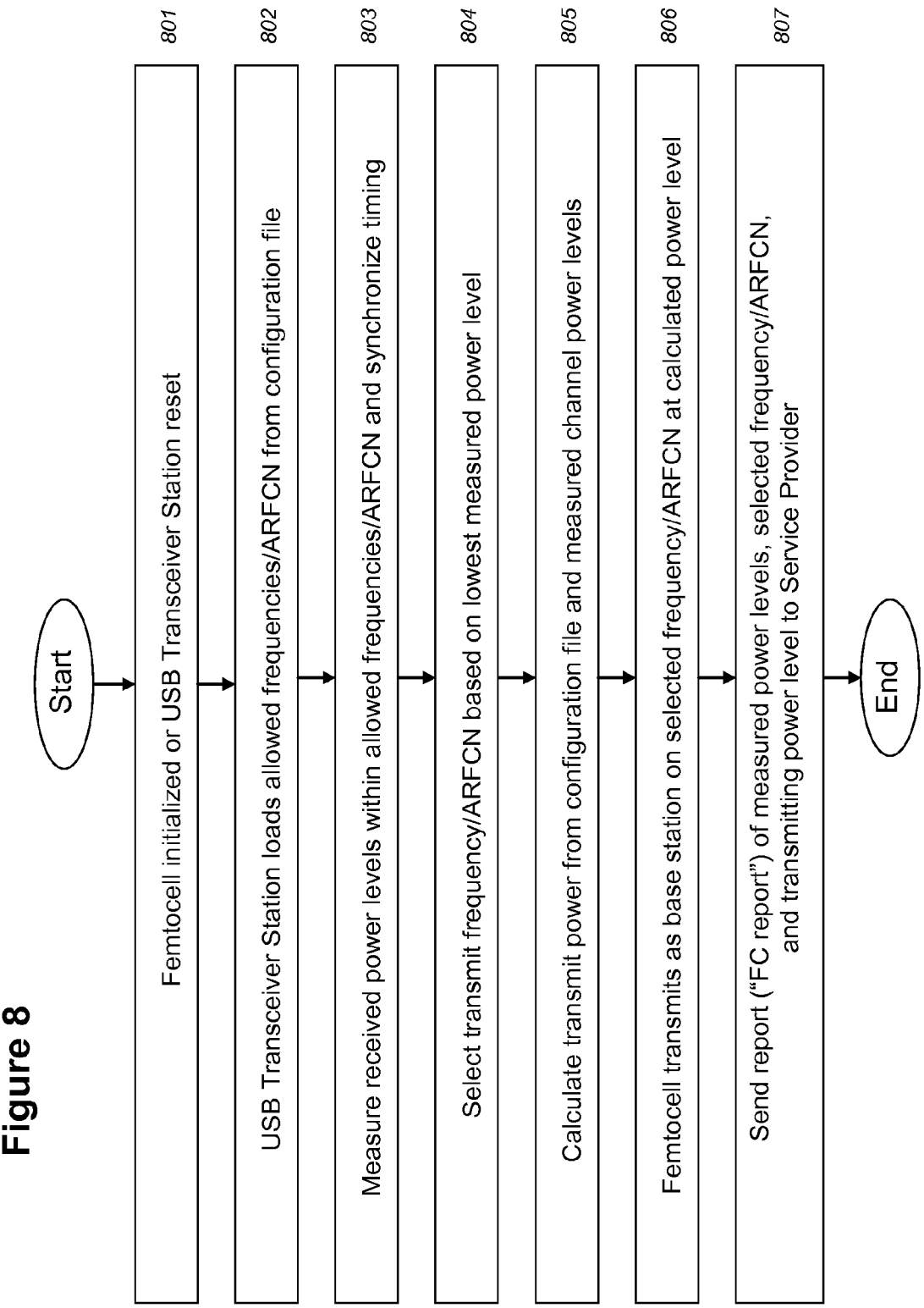
FIG. 8 is a simplified flow chart of the steps for a femtocell to scan the authorized frequencies and begin transmitting as a base station according to one exemplary embodiment of the invention.

FIG. 8 is a simplified block diagram of the steps for a femtocell 105 to scan the authorized frequencies 512 and begin transmitting as a base station. These steps should be performed in a preferred exemplary embodiment in order to reduce interference between the femtocell 105 and the macrocellular network 108, as well as ensure proper timing of the PLMN synchronization unit 215. In step 801, the femtocell 105 is initialized for the first time or the USB transceiver station 106 is reset. This could correspond to the very first time the femtocell 105 is installed or upon a "reset" command sent to the femtocell 105 from the service provider 107, such as through the continuous connection the femtocell 105 maintains with the VoIP server 406 through the VoIP registration process. In step 802, the USB transceiver station 106 determines the allowed frequencies 512 based upon information in the configuration file 500. These frequencies could be assigned according to the radio spectrum licensed by the mobile operator, for example. In the case of GSM, the frequencies could include the list of ARFCN. Alternatively, the allowed frequencies could be in a list of several actual frequency ranges.

The femtocell 105 next begins scanning the allowed frequency ranges to measure the power levels received in each frequency range in step 803. At this step 803, the femtocell 105 also synchronizes with the surrounding BTS of a mobile network 108 in a similar manner that a MS 101 would synchronize, if a nearby BTS belonging to the mobile operator can be found. This synchronization will be used to calibrate the PLMN synchronization unit 215 of the USBTS 106, to assist the femtocell 105 with later broadcasting in synchronization with the surrounding BTS, which may be important for seamless handover of active calls.

Based upon the measured power levels in all allowed frequencies, the femtocell 105 selects the transmit frequency in step 804, preferably according to the allowed frequency that corresponds to the lowest measured power. In an exemplary preferred embodiment, the femtocell 105 functions as a GSM base station on a single ARFCN channel, which would support up to 8 simultaneous calls, so the femtocell 105 would need to find only a single channel representing a frequency range with the least interference. Other algorithms could be applied to select the transmit frequency range, such as determining the transmit frequency based upon a combination of measured power level and potential interference with a frequency licensed by another operator. Measurements such as signal-to-noise levels could also be applied. In the case of UMTS and CDMA mobile networks, the frequency range should not need to be selected based on scanning, but the received power levels should be detected in order to evaluate the proximity to the BTS. The scanning feature in steps 803 and 804 could optionally be omitted if the mobile operator assigns (i) a single ARFCN to femtocells within the network or (ii) a set of dedicated ARFCNs to femtocells in the network. By assigning specific frequency ranges that are generally dedicated to the femtocells 105, the interference with the macrocellular network should be minimized. In this case, measuring the power levels may still be preferred in step 803, since the femtocell would preferably detect neighboring femtocells and try to minimize interference by adjusting the femtocell 105 transmit power level.

In step 805, the femtocell 105 determines the maximum power level to transmit as a base station. The femtocell 105 could simply apply the value, such as 30 mW, from the configuration file 500, or perform a more advanced analysis based on the power levels it measured in 803. In general, the maximum power level 513 in the configuration file 500 is the maximum average power the femtocell 105 can transmit for a single channel. However, if the measured power levels for all allowed frequencies indicate that a macrocellular BST of a mobile network 108 can be detected in relatively close proximity at all allowed frequencies, then the actual transmit power level for the femtocell 105 could be lower than the maximum power level 513 in the configuration file 500.

Once steps 801 through 805 are completed, the femtocell 105 begins transmitting as a base station in step 806, at the selected frequency range and the determined power level. In addition, the femtocell 105 sends a report of the measured power levels, the selected frequency, and the actual transmit power level it has implemented to the service provider 107 in step 807. The femtocell 105 maintains a connection with the VoIP server 406 with either periodic registration requests or POKE requests according to a preferred embodiment. If the femtocell 105 determines that Internet connectivity is lost, then the base station transmissions could be disabled, since there is limited purpose in transmitting to a MS 101 if no service could be provided due to the lack of Internet connectivity.

Steps 801 through 807 could be modified for example, if the operator utilizes the same frequency range across an extended geographical area, which is common in CDMA or UMTS or higher networks where a carrier generally does not implement frequency division multiple access (FDMA) for the same geographical location in their network, such as a large city covering 750 or more square kilometers. In this case, the low transmit power levels of the femtocell 105 would provide the primary method of reducing interference with the macrocellular network 108. Specific steps may still be useful for monitoring potential interference with macrocellular CDMA and UMTS or similar networks 108 that implement code division multiple access techniques, such as measuring the received power levels, calculating a maximum transmit power level based on the measured power levels, and submitting a report of measurements and transmitting power to the service provider 107. In addition, the timing synchronization of the femtocell 105 outlined in step 803 with surrounding BTS would be preferred in a CDMA network, for example. The power levels referred to in FIG. 8 are the average power levels, as opposed to the periodic, but relatively short, peak power levels common in GSM networks. Other power levels are not beyond the scope of the invention.

Frequency Map and Femtocell Timing Synchronization Steps

Figure 9B:
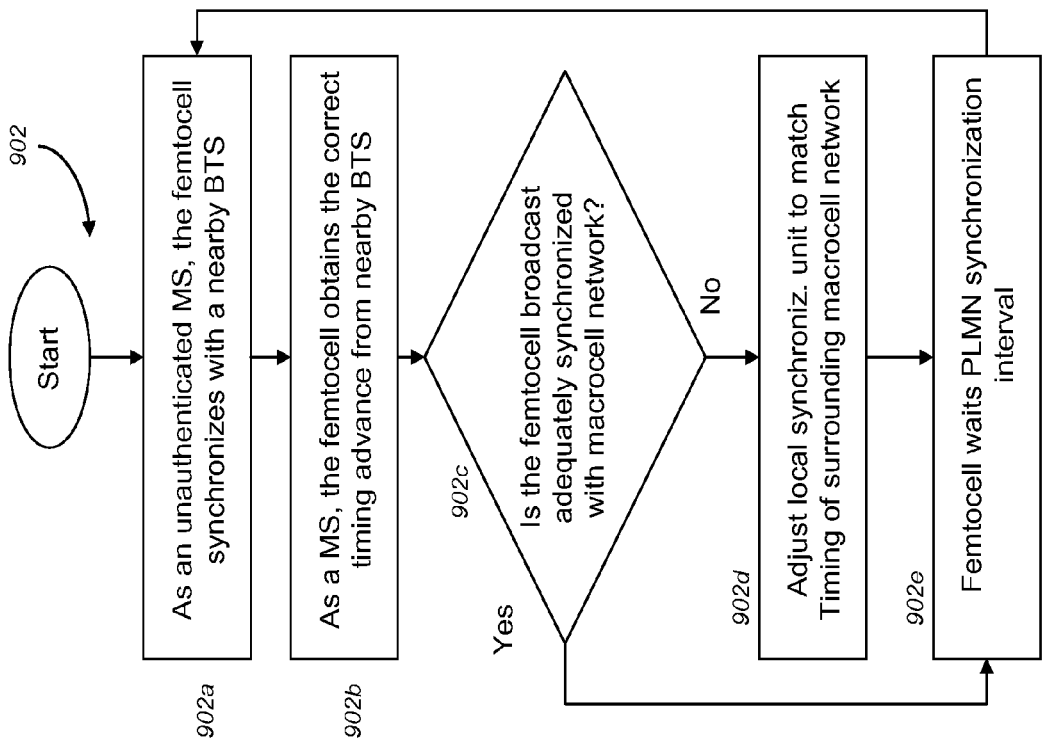
FIG. 9B is a flow chart illustrating exemplary steps of a femtocell timing synchronization technique according to one exemplary embodiment of the invention.
Figure 9A:
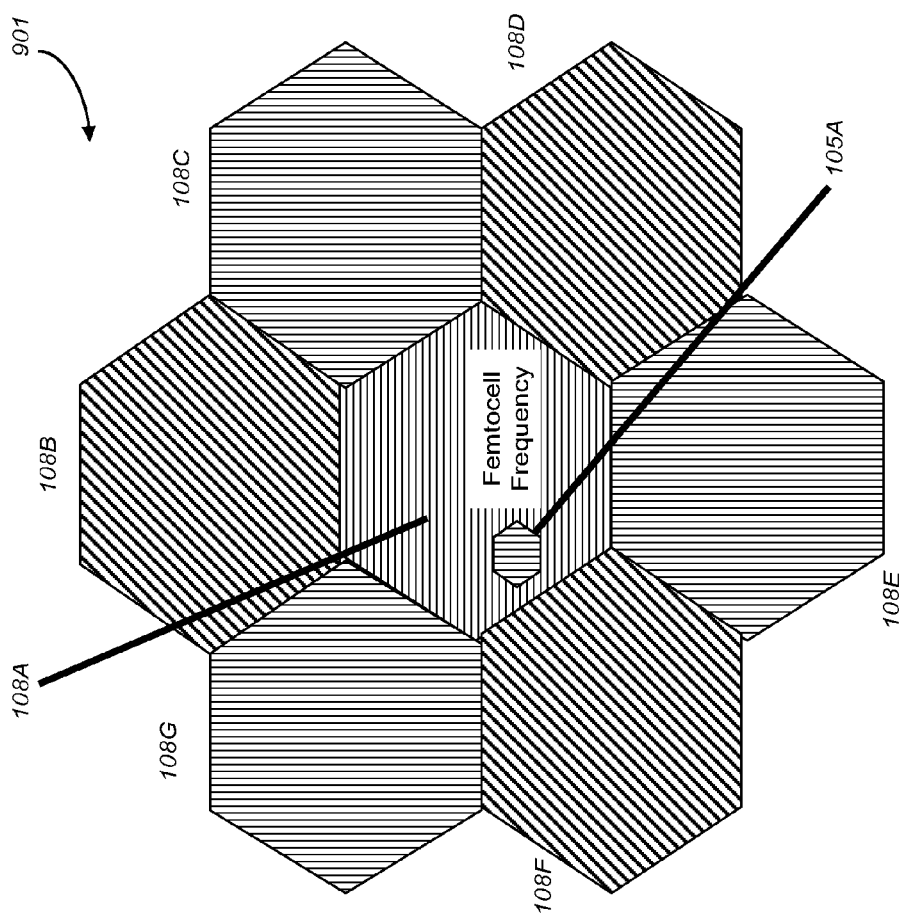
FIG. 9A is a graphical illustration of an exemplary frequency map, including the femtocell broadcast footprint according to one exemplary embodiment of the invention.

FIG. 9A is a graphical illustration of an exemplary frequency map, including the femtocell broadcast footprint 901. FIG. 9B illustrates femtocell timing synchronization steps 902. The footprint 901 demonstrates several benefits of a preferred exemplary embodiment, when applied as a GSM base station. Footprint 901 is a simplified illustration for an example GSM 2G network. First, since the transmitted power levels are significantly lower, the interference with cells 108A-108H surrounding macrocellular network 108 is reduced. By applying the scanning logic illustrated in FIG. 8, the femtocell 105 can determine a preferred frequency 105A for transmission, which is shown in footprint 901 for the example location of the femtocell 105, assuming the there are three frequency ranges implemented by the mobile operator.

If CDMA or 3G or higher networks are used, all surrounding cells 108A-108H may utilize the same frequency range that is typically larger than a GSM channel or group of channels. However, the benefits for the scanning functionality are still evident. For example with 3G, power of the received radio signals would typically be higher toward the middle of the macrocell, and the femtocell transmission power as a BTS may optimally be smaller with a corresponding smaller footprint. If the femtocell 105 is located further away from the center of a cell 108A, then the allowable transmission power for the femtocell could be higher. For simplicity of frequency planning in a GSM 2G network, all femtocells 105 could be assigned the same base station color code, assuming that color code is available and not currently in use.

FIG. 9B outlines the steps 902 the femtocell 105 can take to ensure the timing of its signals are acceptably synchronized with the surrounding macrocellular network 108 shown in FIG. 9A. As noted previously and discussed with the PLMN synchronization unit 215 of FIG. 2, timing synchronization between the femtocell 105 and the surrounding network 108 will be helpful for seamless handoff of calls between the femtocell 105 and any surrounding network 108. An important challenge for the femtocell 105 is that it is not directly connected to the macrocell network's Primary Reference Source (PRS) and a highly reliable and precise timing source may not be nearby. For example, if the femtocell 105 time differs from the surrounding macrocellular time by 200 ms in GSM, the probability of dropped calls during handoff would significantly increase.

In CDMA and similar networks, it is common for mobile operators to install a GPS receiver at the BTS to establish precise and reliable time. Although a full GPS receiver could be included in the femtocell 105, it would likely increase costs. Further, the GPS signals may not be received if a subscriber places the femtocell 105 in their basement where a DSL connection from the ISP may terminate, for instance, although the macrocellular network signals may still be available and useful for timing synchronization.

In step 902a of FIG. 9B, as a GSM 2G base station, the femtocell 105 scans the network 108 in a manner similar to a MS 101 connecting to a macrocell base station, and obtains timing synchronization information from the BCCH, SCH, and FCCH of a nearby BTS belonging to the same mobile operator network 108 based on the MCC/MNC in the CGI of the configuration file 500, if a BTS is nearby. In step 902b, the femtocell 105 submits a RR Channel Request on the RACH. With the RR Immediate Assignment response, the femtocell 105 obtains both a time correction, in the form of a number in the range of 0-63 binary in the GSM standard, and also a frequency correction value. Both of these numbers may be applied to tune the femtocell's broadcast configuration as a base station. At this point, since the femtocell 105 may not have a SIM or be authorized to place a call, the outgoing call attempt to the BTS can be abandoned, because the desired time and frequency correction factors have been obtained. Although the frequency correction obtained by the femtocell 105 may be for a different ARFCN on which it will transmit, the appropriate offset can be applied to tune the frequency range in which the femtocell 105 will transmit.

In step 902c, the femtocell 105 can determine if its broadcast is synchronized with the BTS of the operator. For example, with the timing advance from the macrocellular BTS, the femtocell 105 can determine if the frame numbers it broadcasts sufficiently match the frame numbers at the macrocellular BTS, which is preferred for the femtocell 105 to support seamless handover. If the timing of transmitted frames is synchronized between the femtocell 105 and the BTS of any surrounding mobile network 108, the femtocell 105 can wait until the next PLMN synchronization interval 514. If the frame timing does not match, indicating a drift in synchronization of frames that is most likely the result of timing drifts at the femtocell 105, the appropriate adjustments can be made to the PLMN synchronization unit 215 to either slightly speed up or slow down the femtocell timing in step 902d. This could be performed via an analog voltage output through a 10 bit D/A converter in a microcontroller 209, for example. The PLMN synchronization unit 215 is preferably voltage controlled, allowing the femtocell 105 to make the appropriate adjustments, although other methods of adjusting the local clock on the USB TS 106 could be implemented In step 902e, the femtocell waits according to the PLMN synchronization interval 514, which in the preferred embodiment is 1800 seconds before repeating the timer synchronization process. During the initialization phase of the femtocell 105, before the femtocell 105 starts broadcasting as a BTS, similar steps as outlined in 902 may need to be repeated more frequently than the PLMN synchronization interval 514, in order to initially "fine tune" the oscillator to initially agree with the macrocellular timing.

Although not shown in broadcast footprint 901 of FIG. 9A, if the femtocell is beyond range for a BTS such as the frequency for mobile network 108A, it will need to operate as an isolated base station 105A, and precise synchronization of the femtocell timing with the macrocell timing may be difficult. In this instance, a lack of synchronization in timing should be acceptable, since calls would be expected to drop when the MS leaves the femtocell range. The example steps outlined in 902 are shown for a GSM network, however similar techniques could be applied and would be preferred for a CDMA or UMTS network. In a CDMA network, if a GPS receiver or other precise timing is not available at the femtocell location, the femtocell can obtain relevant timing information by periodically connecting to the mobile network as a MS, and then applying the network timing to its own broadcasts as a BTS. In addition, the synchronization of the timing between the femtocell and the mobile operator's network may be important for GSM 2G, due to the "hard handover" nature of the switch of an active call to a nearby BTS as the MS moves out of range.

Messages from Femtocell for Authorizing Mobile Station

Figure 10A:
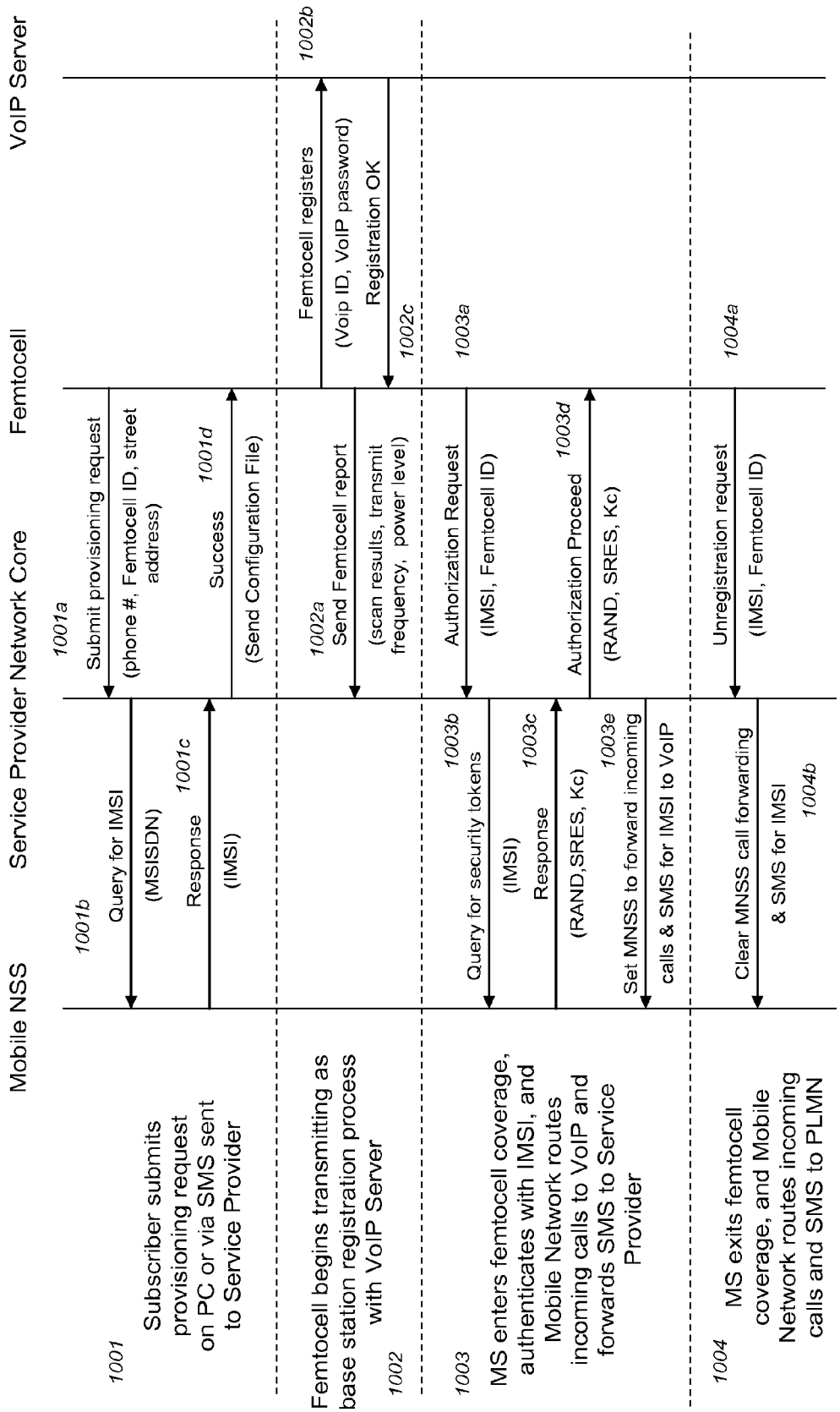
FIG. 10A is a simplified message flow chart illustrating steps to authorize a mobile station based upon the IMSI, and establish secured service for the mobile station via the standard GSM methods with security tokens RAND, SRES, and Kc according to one exemplary embodiment of the invention.

FIG. 10A is a simplified message flow diagram illustrating provisioning messages and data from the femtocell 105 or personal computer 104 and authorizing a mobile station 101 based upon the international mobile subscriber identity (IMSI) according to a preferred exemplary embodiment. The sequence of messages shown allows secure authorization of the MS 101, utilizing the standard GSM authentication tokens of RAND, and SRES. The data in parenthesis below each message indicate example data within the message. The implementation of standard GSM authentication tokens could be specified in the MS Authentication Method 535 parameter in the femtocell 105 configuration file 500. In step 1001, the subscriber submits a provisioning form, such as via a web page through connection 605. The form contains the telephone number of the MS 101, the femtocell ID 410, and other optional information such as the street address for informational purposes. The femtocell ID 410 may not need to be physically typed in by the subscriber if the USB transceiver station 106 is connected to the PC 104, since the PC 104 can automatically incorporate the femtocell ID 410 along with the submission of the provisioning form. In step 1001a, the femtocell 105 may also be provisioned via a text message with the subscribers information sent to the service provider or mobile operator.

Note the subscriber does not know or need to know their IMSI when submitting the provisioning form. When message 1001a reaches the service provider network core (SPNC 628), the telephone number typed by the subscriber is converted to an MSISDN. This MSISDN is forwarded to the Mobile NSS 602 as a query to look up the IMSI in step 1001b via connection 620. If the subscriber is authorized by the mobile operator for the service, the Mobile NSS 602 responds to the SPNC with the IMSI in step 1001c, and this IMSI is stored in the service provider database 412.

If successful, the subscriber receives a notification of success in step 1001d, and the configuration file 500 is sent to the femtocell 105 via connection 605, including the VoIP ID 501 and the VoIP password 502, so the femtocell 105 can begin registering with the VoIP server 406. Other options for provisioning are available. For example, the subscriber could send an SMS directly to the mobile NSS 602, and if the subscriber is authorized, the Mobile NSS 602 could notify the SPNC 628 via connection 620, and the provisioning file 500 sent to the femtocell 105 via connection 617, assuming the femtocell 105 has a default configuration or previously specified parameter that informs the femtocell to contact the web server 413 upon installation but before provisioning, which could be set at step 702.

In general, the IMSI of the MS 101 will be relatively static for a subscriber, unless the subscriber changes their SIM. If the subscriber changes their SIM, or adds a second mobile handset to be serviced by the previously provisioned femtocell 105, they can complete an update provisioning form similar to step 1001.

The service provider database 412 now has two elements which can be used in combination to authorize subscribers: the femtocell ID 410 and the IMSI. In step 1002, the femtocell 105 scans for the optimal frequency and transmission power levels, begins transmitting as a base station, and begins the registration process between the VoIP client 205 and the VoIP server 406. In step 1002a, the femtocell 105 sends the scanning report to the SPNC 628 of the service provider network 107. In step 1002b, the femtocell 105 registers securely with the VoIP server 406. In step 1002c, the VoIP server 406c can transmit a "Registration OK" message to the femtocell 105. According to a preferred exemplary embodiment, the registration process is periodic according to the registration interval 514 every 900 seconds when the femtocell is powered on.

The messages to authorize the MS 101 securely are shown in step 1003 for an exemplary embodiment. Upon entering the femtocell range and establishing communication, according to the standard GSM 2G protocol, the base station can acquire the current IMSI of the MS 101 via an "Identity Request" query. Note the IMSI can be acquired by the femtocell 105 without ciphering, similar to the manner when a MS 101 initially requests roaming service in a foreign country. In step 1003a, the femtocell 105 submits an authorization request to the SPNC 628 of the service provider network 107 with the fixed femtocell ID 507 and the IMSI of the MS 101. At step 1003b, the service provider database 609 looks up the provisioned IMSIs associated with the fixed femtocell ID 412. If the service has been previously successfully provisioned, as indicated by the IMSI being associated with the femtocell ID 412, the service provider may proceed with the authentication request. The service provider submits the IMSI in a form of a query to the Mobile NSS 602 via connection 620. At step 1003c, the Mobile NSS 602 responds with a set of security tokens RAND, SRES, and Kc for the IMSI. The service provider could optionally omit verifying IMSIs have been previously provisioned or associated with the femtocell 105, thereby allowing other subscribers in the mobile operator's network to access service via femtocell 105.

With a successful acquisition of the security tokens acquired in step 1003c, the SPNC 628 of the service provider network 107 sends an authorization proceed message to the femtocell 105 in step 1003d, with the values of RAND, SRES, and Kc. The femtocell 105 implements these tokens according to the standard GSM specification, by sending the MS 101 RAND, acquiring SRES in response, comparing the acquired SRES value from the MS 101 with the SRES in step 1003d, and authorizing the MS 101 if the two values for SRES match.

The cipher key Kc can then optionally be implemented to cipher subsequent communication between the femtocell 105 and the MS 101. Also upon successful authorization of the MS 101, the SPNC 628 sends an update to the Mobile NSS 602 of FIG. 6 to indicate (i) incoming voice calls from the PSTN 103 or (ii) incoming data messages such as SMS or MSS from the mobile network 108 (of FIG. 1) for the IMSI or subscriber should be forwarded through the Internet 102 in order to reach the MS 101, according to step 1003e.

The update in step 1003e could be implemented in several different ways. One option is to set a Call Forward Not Reachable (CFNR) number for the subscriber, such that incoming calls could be directed to a E.164 number associated with the gateway 109. The service provider's VoIP network could utilize the E.164 number to route the call from the gateway 109 to the femtocell 105 through the Internet.

A second option to route the incoming calls from the mobile operator's network 108 to the service provider 107 would be to update the Gateway MSC (GMSC) in step 1003e to forward incoming calls to a VoIP gateway 109, instead of the HLR 618 when the MS is connected 101 to the femtocell 105. Additional details for inbound call routing will be provided in FIG. 13. To route incoming calls to the gateway 109, Mobile NSS 602 can forward incoming calls to T1s/E1s/DS3s connected to gateway 109 for routing to the femtocell 105 via VoIP. In addition, other methods such as Provide Roaming Number (PRN) could be implemented by the Mobile NSS 602.

In step 1004, the MS 101 exits coverage by the femtocell 105, is turned off, or the quality of the Internet connection degrades below set thresholds such as 519, 522, and 523. This could occur if the MS 101 moves beyond range, or the Internet quality degrades below the thresholds set in the configuration file 500, such as if the packet loss or delay rises above the maximum levels 519 and 522, respectively. In these cases, the femtocell 105 terminates communication with the MS 101, and sends an unregistration request in step 1004a to the SPNC 628 of the service provider network 107 via connection 617.

In a preferred exemplary embodiment, the unregistration request includes the IMSI and the femtocell ID. If the combination of the femtocell ID and IMSI match in the service provider database, the SPNC 628 of the service provider network 107 sends an update to the Mobile NSS 602 via connection 620 in step 1004*b* to indicate incoming voice calls or SMS/MMS messages from the PSTN 103 or mobile network 108 for the subscriber's MSISDN or IMSI should be forwarded to the PLMN in order to reach the MS 101. The successful completion of step 1004*b* reverses the call and message forwarding previously set by step 1003*e*.

Figure 10B:
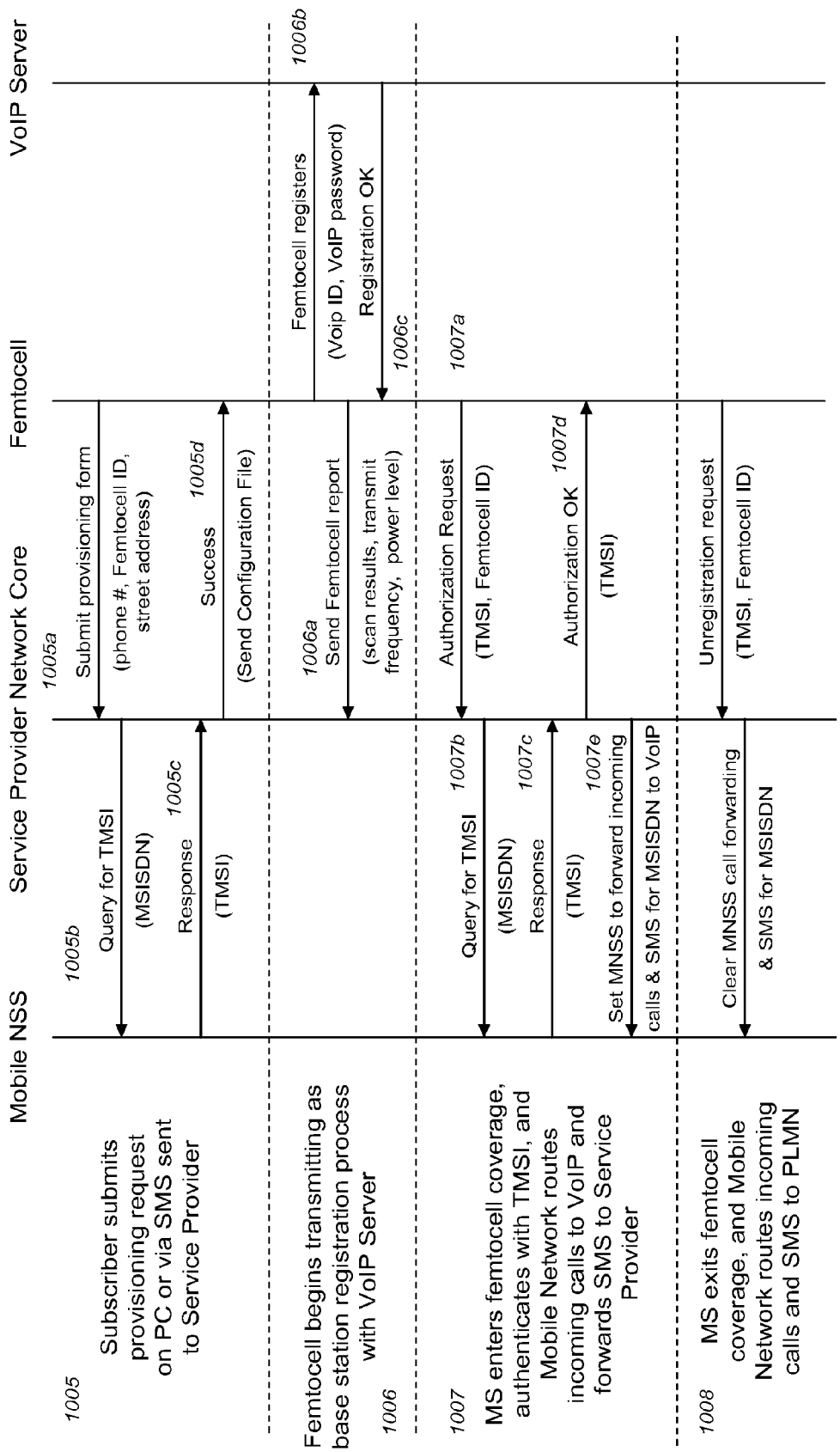
FIG. 10B is a simplified message flow chart illustrating steps to authorize a mobile station based upon the TMSI, and establish secured service for the mobile station via the femtocell ID, TMSI, and MSISDN, without requiring security tokens RAND, SRES, and Kc according to one exemplary embodiment of the invention.

FIG. 10B is a simplified message flow diagram illustrating provisioning messages and data from the femtocell 105 or personal computer 104 and authorizing a mobile station 101 based upon the temporary mobile subscriber identity (TMSI) according to a preferred exemplary embodiment. This exemplary embodiment may enhance security, because it does not require the femtocell 105 to query the MS 101 IMSI in the clear. In addition, it does not require security tokens RAND, SRES, and Kc to be passed from the mobile NSS 602 to the SPNC 628, and subsequently down to the femtocell 105. The message flows 10B may require additional functionality to be added to the mobile NSS 602, in order to convert a MSISDN into the current TMSI, which is normally managed by the VLR 630 as opposed to the HLR 618. The femtocell's authorization of the MS 101 based upon the TMSI could be specified in the MS Authentication Method 535 parameter, configuration file 500, with a value of "TMSI" for instance.

In step 1005 the subscriber submits a provisioning form, such as via a web page through connection 605 or via a text message. Note the subscriber does not know or need to know their TMSI, which may also frequently change. When message 1005*a* reaches the service provider network core (SPNC 628), the telephone number typed by the subscriber is converted to an MSISDN. This MSISDN is forwarded to the Mobile NSS 602 as a query to look up the TMSI in step 1005*b*. If the subscriber is authorized by the mobile operator for the service, the Mobile NSS 602 responds to the SPNC with the TMSI in step 1005*c*, and this TMSI is stored in the service provider database 412. In general, the TMSI of the MS 101 will change periodically and is designed to be a somewhat random number that can identify the MS 101 within a given area.

According to an exemplary preferred embodiment illustrated in FIG. 10B, the service provider database 412 has three elements which can be used in combination to securely authorize subscribers: the femtocell ID, the TMSI, and the MSISDN. The femtocell ID 410 is preferably fixed in USB TS hardware, the TMSI may change without the service provider knowledge, and any changes to the MSISDN should be noted by the user according to a resubmission of a provisioning form. In addition, another identification code besides the fixed femtocell ID 410 could be implemented by the service provider in message, such as a token that is stored with the service provider database 412 or 614 and passed to the femtocell 105 upon successful registration of the femtocell 105 with the VoIP server 406 in step 1006*b*, for example.

The messages to authorize the MS 101 securely using the TMSI are shown in step 1007. Upon entering the femtocell range, according to the standard GSM 2G protocol, the base station can acquire the current TMSI of the MS 101, and the TMSI may change since the provisioning form was submitted in step 1005. The TMSI can be acquired by the base station since it is initially transmitted "in the clear" and without ciphering, usually via the Identity Request command from the femtocell 105 to the MS 101. If the TMSI is not available, the femtocell may request the MS 101 international mobile equipment identity (IMSI), and implement the IMSI as a substitute for the TMSI in step 1007.

In step 1007*a*, the femtocell 105 submits an authorization request to the SPNC 628 of the service provider network 107 with the fixed femtocell ID 410 and the current TMSI of the MS 101. At step 1007*b*, the service provider database 609 looks up the provisioned MSISDNs associated with the fixed femtocell ID 410, and submits the MSISDN, or a set of multiple MSISDNs if the subscriber has provisioned more than one, in a form of a query to the Mobile NSS 602. At step 1007*c*, the Mobile NSS 602 responds with the current TMSIs associated with the MSISDNs submitted in step 1007*b*. The Mobile NSS 602 may need to query the last VLR 630 on the PLMN associated with the MS 101 in order to reply with the TMSI in step 1007*c*.

If any of the TMSIs from the Mobile NSS 602 in step 1007*c* matches the TMSI submitted to the femtocell 105 by the MS 101 in step 1007*a*, the service provider knows the MS 101 is authorized to use service on the femtocell. With a successful match, the SPNC 628 of the service provider network 107 sends an authorization OK to the femtocell 105 in step 1007*d*, and the femtocell 105 may also authorize the MS 101. Even though the security tokens RAND, SRES, and Kc have not been passed to the service provider and femtocell, the femtocell can authenticate the MS 101 by accepting the SRES for any given RAND, since the TMSI and femtocell ID 410 successfully match. Similar to step 1003*e* and 1004, the setting and clearing for the routing of voice and text messages is set and cleared in step 1007*e* and 1008. Since the cipher key Kc is not acquired through the method illustrated in FIG. 10B, ciphering between the femtocell 105 and the MS 101 should be disabled.

Although two methods are illustrated in FIGS. 10A and 10B, there are many other options and combinations available with varying degrees of complexity and security. For example, the authentication with the Mobile NSS 602 could be bypassed entirely by the service provider simply checking the femtocell ID 410 with the subscribers IMEI, which could be obtained via the identity request. With this example, additional security could be obtained by programming the femtocell to transmit at very low powers, such as less than 1 mW, until the IMEI is acquired, and then the femtocell transmit power level could be increased to the normal value, such as 30 mW.

Security would be enhanced because the MS 101 would have to be brought in close physical proximity, such as within 8 meters of the femtocell 105, in order for the MS 101 to obtain service through the femtocell 105. Another option is to bypass security entirely, allowing any MS 101 within the femtocell 105 range to make phone calls. This could be useful for a retail store to attract subscribers to their location by offering free phone calls from a MS 101 on their premises, similar to Wi-Fi access that is commonly offered without charge. With security entirely bypassed, the service provider would likely need to put some restrictions on the calling, such as preventing expensive international calls. The mobile operator could still bill the retail store, based on usage identified through the femtocell ID 410, for instance.

Method for Authorizing a Mobile Station 101

FIG. 11 is a simplified block diagram illustrating steps to authorize a mobile station 101 without requiring receipt of RAND, SRES, or Kc by the service provider. The steps in FIG. 11 correspond to the embodiment illustrated in FIG. 10B, where the TMSI is the authenticating token, and the IMSI is not transmitted in FIG. 10B. In step 1101, the MS 101 enters the femtocell range at the subscriber's premise, or the MS powers on, such as when a subscriber turns on his or her phone in the morning. With GSM, several methods are available for a mobile operator to set a MS 101 preference for a femtocell 105 in step 1101. For example, the mobile operator T-Mobile may have standardized on an MCC of '310' and MNC of '260'.

T-Mobile may also have many other MNCs that have been discontinued or are currently not in use, such as '200', '210', or '220'. When deploying GSM 2G femtocells, T-Mobile could specify a MNC specifically allocated to all femtocells that would belong to the T-Mobile network, such as MNC with a value of '200', which was previously unused or discontinued. Femtocells on the T-Mobile network could implement the value '200' as the MNC field in the Cell Global Identifier 506. Mobile subscribers who sign up for T-Mobile's femtocell could be given a SIM, a "femtocell SIM", with an IMSI that has an MNC of '200', with no other apparent changes to their service on T-Mobile's macrocellular network 108.

In the preferred roaming list (PRL) of a "femtocell SIM" with an MNC of '200', T-Mobile's regular macrocellular network 108 with an MNC of '260' could be placed as first priority on the preferred roaming list. Thus, when located in the range of the femtocell 105, the MS 101 will automatically prefer the femtocell over the traditional T-Mobile macrocellular network 108, since the MNC of the femtocell, MNC='200', matches the MNC of the IMSI, also MNC='200'. In this example, a MS 101 belonging to T-Mobile would automatically prefer service for a femtocell 105 when in range. Alternatively, if the existing deployed SIMs of T-Mobile have an MNC of '260' in the MNC of the IMSI and T-Mobile did not want to change any SIMs, they could allocate the MNC '260' to the femtocell network and change the MNC for all macrocellular base stations to an MNC of '200', and place the MNC '200' as the first priority in the PRL for all SIMs on the network, even if they do not subscribe to the femtocell service.

For step 1101, other examples are also available for mobile operators to have a MS 101 automatically prefer femtocell 105 over the macrocellular network 108 when a MS is in a femtocell 105 range. The mobile operator could specify that all femtocells belong to a LAI. The femtocells on the network could implement the LAI in their respective CGIs. The logic for preference of base stations assigned to a MS 101 could be set up in the mobile operator's network such that the LAI dedicated to the femtocells always have preference, so long as the signal strength exceeds a minimal value such as −95 dB. In addition, a set of LAIs could be assigned to the femtocell network, instead of a specific LAI.

Following the well established procedures defined in the mobile telephone specifications such as GSM 2G, the MS 101 connects to the femtocell 105 with its TMSI and initiates a Location Update in step 1102. According to a preferred exemplary embodiment, unciphered communication is maintained between the MS 101 and the femtocell 105 at 1102. If the TMSI is not available, which is typical when the SIM is powered up in a handset for the very first time, other unique identifiers of the MS 101 such as the IMSI or IMEI could be requested by the femtocell 105. Those identifiers could also be utilized instead of the TMSI on a regular basis, but that method would generally be considered as less secure.

As part of the authorization process in the GSM 2G specification, the femtocell 105 should send a random number, RAND, to the MS 101. According to one exemplary embodiment, the service provider does not have access to Ki, and thus cannot compute Kc, or SRES for any input RAND. This computation is commonly performed by GSM 2G mobile operators according to the COMP128 standards. For a preferred exemplary embodiment in step 1103, the femtocell 105 sends a RAND, which is internally generated by the femtocell 105 and not otherwise associated by a RAND from the mobile operator 108, and the MS 101 will respond with its computed SRES based on the Ki stored internally within the SIM.

The RAND sent by the femtocell 105 may not be associated with the SRES in any way. In step 1104, the femtocell authorizes the MS 101 with the SPNC 628 of the service provider network 107 according to the process described in step 1007. Specifically, the service provider 107 can determine if any of the TMSIs received in step 1007c matches the TMSI submitted by the MS in 1102, and sends the authorization response to the femtocell 105 in step 1007d. In step 1105, the femtocell 105 determines if the MS 101 is authorized, based on the response from the SPNC 628 in step 1007d.

If the MS 101 is authorized as indicated by 1007d, the femtocell 105 accepts the MS 101 SRES without the need to actually compute SRES in 1106 and the femtocell 105 also sets the ciphering mode of the MS to "disable", or A5/0. Note the acceptance of SRES in step 1106 is without any knowledge of Ki or computation of COMP128, with corresponding output of SRES for an RAND input, but instead the acceptance of SRES in step 1106 is determined based upon the authorization response from the SPNC 628 in step 1007d and evaluated by the femtocell in step 1105.

If the MS authorization attempt with the SPNC 628 in step 1007 fails, the femtocell 105 rejects SRES in step 1107, again without the need to actually computing SRES. After a successful authorization and disabling of the cipher mode, the MS 101 can complete the process of attaching to the femtocell 105 that is well known to one of ordinary skill in the art, and await paging requests from the femtocell 105 or place outbound calls to the VoIP server 406 in step 1108.

Steps 1101 through 1108 may be preferred if the service provider does not have the associated security information for the MS 101 and subscriber SIM installed in the MS 101. In an alternative embodiment, incorporation of the femtocell 105 with the macrocellular network 108 may require the service provider to have access to combinations of RAND, SRES, and Kc from the mobile operator for the MS 101 that accesses the femtocell 105, and these security tokens could be acquired and passed to the femtocell 105 via the message flows outlined in FIG. 10A.

With this alternative embodiment shown in the message flows in FIG. 10A, authentication would not be required by the service provider 107 matching the TMSIs from the Mobile NSS 602 in step 1007c with the TMSI submitted in step 1007b as described in step 1007. Instead, once the MS 101 sends a Location Update request to the femtocell 105 after initial contact on the femtocell's RACH, the femtocell 105 submits an authorization request with the SPNC 628 of the service provider network 107 via the IMSI through connection 617 of FIG. 6, as shown in step 1003a.

Through the connection 620 to the mobile NSS 602 also illustrated in FIG. 6, the SPNC 628 obtains a valid RAND, SRES, and Kc associated with the MS IMSI in step 1003b and 1003c, and passes the parameters to the femtocell through connection 617. The femtocell 105 then authenticates the MS 101 by presenting the RAND originated at the mobile NSS 602, and evaluates if the SRES from the MS matches the SRES from the mobile NSS 602. Thus, the MS 101 could be authenticated without requiring the femtocell ID in the authorization process.

After the MS is authenticated using traditional GSM methods of RAND and SRES, traditional mobility both in and out of the femtocell 105 to avoid dropped calls could be supported using techniques well known in the art, through the methods in outlined in the GSM specifications, or other mobile network standards if implemented on the femtocell 105. Seamless handover in both idle and active modes could be supported by implementing the VLR functionality in 610 with the GMS standard 03.09 3.14.0, for example.

In this exemplary embodiment that integrates the femtocell 105 with the macrocellular network 108, ciphering could also be enabled between the MS 101 and the femtocell 105. With ciphering, the software defined radio 206 would need to implement the appropriate A5 algorithm and have access to the Kc cipher key. With integration into the macrocellular network 108, ciphering between the femtocell 105 and the MS 101 could also be disabled, which would likewise reduce the computation requirements of the software defined radio, although the XOR calculations of the a5 cipher should not be too computationally intensive for a modern personal computer.

Database Tables for Managing Femtocell Service

FIG. 12 is an illustration of a database tables of an exemplary embodiment for managing the femtocell service, including the mapping of femtocell IDs, TMSIs, and MSISDN, as well as example tables to manage the femtocell 105, calling authentication, and call routing. The mappings of femtocell ID, TMSI, and MSISDN numbers are illustrated in Table 1201, and these values for a given femtocell ID would be referenced according to the authentication procedure outlined in FIG. 10B.

Other useful information to the service provider includes the VoIP ID 501 and password 502, as well as the femtocell transmit frequency and transmit power level. In a preferred exemplary embodiment, the MSISDN is populated when the subscriber completes the provisioning form or provisioning process in steps/routines 1001a, 1005a. The femtocell ID 410 specifies the hardware of the USB transceiver station 106 or the "stand alone" unit, although other temporary or random tokens similar to the TMSI could be used for the femtocell ID. The MS TMSI represents the most recent value set by the mobile operator for the subscriber, and this number is expected to change most frequently, of the three different values femtocell ID, TMSI, and MSISDN. Note that subscribers may have multiple femtocells 105 and also multiple TMSIs, so "one-to-one" mappings are not required. Alternatively, for the illustrated Table 1201, the service provider 107 may choose to include a column for the IMSI or substitute IMSI for the TMSI, depending primarily on the authentication method selected in 535. If 535 is set to "GSM", then the service provider database table 1201 should preferably also record the IMSI (or IMSIs, if several lines are provisioned) for the subscriber.

Information that may be associated with the femtocell 105 is shown in Table 1202. Generally, the femtocell 105 should have a physical address, to support emergency calls for example, and this address data could be stored in the service provider database 412, or possibly in the mobile NSS Femtocell Service Database 629. Table 1202 may also contain the VoIP server 406 for the femtocell 105. In a preferred exemplary embodiment, multiple VoIP Servers 406 are implemented to distribute the processing load to support numerous femtocells 105 and scale the network. The database 609 may track the preferred VoIP Server 406 for each femtocell 105, in order to update the correct VoIP Server 406 if the password 502 changes, or to update a user balance stored locally with the MySQL database 614 at the VoIP Server 406, for example. In a preferred exemplary embodiment, the VoIP Server 406 accesses a local MySQL 614 database for call authentication and femtocell VoIP registration requests, in order to distribute the database load. A local MySQL 614 does not need to reside physically in the VoIP server 406, but could be located in the same data center, for example.

The service provider network 107 may also track billing and account information for usage of the VoIP service, as illustrated in Table 1203. If an account lacks sufficient balance, then outgoing or incoming call requests may be denied. Note that if the distributed database architecture is implemented with a central database 412 supported by local MySQL databases 614, then the account balance information should be synchronized between the databases, preferably through connection 613 as illustrated in FIG. 6. Different rate plans could also be implemented.

The service provider database 412 or local MySQL database 614 with the VoIP servers 406 may also contain tables to determine call routing, as shown in Table 1204. If the leading digits of the telephone number dialed on the MS 101 matches a particular mask, representing the leading country code and digits for instance, the service provider can route the call to the appropriate termination network, as identified by the outbound proxy in Table 1204. Call routing information is also preferably stored in the local MySQL database 614 with the VoIP servers 406 to assist with scalability under high volumes of calls. Table 1205 illustrates a mapping of the MSISDNs for the subscribers and the HLR 618 (or equivalent, depending on the mobile network 108 standard implemented). A large mobile operator's network may have more than one HLR. The mapping in 1205 may be useful for the service provider to properly inform the Mobile NSS 602 when the MS is attached to the femtocell 105, so the correct HLR 618 can be updated, or other flags or database fields set to properly route the in-bound call. Although names are shown for the HLRs in Table 1205 for clarification, most HLRs have E.164 addresses.

FIG. 12 lists data for exemplary purposes, and other configurations and data sets within the service provider database 412 or local MySQL database 614 with a VoIP server 406 could be implemented. For example, a separate table (not illustrated) could maintain a list of authorized femtocell IDs, such that if the corresponding USB transceiver station 106 is reported as stolen, all service through the femtocell 105 would be rejected. Although the VoIP ID 501 is shown as an example first name, other parameters could be used for the VoIP ID, such as a decimal number to uniquely identify the subscriber's account. Call detail records could be stored for billing and accounting purposes.

Media detail records (MDRs) may also be stored in the database 412 or MySQL database 614 with a VoIP server 406, and the MDRs record the actual VoIP quality delivered during a call, including measured packet loss, delay, jitter, codec implemented, among other media, call quality, and similar parameters of an attempted telephone call. Media detail records can assist with management of the service provider network 601, such as identifying a particular call termination network may have unacceptable packet loss, and thus call routing rules as shown in Table 1204 could be appropriately adjusted to bypass the IP networking issue.

Relationship Between Various VoIP Signaling Elements

Figure 13:
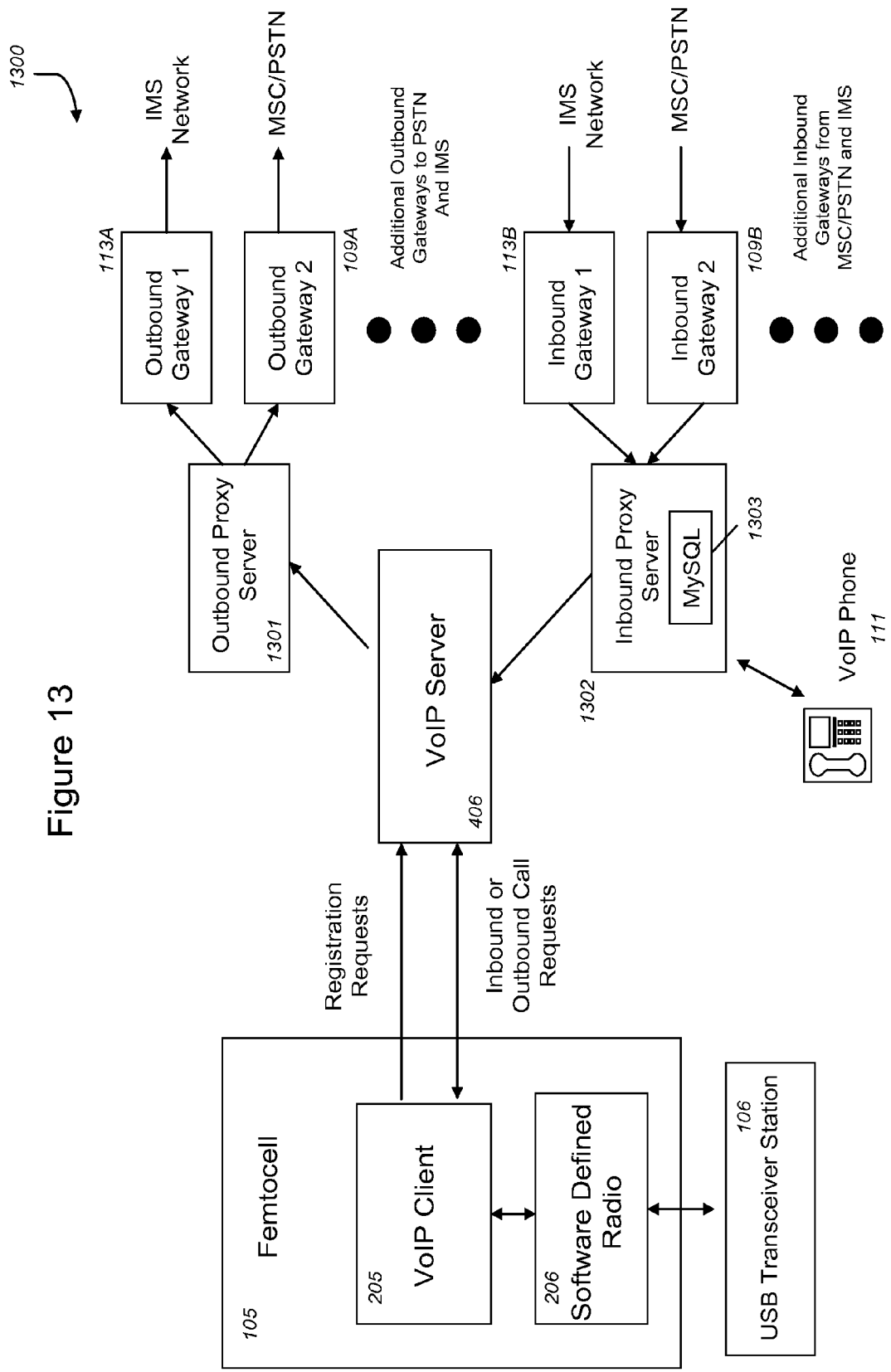
FIG. 13 is a graphical illustration of the relationship between various VoIP signaling elements according to one exemplary embodiment of the invention.

FIG. 13 is a graphical illustration of the relationship between various VoIP signaling elements according to a preferred exemplary embodiment. The femtocell 105 contains both a VoIP client 205 and a Software Defined Radio 206. The VoIP client 205 periodically securely registers with the VoIP Server 406. Although a single femtocell 105 and VoIP Server 406 are shown, the service provider network would likely contain a plurality of femtocells 105 and VoIP servers 406.

When placing outbound call requests from the VoIP client 205, the VoIP Server 406 routes the call to an outbound proxy

1301. The outbound proxy 1301 in turn selects the terminating gateway 109A, 113A, based on call routing rules within the outbound proxy 1301. The outbound proxy could be a SIP proxy or a session border controller operated by the service provider, the mobile operator, or a third party VoIP call termination network. In a large network with many different femtocells 105 and VoIP Servers 406, calls from a VoIP Server 406 could be routed to a plurality of outbound proxy servers 1301, based upon routing rules obtained from a database or other rules, such as a text file stored locally on the VoIP Server 406. For example, an outbound call to an international destination with a particular country code could be routed across the Internet 102 to the outbound proxy server 1301 operated by a wholesale carrier in the country where the telephone call will be terminated. In addition, there may be multiple levels of outbound proxies 1301 between the VoIP server 406 and the gateway 109A, 113A.

In a preferred exemplary embodiment the protocol implemented to register and place or receive calls between with VoIP client 205 and VoIP Server 406 is IAX2. The protocol implemented to communicate between a VoIP Server 406 and the outbound proxy 1301 and inbound proxy 1302 is SIP. Other protocols could be implemented, such as SIP between the VoIP client 205 and the VoIP Server 406. In general, any combination of IAX2, SIP, MGCP, H.323, or proprietary protocols could be implemented on the VoIP client 205, the VoIP server 406, the proxy servers 1301,1302, and gateways 109, 113, so long as the corresponding server or client communicated with also supports the same protocol. In addition, if the mobile operator has a SIP network, the VoIP server could be located on the mobile operator's network.

When the MS 101 is attached to the femtocell 105, inbound calls from the mobile network ingress to the Internet 102 from the PSTN 103 through an inbound gateway 109B. Gateway 109B may also be connected to the mobile switching center (MSC) or gateway mobile switching center (GMSC) of the mobile operator 108. When connected to the PSTN 103, both the inbound gateway 109B and outbound gateway 109A convert the telephone call from the PSTN protocols to VoIP protocols. For example, if the gateway 109B has a T3 connection with an SS7 signaling for the PSTN 103, the gateway 109B can convert the call from PSTN signaling and G.711 ulaw media format to SIP signaling and a GSM-ERF or VMR-WB codec. The inbound gateway 109B routes the inbound call to the inbound proxy server 1302. With a plurality of VoIP Servers 406, the inbound proxy 1302 should identify the correct VoIP Server 406 to forward the incoming call request. The correct VoIP server 406 will be the VoIP server 406 where the femtocell 105 with the attached MS 101 is registered. The inbound proxy 1302 could be Cisco SIP Proxy Server, for example. Many methods are available for the mobile operator 108 to route inbound calls from the PSTN 103 or mobile network 108 to the inbound gateway 109B. Methods previously described include Call Forwarding Not Reachable (CNFR), Provide Roaming Number (PRN), instructions to the Gateway MSC to route the call to the gateway 109B, among others. In addition, the inbound gateway may not need physical PSTN links, but rather could be a VoIP border element to the mobile operators network 108, such as a session border controller, similar to the inbound gateway 113B shown in FIG. 6.

In order identify the correct VoIP Server 406, the inbound proxy 1302 could implement a local database with a mapping between MSISDN numbers and VoIP proxies, which could be generated from the exemplary database tables shown in FIG. 12, and stored within a local MySQL database 1303 according to a preferred exemplary embodiment. Other databases besides MySQL could also be implemented, or simple text file with the mappings stored on the inbound proxy 1302. Alternatively, the inbound proxy 1302 could look up the correct mapping between MSISDNs and VoIP Servers 406 directly from the service provider database 412.

Once the inbound proxy 1302 identifies the correct VoIP Servers 406 to receive the inbound call, the call request is forwarded to the correct VoIP Servers 406. The VoIP Servers 406 then forwards the inbound call to the correct femtocell 105, and the femtocell 105 rings the MS 101. If the originating device is located on the Internet 102, such as the VoIP Phone 111 shown, the inbound call could bypass the PSTN 103 and MSC, reach the inbound proxy server 1302 or VoIP Server 406 through methods such as Telephone Number Mapping (ENUM) or Distributed Universal Number Discovery (DUNDi). Methods such as ENUM or DUNDi could also be utilized to properly forward inbound calls from 109B and 1302.

In addition, the MS 101 could also be assigned a landline number when attached to the femtocell 105. In this case with the exemplary VoIP network 1300 shown, incoming calls to the subscriber with a PSTN "landline" number could ring the MS 101, when the MS 101 is attached to the femtocell 105. If landline services are provided, the VoIP Server 406 could also function as a feature server, to implement standard Class 5 features such as voice mail and call forwarding, among other features.

If a PSTN landline number is assigned to the subscriber, the femtocell 105 may also provide a standard analog RJ-11 telephone jack, and regular landline inbound and outbound telephone service could be provided at a subscriber's premise, even if the MS 101 is turned off or beyond the femtocell's range. Alternatively, the analog telephone connected to the femtocell 105 could be automatically rung with incoming calls from the mobile network 108 to the MSISDN, if the MS 101 was not found to be either in the PLMN or roaming on a different mobile network 108. This service would likely require updates to the Mobile NSS 602, so that the Mobile NSS 602 would be programmed to forward the call to the VoIP network 1300 if the MS 101 could not be found on the mobile network 108, such as CFNR.

Although separate proxy servers 1301, 1302 and gateways 109, 113 are shown in FIG. 13, other configurations are possible. For example, the function of the outbound proxy 1301 and the inbound proxy 1302 could be combined into a single proxy (not illustrated). In addition, the proxy servers 1301 or 1302 could be combined directly with the VoIP Servers 406. Further, the VoIP Server 406 could have interfaces into the PSTN 103 directly, such as T1 or E1 cards, thereby eliminating the need for separate gateways 109, 113, although these combinations of functionality would generally be more difficult to scale to a network with hundreds of thousands or more subscribers and femtocells 105.

Combining various servers 413, 1302, 1302 and gateway elements 109, 113 may be preferred in small networks such as with less than a few thousand subscribers and femtocells 105. The functionality of some inbound and outbound gateways 109, 113 could be combined, and may be preferred specifically for the calls originating from and destined to the mobile operator's network responsible for services to the mobile subscriber.

Femtocell Registration Messages to VoIP Network

Figure 14:
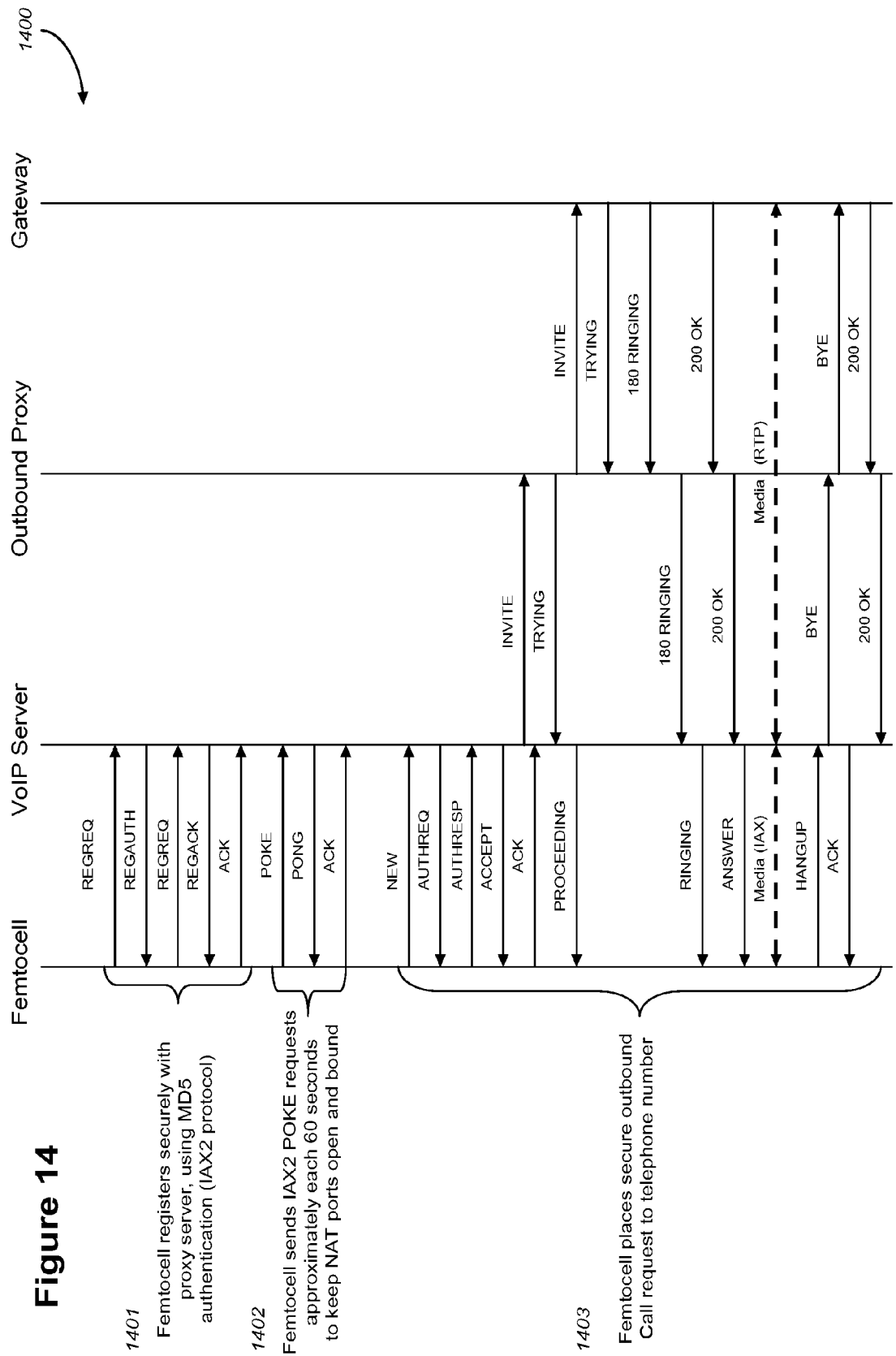
FIG. 14 is a simplified message flow chart illustrating messages from the femtocell to the VoIP network to register, keep NAT ports open and bound, and connect a telephone call according to one exemplary embodiment of the invention.

FIG. 14 is a simplified message flow diagram illustrating messages from the femtocell 105 to the VoIP network 1300 to register the VoIP client 205, keep NAT ports on the NAT router 119 open and bound, and connect a telephone call. The registration and call control process shown between the femtocell 105 and the VoIP Server 406 in 1400 is IAX2, which is according to a preferred exemplary embodiment, although other protocols could be implemented, such as SIP or a proprietary protocol. IAX2 is also compatible with the open source VoIP server Asterisk, which is also implemented as the VoIP Server 406 in a preferred exemplary embodiment. The messages from the VoIP client 205 to the VoIP Server 406 are formatted and sent as standard UDP, which is generally more compact and faster than TCP due to the lower overhead of the protocol. Another benefit of UDP over TCP is the VoIP client 205 and VoIP server applications can more readily monitor and manage issues such as the timing and number of retries, as shown in 527 and 528. If the VoIP client 205 is implemented on a Microsoft Windows PC, the TCP timeout and retries may be managed by the operating system and the VoIP client 205 has less control over the handling and timing of any retries.

In the common case of a NAT router 106 being installed on the subscriber's premises, IAX2 is preferred over SIP because both call control and media are handled over a single port or single stream of UDP messages. With SIP, up to three separate ports must be managed and kept open and bound at the NAT for a single telephone call: media, call control, and Real Time Transport Protocol Control Protocol (RTCP), if RTCP is implemented. With SIP, the media stream occupies a separate port than call control, and inbound media to the VoIP client 205 may not be deliverable until outbound media is first to the Internet 102 from the VoIP client 205, because the outbound media generally opens the NAT port for the inbound media. Further, IAX2 is a binary protocol, which means the message are generally more compact than the text formatted messages of SIP.

The smaller packet sizes of IAX2 result in less bandwidth utilization, and also the media packets do not require RTP headers which helps further reduce the bandwidth utilization. A standard IAX2 NEW message may require 150 bytes of information in the UDP datagram, while the equivalent SIP INVITE message with may require 350 bytes. Smaller packets that carry the same information are generally preferred over larger packets. For example, with a DSL line in a hot climate such as desert conditions in the summer, or simply at a location far from the central office, the packet loss rate will likely be correlated to packet sizes, with larger packets being dropped more frequently than smaller packets.

The smaller packets for IAX2 would thus have a higher probability of successful transmission than SIP messages with the equivalent information payload in the message. The service provider may also implement a different VoIP protocol for the femtocell than IAX2 in 525, such as SIP. For example, a service provider or mobile operator may prefer SIP over IAX2 or other protocols, in order to integrate with existing network infrastructure that may implement SIP.

VoIP Protocol for the Femtocell 105

In the preferred exemplary embodiment, the VoIP client 205 of the femtocell 105 registers periodically with the VoIP Server 406 whenever the PC 104 is powered on and connected to the Internet 102 in Stage 1401 via the REGREQ message that includes the user name, or VoIP ID 501. If the femtocell 105 is designed as a "stand alone" unit, the femtocell preferably registers with the VoIP Servers 406 whenever it the "stand alone" unit is powered on. The registration is secured via the challenge replied back from the VoIP Server 406 in the form of a random nonce in the REGAUTH response.

The femtocell 105 applies the nonce and the VoIP password 502 to the MD5 hash algorithm, and replies with the MD5 hash results with a second REGREQ. Since the VoIP Server 406 also knows the VoIP password 502, the VoIP Servers 406 also calculates the hash value and compares the results. If the VoIP signaling obfuscation parameter 530a is set in the configuration file 500, signaling messages between the VoIP client 205 and VoIP Server 406 such as the REGREQ and all subsequent messages could be obfuscated, according to the method specified in 531.

Upon successful matching of the received and calculated hash values, the VoIP Server 406 sends a REGACK reply. Other hashing algorithms or secure methods of verifying the femtocell could be implemented, such as a RSA challenge and response. In the preferred exemplary embodiment, the REGREQ message is initialized by the VoIP client 205 periodically, such as every 900 seconds. One benefit of periodic registration, even without the presence of a MS 101 is software updates can be pushed down to the femtocell when the base station is idle. In addition, registration facilitates remote login via the service provider's customer support staff to the PC 104 for troubleshooting even when the MS 101 is not attached to the femtocell.

Other configurations for the registration process are possible, such as designing the VoIP client 205 to only register when a MS 101 is attached. Another option is for the VoIP client 205 to register with the VoIP ID 501 when the MS 101 is not attached, but switch to registering the a different parameter when the MS 101 attaches, such as the femtocell ID 410 instead of the VoIP ID, thereby notifying the VoIP Server 406 that the MS 101 is now present on the femtocell 105.

After successful registration, the VoIP client 205 should keep the NAT ports open and bound in Stage 1402. This is achieved via sending the IAX2 POKE request more frequently than the REGREQ request, such as once a minute. The VoIP Server 406 replies with an IAX2 PONG and the VoIP client 205 completes the process with an ACK. In addition to maintaining the NAT ports, this message sequence in Stage 1402 is valuable for both the VoIP client 205 and the VoIP Server 406 to monitor the quality of the IP network. Even if a NAT router is not present at a subscriber's premises and a public Internet address is available for the femtocell 105, the POKE method outlined in Stage 1402 is preferred since it allows both VoIP endpoints to monitor the network quality using the native VoIP protocol, although the POKE interval 524 could be increased to a larger interval, such as every 240 seconds.

Other methods of monitoring the network quality or maintaining the NAT ports could also be implemented. For instance, with the SIP protocol, the femtocell 105 could periodically send a NOTIFY or a similar small and "low overhead" message to the VoIP Server 406. Alternatively under the SIP protocol, the VoIP client 205 could maintain the NAT ports with a full REGISTER request approximately every minute, and in this case the VoIP Server 406 would accept the registration without authentication and less frequently send a full challenge or nonce to a registration attempt, such as every five to twenty minutes, in order to maintain security and keep NAT ports open.

Once the MS 101 has successfully authorized with the femtocell 105, outbound or inbound call requests can be placed. In the preferred exemplary embodiment, the authorization procedures for the MS 101 at the femtocell 105, such as passing security tokens RAND and SRES, are managed between the VoIP client 205 and the service provider web server 413 via https in connection 617 as illustrated in FIG. 6, as opposed to sending messages between the VoIP client 205 and the VoIP Server 406, such as in Stage 1401.

However, the authorization process for the MS 101 could also be processed through the VoIP client 205 and the VoIP Server 406, through additional messages that are not shown in FIG. 14. In 1403, the VoIP client 205 sends an IAX2 NEW message to initiate a call, such as when the subscriber has dialed a telephone number on the MS 101. In order to maintain security, the VoIP Server 406 responds with the AUTHREQ message, and the VoIP client 205 replies with the AUTHRESP.

The AUTHREQ could optionally be omitted, but it is recommended for security purposes. If the AUTHRESP is successful, the VoIP Server 406 replies with the ACCEPT and proceeds with the call. Although the VoIP client 205 has previously securely registered in this example, the registration process is relatively infrequent, such as every 15 minutes. With IPv4 and signaling over UDP, the origination of a NEW request could potentially be "spoofed" by inserting a false origination address in the TCP/IP header, and AUTHREQ could help maintain security with the recommended 15 minute registration intervals for the VoIP client 205. This security concern would be significantly mitigated by the use of IPv6, but the service provider may have limited control over the type or version of Internet connection an ISP provides to a subscriber.

In a preferred exemplary embodiment, the VoIP Server 406 forwards the call request to the outbound proxy 1301 of FIG. 13 via SIP, although other protocols could be implemented such as H.323 or MGCP. The reason SIP is preferred is that SIP is generally implemented in widespread commercial use on the various wholesale carrier networks and terminating gateways 109A, 113A. Thus, the VoIP server 406 initiates the call to the outbound proxy 1301 with the SIP INVITE message, and the call request proceeds. Upon successful answer by the called party, indicated by the SIP 2000K message or the equivalent ANSWER message in IAX2, media can flow between the VoIP client 205 and the terminating gateway 109, 113. Inbound calls to the MS from a gateway 109 would have similar messages as illustrated in Stage 1403, but in the reverse direction with the gateway sending a SIP INVITE to initialize the call setup.

The gateway 109, 113 could be a gateway 109A to the PSTN 103 with traditional T1 or E1 interfaces, or a combined media and proxy gateway 113A to another network, which could be utilized to connect the call to a mobile phone within an IMS network, as shown in FIG. 13. The gateway 109, 113 could also be a proxy as a border element into a third party termination network. Upon termination of the telephone call, the appropriate HANGUP and BYE messages with acknowledgements are transmitted, with femtocell/MS terminating the call in the example shown in Stage 1403.

Media Flow through Femtocell 105 and VoIP Network

Figure 15:
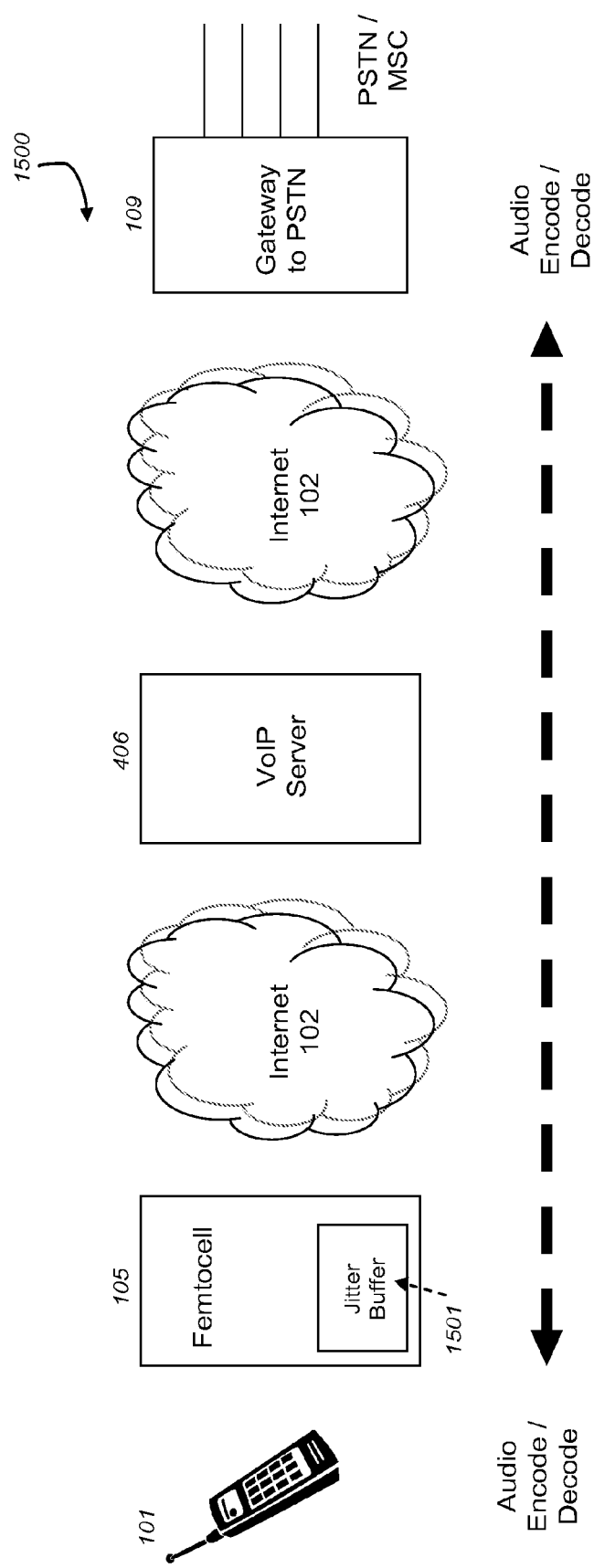
FIG. 15 is graphical illustration of the flow of media through the femtocell and VoIP network, demonstrating the preferred encoding and decoding of audio is on the endpoints according to one exemplary embodiment of the invention.

FIG. 15 is graphical illustration of the flow of media through the femtocell 105 and VoIP network 107, demonstrating the encoding and decoding of audio is on the endpoints according to a preferred exemplary embodiment, in order to deliver the highest possible voice quality for a call. A secondary benefit of native transmission of audio without transcoding is that license fees for the codec implementation should not be required on the femtocell 105 or VoIP server 406, since the media stream is preferably simply passed through and not encoded or decoded. If this native transmission of the codec is not supported, either the femtocell 105 or the VoIP server 406 could perform the appropriate transcoding between the codec implemented on the MS 101 and the codec implemented on the gateway 109, 113.

Although the media is illustrated in FIG. 15 as passing through a VoIP Server 406, the media could bypass the VoIP Server 406 in order to follow a more direct path across the Internet 102. The benefits of routing media through the VoIP server 406 include (i) support for dynamically selecting FEC codes, (ii) media trunking with the femtocell 105, (iii) encrypting the media, (iv) assisting the NAT traversal, and (iv) removing RTP headers in order to conserve bandwidth over connection 133 if the IAX2 protocol is implemented between the femtocell 105 and VoIP server 406. The VoIP server 406 can reinsert RTP headers in order to transmit the media with most commercial gateways.

If transcoding is implemented on the femtocell 105, a preferred exemplary embodiment is to transcode from the MS codec, such as GSM-FR, GSM-EFR, AMR, or VMR-WB, into a low bandwidth codec implemented on the gateway 109, such as G.723.1, G.729, or ILBC. Forward error correction techniques will require more bandwidth, so the combination of a high bandwidth codec plus FEC at the femtocell 105 may approach the limits of the uplink bandwidth from the femtocell 105 to the Internet 102 through connection 133 at the subscriber's premises.

If transcoding is performed by the VoIP Server 406 or another media server between the femtocell 105 and gateway 109, 113, a preferred exemplary embodiment is to transcode from the MS codec into G.711 ulaw or G.711 alaw. The reason G.711 is preferred for transcoding on servers is quality is preserved, and the servers are generally located at data centers with access to sufficient bandwidth to support the G.711 codec. In addition, less processing power is required to transcode from GSM-EFR to G.711, for example, than GSM-EFR to G.729.

In FIG. 15, the two endpoints are the MS 101 and the gateway 109 to the PSTN/MSC. Although a gateway 109 is shown, if the call terminates at another VoIP endpoint, such as a VoIP phone 111 (not illustrated in FIG. 15), the audio may also be transmitted natively to the VoIP phone, assuming it implements the same codec as the MS 101, otherwise transcoding would likely be required. As shown in the system 1500, according to a preferred exemplary embodiment, media is sent natively between the PSTN/MSC and MS 101, since the GSM-EFR and GSM-FR codecs are implemented on the gateway 109, which could be the Cisco AS-5400 XM, for example. If the CDMA2000 standard and the VMR-WB codec is selected between the MS 101 and femtocell 105, then transcoding may be required if the gateway 109 does not also support the VMR-WB codec.

In a preferred exemplary embodiment, ciphering is also disabled between the MS 101 and the femtocell 105, since the low power levels would be difficult to intercept and the radio transmission should be kept local to the subscriber's residence or the immediate vicinity. At sufficiently low power levels for transmission between the MS 101 and femtocell 105, a potential listener to the radio transmissions would need to be either in the subscriber's residence or on the subscriber's property, and at that point other security concerns would likely take precedence over the need to cipher the media and call control.

One advantage of disabling ciphering on the MS 101 is that the ciphering process will also not need to be applied by the femtocell 105. If ciphering is enabled, yet the audio is not deciphered at the femtocell 105, then the audio could not be readily transmitted to the gateway 109 since standard commercial VoIP gateways 109, 113 are typically not configured to decipher the media streams, and the mobile phone cipher key Kc would need to be transmitted to the gateway in this instance. As previously noted to improve voice quality, UDP checksums should also be disabled for traditional mobile network codecs such as GSM-EFR, GSM-FR or VMR-WB, since these codecs include compensation for bit errors, and the transmission of media with bit errors is superior to full frame erasure that would occur by dropping a UDP packed with an invalid checksum.

The VoIP client 205 may also implement a standard VoIP jitter buffer before passing the audio to the MS 101, as shown in 1501. The MS 101 is designed for tightly controlled timing for the receipt of audio packets, such as every receiving audio in standard 4.615 ms intervals in the GSM 2G standard. In sharp contrast, the Internet 102 is a "best effort" network, and the standard deviation in packet arrival time for media could be 15 ms or higher for a regular DSL or cable modem connection. A jitter buffer on the femtocell 105 should effectively remove the jitter and meet the timing requirements of the MS 101. In general, since the radio connection between the femtocell 105 and MS 101 is not bandwidth constrained due to the relative close proximity, the femtocell 105 should direct the MS 101 to implement the highest bandwidth codec, and then forward unciphered audio directly to VoIP network.

The codec transmission shown in FIG. 15 may also support both forward error correction (FEC) and media trunking simultaneously. Three MS 101 could have active calls at the same time, such as MS(1), MS(2), and MS(3). During a time interval of 20 ms, each call may have media to transmit of i, j, and k, respectively from the MS to the gateway 109, where the media represents 31 bytes with the GSM-EFR codec for each call. Without media trunking, the femtocell 105 would transmit separate packets of UDP(i), UDP(j), and UDP(k), where each UDP packet represents 63 bytes consisting of 20 bytes IP, 8 bytes UDP, and 4 bytes IAX headers and 31 bytes of payload. At 50 packets per second for each media stream, the bandwidth would be 50 packets/sec×63 bytes/packet×8 bits/byte×3 calls, or approximately 76 kbps.

With media trunking during a 20 ms interval, the femtocell 105 would transmit a single packet of UDP (i, j, k). This UDP datagram would require 126 bytes, or 32 bytes of IP/UDP/IAX headers and 93 bytes of payload. The bandwidth would be 50 packets/sec×126 bytes/packet×8 bits/byte, or approximately or approximately 51 kbps. The calculations above assume the IAX2 protocol with 4 byte headers on the media packet is implemented. With the SIP protocol and RTP for the media, 12 byte RTP headers are usually implemented on the media packets, so the bandwidth savings for media trunking with RTP will be higher than IAX2, although the overall bandwidth utilized with be higher with RTP than with IAX2.

A full (2,1) FEC code could be implemented by simply duplicating each packet UDP (i, j, k), or a resulting bandwidth of 102 kbps. With 5% packet loss, there would be almost no audible degradation of sound quality with a (2,1) FEC code, while it would become noticeable without FEC. (Schulzrinne and Jiang). The improvement of (2,1) FEC would be even greater with higher packet loss levels, such as 8%. Thus, the combination of trunking and a (2,1) FEC code can improve quality under packet loss, while only slightly increasing the bandwidth required from approximately 76 kbps to 102 kbps for three simultaneous calls with the GSM-EFR codec.

Keeping NAT Ports Open During Registration

Figure 16:
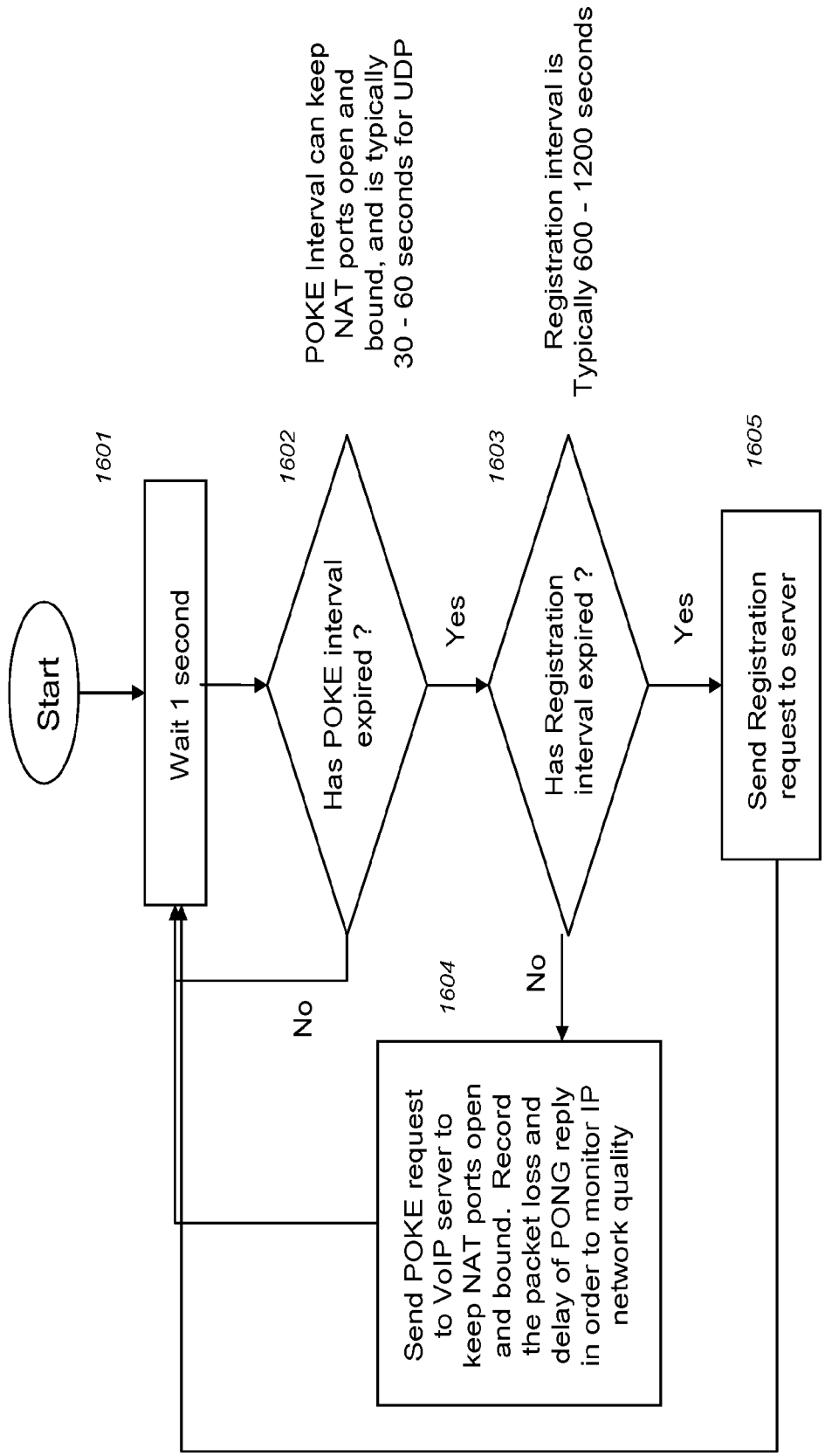
FIG. 16 is a simplified flow chart illustrating the logic to keep the NAT port open and bound, while periodically registering the femtocell with the VoIP Server according to one exemplary embodiment of the invention.

FIG. 16 is a simplified block diagram illustrating the logic to keep the NAT port open and bound, while periodically registering the femtocell 105 with the VoIP Server 406, which may be implemented by the VoIP client 205. In step 1601, the VoIP client 205 can implement a timer to wait before proceeding. The VoIP client 205 may implement a NAT "keep-alive" interval equivalent to the POKE Interval 524, in order to keep the TCP/IP ports of the NAT router 119 open and bound, so incoming messages from a VoIP Server 406 can properly reach the VoIP client 205. In step 1602, if the POKE Interval 524 has not expired, the VoIP client 205 continues to wait, and the NAT ports remain open so that an inbound call from the VoIP server 406 can reach the femtocell 105 and ring the MS 101. In step 1602 if the POKE interval has expired, the VoIP client 205 next determines if the Registration Interval 514 has expired in step 1603. If the Registration Interval has not expired, in step 1604 the VoIP client 205 may send an IAX2 POKE request to the VoIP server 406.

Several benefits may be achieved by using the IAX2 POKE command to keep the ports open. First, the packet is small in size and requires minimal processing power on the VoIP client 205 or the VoIP Server 406. The POKE, PONG, and ACK messages shown in Stage 1402 are on the order of 50 bytes in size and require minimal CPU resources. Second, because the datagram will require a simple response, PONG, from the VoIP Server 406 with a resulting ACK back to the VoIP client 205, both the VoIP client 205 and the VoIP Server 406 can monitor the quality of the VoIP connection.

The VoIP client 205 has a measure of the delay and potential packet loss based on the round trip time and retries required to receive the PONG, and the VoIP Server 406 has the equivalent information based on the time to receive the ACK. The POKE request shown in 1604 could also be sent simultaneously to the VoIP server 406 and the backup VoIP server 510. If the VoIP client 205 measures a superior quality Internet connection to the backup VoIP server 510 through a series of POKE requests in 1604 in order to obtain a statistical measure of quality over a period such as 15 minutes, the femtocell could switch registrations to the backup VoIP server in order to improve call quality for the subscriber.

If the VoIP client 205 fails to receive a PONG after several retries, this indicates either a problem with the local Internet connection for the PC 104, a problem with the packet routing on the public Internet 102, or potentially an issue with the VoIP Server 406 being unavailable for some reason. Consequently, the VoIP client 205 can switch to a backup VoIP server 406 automatically if the POKE or REGREQ messages as shown in Stage 1400 are not responded to by the primary VoIP server 406. This POKE method is an improvement over techniques common on Analog Telephone Adapters (ATAs).

Many ATAs or commercial VoIP clients 205 such as Microsoft RTC 1.2 send a full registration request which requires higher processing power. Some ATAs such as a Linksys PAP2 can send an "empty" packet to the server and receive no response. Although the empty packet keeps the local NAT ports bound on the NAT router 119, information may not be readily gathered about the network quality by both the VoIP client 205 and VoIP Server 406, since there is generally not a reply in both directions after the "empty" packet is sent.

By keeping the NAT ports open and bound with a simple POKE request, inbound call requests from the Internet 102 can reach the femtocell 105. If the Registration Interval 514, such as an example period of 900 seconds has expired, as determined in step 1603, the VoIP client 205 may send a REGREQ message in step 1604 in order to maintain registration with the VoIP server 406. In addition, the REGREQ message can be sent less often than the POKE request, such as every 10-20 minutes as shown. One benefit of reducing the frequency of the REGREQ message is to reduce CPU load on the VoIP Server 406, thus assisting the service provider in scaling the network.

Various exemplary embodiments have been described above. Those skilled in the art will understand, however, that changes and modifications may be made to those examples without departing from the scope of the claims.

What is claimed is:

1. A femtocell system for coupling mobile phone signals with voice over internet protocol messaging, having a processor for executing modules, the system comprising:
   a voice over internet protocol client module for sending registration messages from the femtocell system and for maintaining a network address translation port bindings between a femtocell and a server, for receiving a User Datagram Protocol (UDP) packet containing a plurality of media frames from the server, for recording the media frames in a jitter buffer, for receiving a call request from the server via the network address translation port binding, and for using a UDP port number for transmitting and receiving media;
   a software defined radio module for communicating with the voice over internet protocol client module, for processing and generating digital radio baseband signals, and for measuring received signal strength of digital radio based band signals in a predetermined frequency range;
   a call-control processing module for receiving the call request and for translating the call request into a call-control message transmitted to a mobile phone; and
   an access control database module within the femtocell for storing at least one of an International Mobile Subscriber Identity (IMSI) value and an International Mobile Equipment Identity (IMEI) transmitted by the mobile phone.

2. The femtocell system of claim 1, further comprising a configuration file that comprises an allowed radio-frequency range for the femtocell system and an address of a voice over internet protocol server on the Internet.

3. The femtocell system of claim 1, wherein the voice over internet protocol client monitors quality of an Internet connection.

4. The femtocell system of claim 1, wherein the software defined radio disables radio communications if a quality of an Internet connection falls below a predetermined level.

5. The femtocell system of claim 1, wherein the voice over internet protocol client manages a forward error correction on communications to compensate for packet loss related to an Internet connection.

6. The femtocell system of claim 1, wherein an international mobile subscriber identity code and a femtocell are allocated a unique mobile network code to associate a mobile handset with a network of femtocells.

* * * * *